US012657447B1

(12) United States Patent
Shin et al.

(10) Patent No.: US 12,657,447 B1
(45) Date of Patent: Jun. 16, 2026

(54) NEURAL CLUSTER AND NEURAL PROCESSING SoC INCLUDING THE SAME

(71) Applicant: Rebellions Inc., Seongnam-si (KR)

(72) Inventors: Wongyu Shin, Seongnam-si (KR); Juyeong Yoon, Seongnam-si (KR); Jinseok Kim, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 19/298,088

(22) Filed: Aug. 12, 2025

(30) Foreign Application Priority Data

Feb. 19, 2025    (KR) ........................ 10-2025-0021368

(51) Int. Cl.
| | |
|---|---|
| *G06F 13/40* | (2006.01) |
| *G06F 13/16* | (2006.01) |
| *G06F 13/42* | (2006.01) |
| *G06N 3/063* | (2023.01) |

(52) U.S. Cl.
CPC ......... *G06N 3/063* (2013.01); *G06F 13/1663* (2013.01); *G06F 13/4031* (2013.01); *G06F 13/42* (2013.01)

(58) Field of Classification Search
CPC . G06N 3/063; G06F 13/1663; G06F 13/4031; G06F 13/42
See application file for complete search history.

(56) References Cited

U.S. PATENT DOCUMENTS

| | | | | |
|---|---|---|---|---|
| 2018/0322384 | A1* | 11/2018 | Augustine | G06N 3/049 |
| 2021/0125042 | A1* | 4/2021 | Han | G06N 3/0495 |
| 2021/0174848 | A1* | 6/2021 | Zhang | G11C 7/1057 |
| 2022/0051094 | A1* | 2/2022 | Chentanez | G06N 3/08 |
| 2022/0156161 | A1* | 5/2022 | Sity | G06F 13/1657 |
| | | | | 710/305 |
| 2022/0197713 | A1 | 6/2022 | Sivaramakrishnan et al. | |
| 2022/0309327 | A1 | 9/2022 | Bae | |

(Continued)

FOREIGN PATENT DOCUMENTS

| | | |
|---|---|---|
| JP | 2024-533019 A | 9/2024 |
| KR | 10-2022-0134966 A | 10/2022 |

(Continued)

OTHER PUBLICATIONS

ARM, "AMBA AXI and ACE Protocol Specification," Feb. 2013. doc: IHI 0022E.

(Continued)

*Primary Examiner* — Henry Tsai
*Assistant Examiner* — Harry Z Wang
(74) *Attorney, Agent, or Firm* — BROADVIEW IP LAW, PC

(57) ABSTRACT

According to one or more embodiments of the present disclosure, a neural cluster includes a plurality of neural core units each including a neural core configured to process a neural network operation, a plurality of shared memory units each including a shared memory shared by the plurality of neural core units, and a mesh network for connecting the plurality of neural core units and the plurality of shared memory units, wherein the plurality of shared memory units are arranged in a central portion of the neural cluster, and the plurality of neural core units are arranged symmetrically above and below a shared memory area where the plurality of shared memory units are arranged.

17 Claims, 32 Drawing Sheets

(56)                    References Cited

U.S. PATENT DOCUMENTS

| | | | |
|---|---|---|---|
| 2023/0100564 | A1 | 3/2023 | Burr et al. |
| 2023/0297487 | A1 | 9/2023 | Kim et al. |
| 2023/0315336 | A1* | 10/2023 | Oh ........................ G06N 3/0464 |
| 2024/0411709 | A1 | 12/2024 | Dally et al. |

FOREIGN PATENT DOCUMENTS

| | | |
|---|---|---|
| KR | 10-2547997 B1 | 6/2023 |
| KR | 10-2023-0134953 A | 9/2023 |
| KR | 10-2025-0024939 A | 2/2025 |
| WO | 2023/242374 A1 | 12/2023 |

OTHER PUBLICATIONS

Fang, Juan et al., "A Task-Based Routing Algorithm for Network-on-Chip in Heterogeneous CPU-GPU Architectures", IEEE, 2023 IEEE International Conference on High Performance Computing & Communications, Data Science & Systems, Smart City & Dependability in Sensor, Cloud & Big Data Systems & Application (HPCC/DSS/SmartCity/DependSys), DOI: 10.1109/HPCC-DSS-SmartCity-DependSys60770.2023.00110, Dec. 2023.

Heisswolf, Jan et al., "Efficient Memory Access in 2D Mesh NoC Architectures using High Bandwidth Routers", IEEE, 2013 26th Symposium on Integrated Circuits and Systems Design (SBCCI), DOI:10.1109/SBCCI.2013.6644857, Sep. 2013.

Tootaghaj, Diman Zad et al., "Optimal Placement of Cores, Caches and Memory Controllers in Network On-Chip", arXiv, arXiv:1607.04298, DOI:10.48550/arXiv.1607.04298, Jul. 2016.

* cited by examiner

Figure 2:
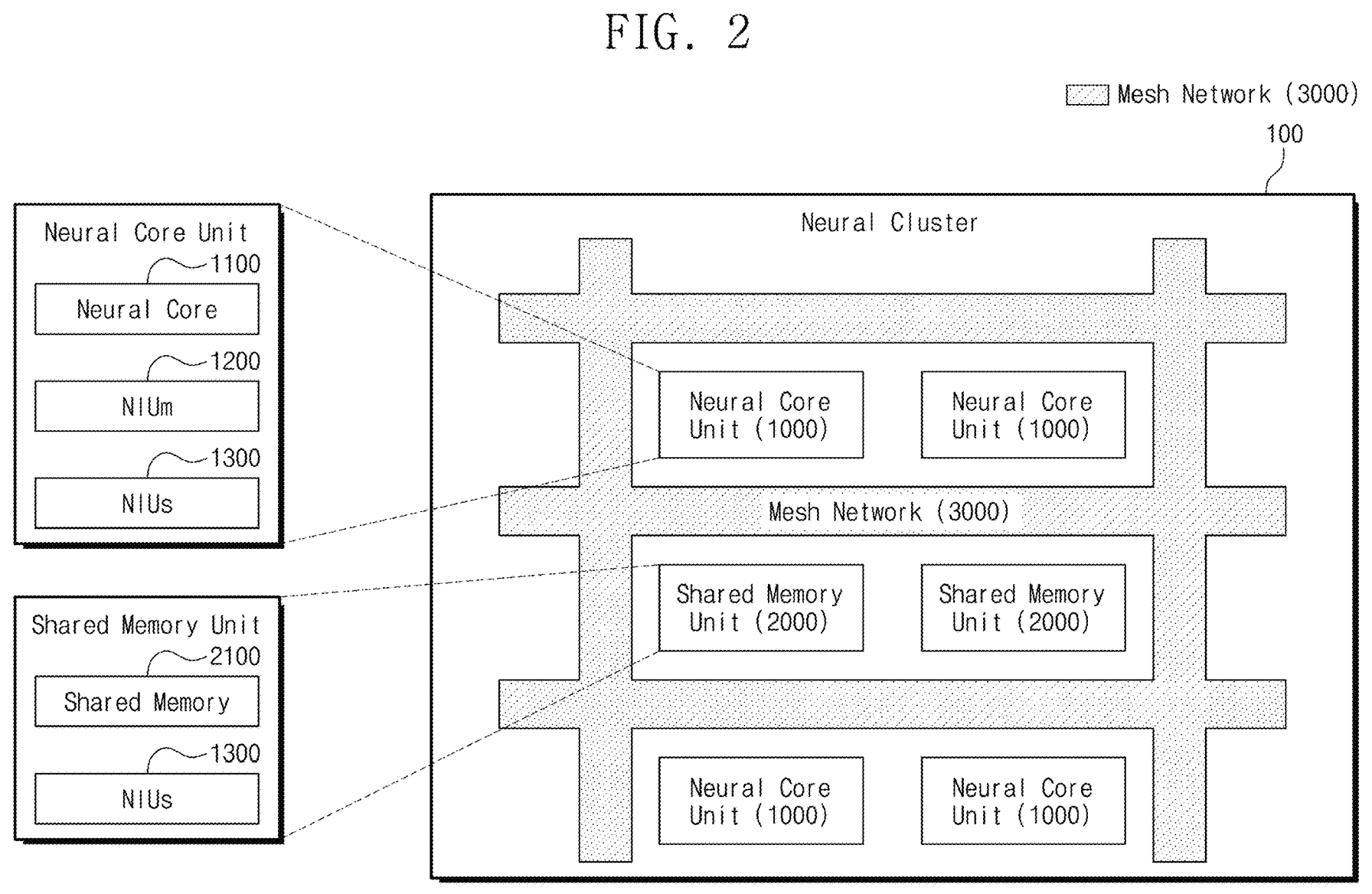

Mesh Network (3000)

Mesh Network (3000) 100

Neural Cluster

Neural Core Unit (1000)

Shared Memory Unit (2000)

Neural Core Unit (1000)

Neural Core Unit (1000)

Shared Memory Unit (2000)

Neural Core Unit (1000)

Neural Core Unit 1100

Neural Core 1200

NIUm 1300

NIUs

Shared Memory Unit 2100

Shared Memory 1300

NIUs

FIG. 5

| SHM0 | REQ0, REQ24, REQ48 |
|------|--------------------|
| SHM1 | REQ1, REQ25, REQ49 |
| SHM2 | REQ2, REQ26, REQ50 |
| SHM3 | REQ3, REQ27, REQ51 |

FIG. 9

REQ0~REQ3: Sequential Read Requests
Number of SHM: 4 (SHM0~SHM3)

FIG. 11A

[Case 1]
Interleaving Unit: 64B
Shared Memory: 4

| System Address(Binary) | |
|---|---|
| REQ0 | 00_0000_0000 |
| REQ1 | 00_0100_0000 |
| REQ2 | 00_1000_0000 |
| REQ3 | 00_1100_0000 |
| REQ4 | 01_0000_0000 |
| REQ5 | 01_0100_0000 |
| REQ6 | 01_1000_0000 |
| REQ7 | 01_1100_0000 |

Network Interface Unit

| Targe SHM | SHM Internal Address |
|---|---|
| 0 | 00_0000_0000 |
| 1 | 00_0100_0000 |
| 2 | 00_1000_0000 |
| 3 | 00_1100_0000 |
| 0 | 01_0000_0000 |
| 1 | 01_0100_0000 |
| 2 | 01_1000_0000 |
| 3 | 01_1100_0000 |

| Targe SHM | SHM Internal Address |
|---|---|
| 0 | 0000_0000 |
| 1 | 0000_0000 |
| 2 | 0000_0000 |
| 3 | 0000_0000 |
| 0 | 0100_0000 |
| 1 | 0100_0000 |
| 2 | 0100_0000 |
| 3 | 0100_0000 |

FIG. 11B

[Case 2]
Interleaving Unit: 64B
Shared Memory: 8

| System Address(Binary) | |
|---|---|
| REQ0 | 00_0000_0000 |
| REQ1 | 00_0100_0000 |
| REQ2 | 00_1000_0000 |
| REQ3 | 00_1100_0000 |
| REQ4 | 01_0000_0000 |
| REQ5 | 01_0100_0000 |
| REQ6 | 01_1000_0000 |
| REQ7 | 01_1100_0000 |

Network Interface Unit

| Targe SHM | SHM Internal Address |
|---|---|
| 0 | 00_0000_0000 |
| 1 | 00_0100_0000 |
| 2 | 00_1000_0000 |
| 3 | 00_1100_0000 |
| 4 | 01_0000_0000 |
| 5 | 01_0100_0000 |
| 6 | 01_1000_0000 |
| 7 | 01_1100_0000 |

| Targe SHM | SHM Internal Address |
|---|---|
| 0 | 000_0000 |
| 1 | 000_0000 |
| 2 | 000_0000 |
| 3 | 000_0000 |
| 4 | 000_0000 |
| 5 | 000_0000 |
| 6 | 000_0000 |
| 7 | 000_0000 |

FIG. 11C

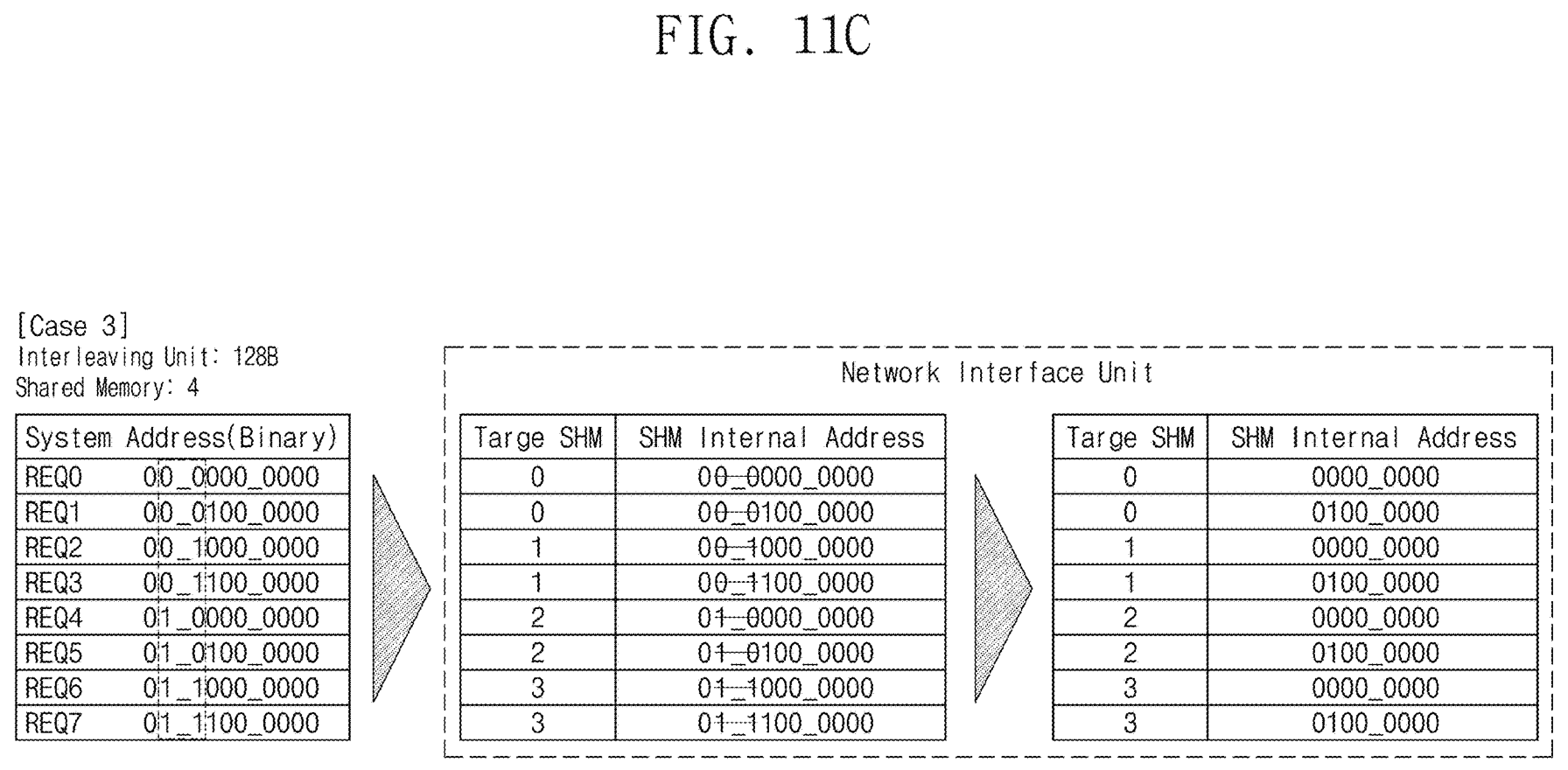

[Case 3]
Interleaving Unit: 128B
Shared Memory: 4

| System Address(Binary) | |
|---|---|
| REQ0 | 00_0000_0000 |
| REQ1 | 00_0100_0000 |
| REQ2 | 00_1000_0000 |
| REQ3 | 00_1100_0000 |
| REQ4 | 01_0000_0000 |
| REQ5 | 01_0100_0000 |
| REQ6 | 01_1000_0000 |
| REQ7 | 01_1100_0000 |

Network Interface Unit

| Targe SHM | SHM Internal Address |
|---|---|
| 0 | 00_0000_0000 |
| 0 | 00_0100_0000 |
| 1 | 00_1000_0000 |
| 1 | 00_1100_0000 |
| 2 | 01_0000_0000 |
| 2 | 01_0100_0000 |
| 3 | 01_1000_0000 |
| 3 | 01_1100_0000 |

| Targe SHM | SHM Internal Address |
|---|---|
| 0 | 0000_0000 |
| 0 | 0100_0000 |
| 1 | 0000_0000 |
| 1 | 0100_0000 |
| 2 | 0000_0000 |
| 2 | 0100_0000 |
| 3 | 0000_0000 |
| 3 | 0100_0000 |

NEURAL CLUSTER AND NEURAL PROCESSING SoC INCLUDING THE SAME

CROSS-REFERENCE TO RELATED APPLICATION

This application is based on and claims the benefit of priority to Korean Patent Application No. 10-2025-0021368, filed on Feb. 19, 2025, the aforementioned priority application being hereby incorporated by reference in its entirety.

TECHNICAL FIELD

The present disclosure relates to a neural cluster and a neural processing SoC including the same, and more particularly, to a neural cluster including a mesh network and supporting interleaving in a shared memory, and a neural processing SoC including the neural cluster.

BACKGROUND

With the rapid development of artificial intelligence (AI) technology, AI algorithms such as deep learning and machine learning are required to process vast amounts of data and perform complex operations. To satisfy these requirements, a new processor, a neural processing unit (NPU), is drawing attention beyond existing central processing unit (CPU) and graphics processing unit (GPU).

A CPU is efficient for general-purpose operations, but it is not suitable for the large-scale parallel processing required for AI operations. A GPU has excellent parallel processing capabilities, but it has high power consumption and lacks functions specialized for AI operations. In contrast, an NPU is designed to suit the characteristics of AI algorithms, providing high energy efficiency and excellent computational performance.

An NPU is optimized for AI operations such as matrix operations and convolution operations by implementing the structure of a neural network in hardware. In addition, an NPU can efficiently perform AI operations even in mobile devices or edge devices where battery life is important, through low-power design. Based on these advantages, NPUs are expected to be utilized in various technologies and devices such as smartphones, autonomous driving, IoT, and robots.

However, when an NPU implements a neural cluster including a plurality of neural cores, it may have difficulties in efficient data communication and shared memory access between neural cores. For example, since not all neural cores are directly connected to each other, data transfer paths become long, and traffic may be concentrated on a specific neural core. In addition, increasing the number of neural cores requires complex network structure design, which may limit system expansion, and not all neural cores may efficiently access shared memory, which may cause imbalances in memory bandwidth usage. Therefore, a new neural cluster structure is required to solve these problems.

SUMMARY

An object of the present disclosure is to provide a neural cluster including a mesh network and a shared memory supporting interleaving, and a neural processing SoC including the neural cluster.

Another object of the present disclosure is to provide an efficient signaling method for synchronization signals on the mesh network of the neural cluster.

Another object of the present disclosure is to provide a neural cluster that controls data transfer paths and data transfer amounts using priority queues within the neural cluster.

The technical problems to be solved in the present disclosure are not limited to the technical problems mentioned above, and various unmentioned technical problems may be inferred by those skilled in the art from the present disclosure.

According to one or more embodiments of the present disclosure, a neural cluster includes a plurality of neural core units each including a neural core configured to process a neural network operation, a plurality of shared memory units each including a shared memory shared by the plurality of neural core units, and a mesh network for connecting the plurality of neural core units and the plurality of shared memory units, wherein the plurality of shared memory units are arranged in a central portion of the neural cluster, and the plurality of neural core units are arranged symmetrically above and below a shared memory area where the plurality of shared memory units are arranged.

In one or more embodiments, the mesh network includes a plurality of routers each arranged at an intersection formed by a row line and a column line, and a mesh network bus, and each of the plurality of routers is connected to one of the plurality of neural core units or one of the plurality of shared memory units through the mesh network bus.

In one or more embodiments, each of the plurality of routers is further connected to one or more adjacent routers through the mesh network bus.

In one or more embodiments, each of the plurality of neural core units and each of the plurality of shared memory units include a network interface unit, the mesh network bus includes a data channel, a response channel, and a request channel, and the network interface unit is configured to map an AXI-AW channel, an AXI-W channel, an AXI-B channel, an AXI-AR channel, and an AXI-R channel according to an AMBA (Advanced Microcontroller Bus Architecture) AXI (Advanced extensible Interface) protocol to the data channel, the response channel, and the request channel.

In one or more embodiments, the AXI-AW channel, the AXI-W channel, and the AXI-R channel are mapped to the data channel, the AXI-B channel is mapped to the response channel, and the AXI-AR channel is mapped to the request channel.

In one or more embodiments, each of the plurality of routers includes a first port configured to receive a first data packet having a first flag, a second port configured to receive a second data packet having a second flag and having the same destination as the first data packet, a third port connected to the destination of the first data packet and the second data packet, and an arbiter configured to determine whether an atomic transfer is applied to each of the first data packet and the second data packet, based on the first flag and the second flag.

In one or more embodiments, the arbiter is configured to check a first input enable signal generated from the first port upon reception of the first data packet, check a second input enable signal generated from the second port upon reception of the second data packet, and first check the first flag based on a predetermined criterion if the first input enable signal and the second input enable signal are activated.

In one or more embodiments, the arbiter is configured to mask the second input enable signal and transmit the first data packet to the third port if the first flag indicates the atomic transfer.

In one or more embodiments, the arbiter is configured to maintain the transmission of one or more data packets, which have one or more flags indicating the atomic transfer received after the first data packet at the first port, to the third port until a data packet having a flag indicating a non-atomic transfer is received at the first port.

According to one or more embodiments of the present disclosure, a neural cluster includes a first neural core unit including a first neural core configured to process a neural network operation, a second neural core unit including a second neural core configured to process a neural network operation, a first shared memory unit including a first shared memory shared by the first neural core unit and the second neural core unit, a second shared memory unit including a second shared memory shared by the first neural core unit and the second neural core unit; and a mesh network for connecting the first neural core unit, the second neural core unit, the first shared memory unit, and the second shared memory unit, wherein the first neural core is configured to generate a first data access request in a first cycle and generate a second data access request in a second cycle, wherein the second neural core is configured to generate a third data access request in the first cycle and generate a fourth data access request in the second cycle, wherein the first to fourth data access requests are respectively interleaved and transmitted as distributed to the first shared memory and the second shared memory, and wherein the first shared memory unit and the second shared memory unit are arranged in a central portion of the neural cluster, and the first neural core unit and the second neural core unit are respectively arranged symmetrically above and below a shared memory area where the first shared memory unit and the second shared memory unit are arranged.

In one or more embodiments, a size of data accessed according to the first to fourth data access requests is the same as each other.

In one or more embodiments, the first to fourth data access requests are respectively interleaved according to an interleaving unit and transmitted as distributed to the first shared memory and the second shared memory, and the interleaving unit is changeable.

In one or more embodiments, if the interleaving unit is the same as the size of the data accessed according to each of the first to fourth data access requests, the first data access request and the third data access request are transmitted to the first shared memory, and the second data access request and the fourth data access request are transmitted to the second shared memory.

In one or more embodiments, the first neural core is configured to further generate a fifth data access request in a third cycle and further generate a sixth data access request in a fourth cycle, the second neural core is configured to further generate a seventh data access request in the third cycle and further generate an eighth data access request in the fourth cycle, and if the interleaving unit is twice the size of the data accessed according to each of the first to fourth data access requests, the first to fourth data access requests are transmitted to the first shared memory, and the fifth to eighth data access requests are transmitted to the second shared memory.

In one or more embodiments, each of the first neural core unit and the second neural core unit further includes a network interface unit.

In one or more embodiments, the first neural core is configured to further generate a first system address with the first data access request and further generate a second system address with the second data access request, the second neural core is configured to further generate a third system address with the third data access request and further generate a fourth system address with the fourth data access request, the network interface unit of the first neural core unit is configured to parse the first system address and the second system address according to a predetermined parsing rule, the network interface unit of the second neural core unit is configured to parse the third system address and the fourth system address according to the predetermined parsing rule, and according to the parsed first to fourth system addresses, the first to fourth data access requests are respectively interleaved and transmitted as distributed to the first shared memory and the second shared memory.

In one or more embodiments, the second system address is an address consecutive to the first system address, and the fourth system address is an address consecutive to the third system address.

According to one or more embodiments of the present disclosure, a neural processing SoC (System on a Chip) includes a first neural cluster, and a second neural cluster, wherein each of the first neural cluster and the second neural cluster includes a plurality of neural core units each including a neural core configured to process a neural network operation, a plurality of shared memory units each including a shared memory shared by the plurality of neural core units, and a mesh network for connecting the plurality of neural core units and the plurality of shared memory units, wherein the plurality of shared memory units are arranged in a central portion of each of the first neural cluster and the second neural cluster, and the plurality of neural core units are arranged symmetrically above and below a shared memory area where the plurality of shared memory units are arranged, and wherein a plurality of shared memories of the first neural cluster are shared by the plurality of neural core units of the second neural cluster.

According to one or more embodiments of the present disclosure, a neural processing SoC includes a first neural cluster, and a second neural cluster, wherein each of the first neural cluster and the second neural cluster includes a first neural core unit including a first neural core configured to process a neural network operation, a second neural core unit including a second neural core configured to process a neural network operation, a first shared memory unit including a first shared memory shared by the first neural core unit and the second neural core unit, a second shared memory unit including a second shared memory shared by the first neural core unit and the second neural core unit, and a mesh network for connecting the first neural core unit, the second neural core unit, the first shared memory unit, and the second shared memory unit, wherein the first neural core is configured to generate a first data access request in a first cycle and generate a second data access request in a second cycle, wherein the second neural core is configured to generate a third data access request in the first cycle and generate a fourth data access request in the second cycle, wherein the first to fourth data access requests are respectively interleaved and transmitted as distributed to the first shared memory and the second shared memory, wherein the first shared memory unit and the second shared memory unit are arranged in a central portion of each of the first neural cluster and the second neural cluster, and the first neural core unit and the second neural core unit are respectively arranged symmetrically above and below a shared memory area where the first shared memory unit and the second shared memory unit are arranged, and wherein the first shared memory and the second shared memory of the first neural cluster are shared by the first neural core unit and the second neural core unit of the second neural cluster.

According to one or more embodiments of the present disclosure, a neural cluster includes a mesh network for connecting a plurality of blocks, wherein the mesh network includes a plurality of routers each arranged at an intersection formed by a row line and a column line, and a mesh network bus, wherein each of the plurality of routers is connected to one of the plurality of blocks and one or more adjacent routers through the mesh network bus, wherein the mesh network bus includes one control channel in which a first signal and a synchronization signal are signaled between a master and a slave, wherein the synchronization signal is signaled on the control channel according to a posted write method, and wherein the first signal is signaled on the control channel according to a non-posted write method.

In one or more embodiments, in the signaling of the synchronization signal according to the posted write method, in response to a synchronization request of the master, the slave is configured not to transmit a synchronization response to the master, and the master is configured to transmit a next signal of the synchronization request without waiting for a synchronization response.

In one or more embodiments, in the signaling of the first signal according to the non-posted write method, in response to a first request of the master, the slave is configured to transmit a response to the master, and the master is configured to transmit a next signal of the first request after receiving the response or transmit a next signal of the first request by utilizing an MO (Multiple Outstanding).

In one or more embodiments, if the master utilizes the MO, an MO count is decremented.

In one or more embodiments, the master includes a response waiting buffer configured to temporarily store information about a request until a response to the request is received, and if the master utilizes the MO, information about the first request is stored in the response waiting buffer.

In one or more embodiments, whether a signal to be signaled follows the posted write method or the non-posted write method is identified by an address or a flag of the signal to be signaled.

In one or more embodiments, the neural cluster of the above embodiments further includes a network interface unit, wherein if a synchronization response is received from an external block of the neural cluster in response to a synchronization request transmitted from at least one of the plurality of blocks, the network interface unit is configured to discard the synchronization response.

In one or more embodiments, the neural cluster of the above embodiments further includes a network interface unit, wherein in response to a first synchronization request transmitted from an external block of the neural cluster, the network interface unit is configured to generate a synchronization response and transmit the synchronization response to the external block.

In one or more embodiments, the network interface unit is configured to generate a second synchronization request according to the posted write method and transmit the second synchronization request to at least one of the plurality of blocks, based on the first synchronization request.

In one or more embodiments, the first signal includes a control signal.

In one or more embodiments, the mesh network bus includes a control bus and a data bus, the control bus includes the control channel, and the data bus includes a data channel, a request channel, and a response channel, and the control channel is a channel shared with the response channel, and the first signal further includes a write response signal.

In one or more embodiments, the plurality of blocks include a plurality of neural core units each including a neural core configured to process a neural network operation, and a plurality of shared memory units each including a shared memory shared by the plurality of neural core units, and the plurality of shared memory units are arranged in a central portion of the neural cluster, and the plurality of neural core units are arranged symmetrically above and below a shared memory area where the plurality of shared memory units are arranged.

According to one or more embodiments of the present disclosure, in a signaling method performed by a neural cluster, the neural cluster includes a mesh network for connecting a plurality of blocks, the mesh network includes a plurality of routers each arranged at an intersection formed by a row line and a column line, and a mesh network bus, each of the plurality of routers is connected to one of the plurality of blocks and one or more adjacent routers through the mesh network bus, the mesh network bus includes one control channel in which a first signal and a synchronization signal are signaled between a master and a slave, and the signaling method includes, on the control channel, determining whether a signal to be signaled is the synchronization signal, signaling according to a posted write method if the signal to be signaled is the synchronization signal, and signaling according to a non-posted write method if the signal to be signaled is not the synchronization signal.

In one or more embodiments, the signaling according to the posted write method if the signal to be signaled is the synchronization signal includes, by the master, transmitting a synchronization request, and by the master, transmitting a next signal of the synchronization request without waiting for a synchronization response to the synchronization request.

In one or more embodiments, the signaling according to the non-posted write method if the signal to be signaled is not the synchronization signal includes, by the master, transmitting a request, by the slave, transmitting a response to the request to the master, and by the master, transmitting a next signal of the request after receiving the response or transmitting a next signal of the request by utilizing an MO.

In one or more embodiments, the determining whether the signal to be signaled is the synchronization signal includes determining whether the signal to be signaled is the synchronization signal through an address or a flag of the signal to be signaled.

According to one or more embodiments of the present disclosure, a neural cluster includes a mesh network for connecting a plurality of blocks, wherein the mesh network includes a plurality of routers each arranged at an intersection formed by a row line and a column line, and a mesh network bus, wherein each of the plurality of routers is connected to one of the plurality of blocks and one or more adjacent routers through the mesh network bus and includes a plurality of ports, and wherein the mesh network bus includes a plurality of channels, wherein the plurality of channels pass through each of the plurality of ports of each of the plurality of routers, and a priority queue is provided for each of the plurality of channels at each of the plurality of ports, and wherein the priority queue includes an index and a queue value corresponding to the index.

In one or more embodiments, a port number of each of the plurality of ports is added as the queue value.

In one or more embodiments, the plurality of ports include a destination port to which the priority queue is applied and one or more source ports different from the destination port, and in the priority queue of the destination port, port numbers of the source ports are added as the queue value.

In one or more embodiments, the priority queue operates in a round robin method.

In one or more embodiments, the round robin method includes a weighted round robin method.

In one or more embodiments, the priority queue is independently programmable for each of the plurality of channels passing through each of the plurality of ports of each of the plurality of routers, and by adjusting the index and the queue value of the priority queue according to a data movement pattern within the neural cluster, weights are assigned per router, channel, and port related to the data movement pattern.

In one or more embodiments, in the weighted round robin method, if the number of the index of the priority queue is a multiple of the number of one or more source ports different from the destination port to which the priority queue is applied, and port numbers of the source ports are equally added as the queue value corresponding to the index, the weights are equally assigned to the source ports.

In one or more embodiments, in the weighted round robin method, if the number of the index of the priority queue is a multiple of the number of one or more source ports different from the destination port to which the priority queue is applied, and port numbers of the source ports are unequally added as the queue value corresponding to the index, the weights are assigned to the source ports as many times as the port numbers of the source ports are added as the queue value.

In one or more embodiments, in the weighted round robin method, if the number of the index of the priority queue is not a multiple of the number of one or more source ports different from the destination port to which the priority queue is applied, and port numbers of the source ports are unequally added as the queue value corresponding to the index, the weights are assigned to the source ports as many times as the port numbers of the source ports are added as the queue value.

In one or more embodiments, in the priority queue, if a first queue value is served at a first time, at a second time, one or more queue values that were lower in priority than the first queue value at the first time are set to increase by one priority, and the first queue value is set as the lowest priority of the priority queue, and if a second queue value is served at the second time, at a third time, one or more queue values that were lower in priority than the second queue value at the second time are set to increase by one priority, and the second queue value is set as the lowest priority of the priority queue that is lower in priority than the first queue value.

In one or more embodiments, the priority queue further includes an enable flag set for each index.

In one or more embodiments, if the queue value of the index corresponding to the enable flag is to be used, an enable flag signal indicating the enable flag is activated, and if the queue value of the index corresponding to the enable flag is not to be used, the enable flag signal is deactivated.

According to embodiments of the present disclosure, by including an on-chip shared memory, a neural cluster facilitates access to the shared memory of neural cores, and efficiently performs computation tasks with high dependencies between the neural cores. In addition, since the shared memory is arranged in the central portion of the neural cluster, the variation in signal path length to reach the shared memory from the neural cores is reduced, thereby making the latency when neural cores access the shared memory as uniform as possible.

According to embodiments of the present disclosure, by applying a mesh network to the neural cluster to provide full connectivity between components, components inside and outside the neural cluster can easily access any desired shared memory or neural core, and thus the shared memory within the neural cluster can be easily utilized as a global memory.

According to embodiments of the present disclosure, by applying an interleaving process to a neural cluster including a mesh network, traffic is distributed without concentration, improving the utilization efficiency and bandwidth of the entire shared memory, and further improving the bandwidth of the mesh network.

According to embodiments of the present disclosure, since interleaving is performed by parsing system addresses in a network interface unit, a separate interleaving management entity is not required, thereby reducing system overhead required for management.

According to embodiments of the present disclosure, the network interface unit maps the AXI-W channel and the AXI-R channel to a single data channel, so that the number of data channels in the mesh network can be reduced in half as compared to the case where they are not mapped. In addition, by integrating the AXI-AW channel into the same data channel and transmitting write and read data and write addresses through a single channel, signal lines can be further reduced, thereby saving physical space occupied by signal lines in the mesh network and reducing chip area.

According to embodiments of the present disclosure, by integrating and signaling control signals and synchronization signals through a single control channel, the area occupied by the mesh network can be reduced, and high scalability can be provided. In addition, in signaling on the control channel, stability can be ensured by maintaining a non-posted write method for control signals, and fast signaling without deadlock can be achieved by using a posted write method for synchronization signals without being constrained by the limitation of MO count.

According to embodiments of the present disclosure, in signaling between an internal block of the neural cluster that follows the posted write method for synchronization signal signaling and an external block that follows the non-posted write method, the network interface unit directly discards or generates synchronization responses according to the signaling method of each block, thereby enabling smooth exchange of synchronization signals even between blocks with different signaling methods.

According to embodiments of the present disclosure, by introducing priority queues in routers within the mesh network of the neural cluster and controlling the priority queues according to data movement patterns caused by AI workloads, data transfer paths and data transfer amounts can be flexibly and efficiently managed.

According to embodiments of the present disclosure, by providing a priority queue to which a weighted round robin method is applied for each of a plurality of channels passing through each of a plurality of ports of each of a plurality of routers, weights can be assigned per router, channel, and port related to the data movement pattern, and data transfer paths and data transfer amounts can be controlled.

According to embodiments of the present disclosure, by adding an enable flag to an index of the priority queue, desired weights can be assigned to desired indices, and furthermore, the queue depth, whether to use queue values, and the degree of weight assignment of the priority queue can be independently controlled.

According to embodiments of the present disclosure, by determining whether an atomic transfer is to be performed through a separately added flag in a data packet without unpacking the data packet, a buffer for storing unpacked data packets or data decoding logic for decoding data packets is unnecessary, and latency occurring during the unpacking process of data packets can be eliminated. In addition, by supporting atomic transfer, a reorder buffer for reordering fragmented data is unnecessary. As a result, the structure of the router is simplified, so hardware resources of the entire mesh network can be saved.

The effects according to the technical idea of the present disclosure are not limited to the effects mentioned above, and various unmentioned effects can be clearly understood by those skilled in the art from the present disclosure.

BRIEF DESCRIPTION OF THE DRAWINGS

Embodiments will be more clearly understood from the following detailed description taken in conjunction with the accompanying drawings in which:

FIG. 1 is a diagram for explaining a neural processing SoC according to embodiments of the present disclosure.

FIG. 2 is a diagram for explaining a neural cluster of FIG. 1.

FIG. 5 is a diagram for explaining a neural core unit of FIG. 4.

FIG. 9 is a diagram for explaining a process in which requests are processed according to an interleaving process according to embodiments of the present disclosure.

FIGS. 11A to 11C are diagrams for specifically explaining a method of parsing system addresses in an interleaving process according to embodiments of the present disclosure.

FIG. 23 is a diagram for explaining the configuration of the router of the mesh network having a priority queue according to embodiments of the present disclosure.

FIG. 26 is a diagram for explaining the configuration for controlling the priority queue according to a data movement pattern within the neural cluster according to embodiments of the present disclosure.

DETAILED DESCRIPTION

Figure 3:
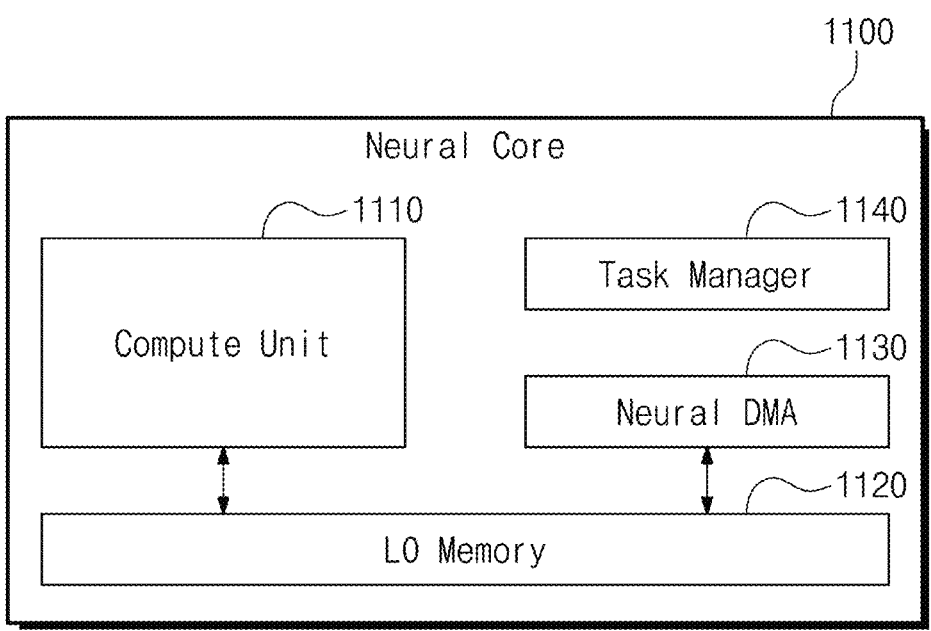
FIG. 3 is a diagram for explaining a neural core of FIG. 2.

Hereinafter, specific embodiments of the present disclosure will be described in detail with reference to the accompanying drawings. In the present specification, specific descriptions of well-known functions or configurations are omitted when there is a concern that they may unnecessarily complicate or obscure the essence of the present disclosure.

The advantages, features, and achieving methods of the disclosed embodiments will be clearly understood by referring to the accompanying drawings and the embodiments described later. However, the present disclosure is not limited to these embodiments and can be implemented in various forms. These embodiments are examples provided to help the overall understanding of the present disclosure and are not intended to limit the scope of the present disclosure.

In the accompanying drawings, identical or similar components are given identical reference numerals. In addition, when describing embodiments of the present disclosure, descriptions of identical or similar components may be omitted to avoid duplicate descriptions. However, this omission of description is not intended to mean that the corresponding component is not included in a particular embodiment.

The terms used in this specification fully reflect the functions of the invention and have been selected from terms currently generally used in the art, but these may vary depending on the views of those skilled in the relevant field or new technological developments. In addition, in specific cases, there may be terms arbitrarily selected by the applicant, and in this case, their meaning will be described in detail in the specification. Therefore, the terms in this specification should be interpreted based on their meaning and the overall context of the present disclosure, rather than merely as names.

When a term is expressed in the singular in this specification, it may also include a plural meaning unless explicitly limited to the singular. Conversely, when expressed in the plural, it may be interpreted as singular in context unless explicitly limited to plural. Throughout the specification, when a specific part is said to include a certain component, this means that additional components may be included, rather than excluding other components.

In this specification, the expression "each of a plurality of A" or "a plurality of A each" may refer to each of all elements included in a plurality of A, or may refer to each of some elements of a plurality of A.

In this specification, the expression "one or more A" or "at least one A" may mean a set of one or more of A unless clearly expressed otherwise in context.

The expressions "may include," "may be provided with," "may have," etc., used in this specification mean the existence of a corresponding feature (e.g., function, operation, or component, etc.) and do not exclude the existence of additional other features. That is, these expressions should be understood as open-ended terms that allow for the inclusion of other embodiments.

The expression "configured to" as used herein may have meanings such as "set to," "having the capability to," "modified to," "made to," or "able to," depending on the context. This expression is not limited to "specifically designed in hardware," and for example, a processor configured to perform a specific operation may be a general-purpose processor capable of performing the operation through software execution, or a special-purpose computer structured through programming to perform the specific operation.

The terms "connect," "transmit," "receive," etc., used in this specification may mean direct connection, transmission, and reception between components, or may mean indirect connection, transmission, and reception with other components interposed therebetween.

The terms "master" and "slave" used in this specification may be used in their general meanings. However, when describing networks or signaling, the terms of the master and the slave may be used simply to indicate the subject (e.g., a block, etc.) of transmission and reception of signal (e.g., request, etc.). For example, both the master and the slave can be a "sender" as the subject of signal transmission, and can be a "receiver" as the subject of signal reception. Alternatively, the master may refer to the sender itself as the subject of signal transmission, and the slave may refer to the receiver itself as the subject of signal reception.

Figure 1:
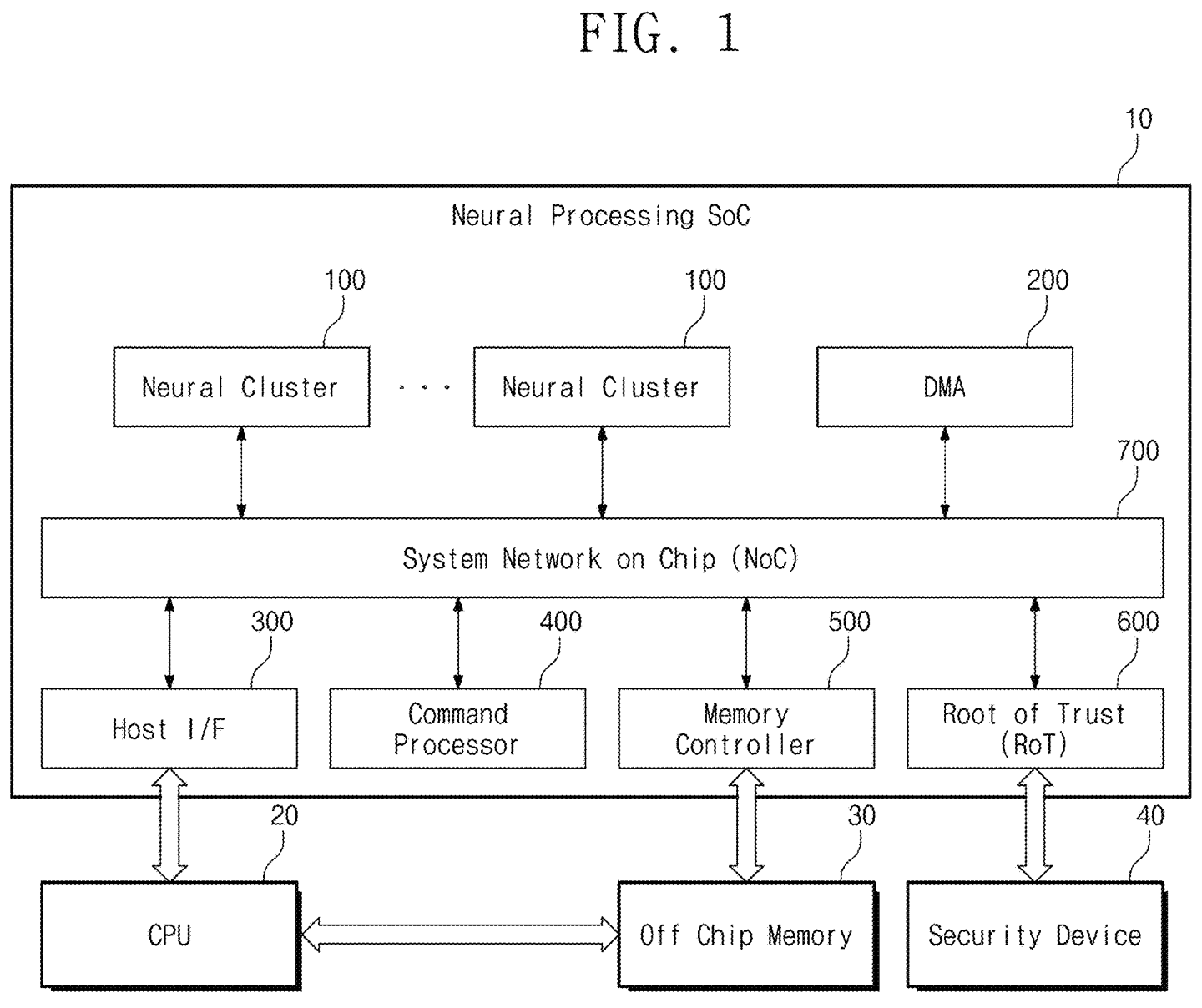

FIG. 1 is a diagram for explaining a neural processing SoC according to embodiments of the present disclosure.

A neural processing SoC (System on a Chip) 10 according to embodiments of the present disclosure may include a neural cluster 100, a DMA (Direct Memory Access) 200, a host interface 300, a command processor 400, a memory controller 500, a RoT (Root of Trust) 600, and a system NoC (Network on Chip) 700. The DMA 200, the host interface 300, the memory controller 500, and the RoT 600 can each be implemented as a circuit or circuitry.

The neural processing SoC 10 may be configured in a system-on-chip form and may be a device specialized in artificial neural network model operations. The neural processing SoC 10 may be an artificial neural network accelerator. The neural processing SoC 10 may perform operations such as computations by communicating with a CPU (Central Processing Unit) 20, an off-chip memory 30, and a security device 40.

The CPU 20 may be a general-purpose operation processor. The CPU 20 may not be suitable for neural network operation(s) of deep learning. Therefore, the CPU 20 may request neural network operations to the neural processing SoC 10. The CPU 20 may transmit a command stream to the neural processing SoC 10 to instruct neural network operations. The CPU 20 may receive neural network operation results from the neural processing SoC 10. The CPU 20 may be connected to the off-chip memory 30.

In this specification, a command stream may be a set of commands for controlling the overall workflow of the system. A command stream may include multiple tasks and may define the execution order and workflow of each task. For example, a command stream may control the entire workflow including data loading, operation execution, and result storage. A task is a unit of work that constitutes a command stream and may be performed to achieve a specific purpose. A task may include operations such as matrix multiplication and convolution operations. Some tasks may trigger the execution of an instruction set. An instruction may include basic operation units such as reading data from memory, performing operations, and writing data to memory.

The off-chip memory 30 may be a memory chip located outside the chip, distinguished from the neural processing SoC 10 and the CPU 20. The off-chip memory 30 may include non-volatile memory and volatile memory.

For example, non-volatile memory may include ROM (Read Only Memory), EEPROM (Electrically Erasable Programmable Read-Only Memory), flash memory, MRAM (Magnetic RAM), spin-transfer torque MRAM, CBRAM (Conductive bridging RAM), FeRAM (Ferroelectric RAM), PRAM (Phase change RAM), etc., but the present disclosure is not limited thereto. For example, volatile memory may include DRAM (Dynamic random access memory), SRAM (Static random access memory), SDRAM (Synchronous Dynamic Random Access Memory), etc., but the present disclosure is not limited thereto.

The off-chip memory 30 may be configured in various forms such as a single chip, a memory module, a memory card, a stacked memory chip, a chiplet including memory, etc., but the present disclosure is not limited thereto. The security device 40 may be a device that supports security and debugging functions such as secure boot firmware.

The neural cluster 100 may be a device that processes neural network operations. The neural cluster 100 may be connected to the DMA 200, the host interface 300, the command processor 400, the memory controller 500, and the RoT 600 through a system NoC 700. In addition, the neural cluster 100 may be connected to other neural clusters 100 through the system NoC 700. Although two neural clusters 100 are illustrated in FIG. 1, the present disclosure is not limited thereto. That is, the neural processing SoC 10 may include three or more neural clusters 100, or may include one neural cluster 100. In addition, each neural cluster 100 may be the same or similar processor, or may be heterogeneous processors.

The neural cluster 100 according to embodiments of the present disclosure may include a shared memory. The shared memory may be shared by neural cores included in the neural cluster 100. In addition, the shared memory may be shared by other components of the neural processing SoC 10 outside the neural cluster 100. That is, the shared memory can also operate as a global memory.

The DMA 200 can directly transfer data between memory and peripheral devices without the intervention of the CPU 20 or the neural cluster 100 connected through the host interface 300. The DMA 200 can thereby minimize interrupts to processors such as the CPU 20 and the neural cluster 100, and support parallel processing tasks to improve system performance. For example, the DMA 200 can control data movement between shared memories within the neural cluster 100, data movement between shared memory and external off-chip memory 30, data movement between off-chip memories 30, data movement between the shared memory of the neural cluster 100 and the shared memory of another neural cluster 100, and so on.

The host interface 300 can perform communication between the neural processing SoC 10 and the CPU 20. Through the host interface 300, the neural processing SoC 10 can receive a command stream from the CPU 20 and transmit operation results and status information of the neural processing SoC 10 to the CPU 20.

For example, the host interface 300 may perform communication based on communication protocols such as PCIe (Peripheral Component Interconnect express), SPI (Serial Peripheral Interconnect), USB (Universal Serial Bus), MIPI (Mobile Industry Processor Interface), MDDI (Mobile Display Digital Interface), MVI (Mobile Video Interface), SATAe (Serial Advanced Technology Attachment express), etc. However, this is merely an example, and the present disclosure is not limited thereto.

A command processor 400 can receive a command stream from the CPU 20 via the host interface 300. The command processor 400 can generate one or more tasks based on the received command stream and transmit them to the neural cluster 100 and the DMA 200. The DMA 200 can read data (e.g., weights, input data, etc.) required for task execution from the shared memory of other neural clusters 100 or read it from off-chip memory 30 in conjunction with a memory controller 500 and transmit it to the neural cluster 100. The neural cluster 100 can perform neural network operations based on the received tasks and data and transmit task progress status (e.g., completion signals) to the command processor 400. The command processor 400 can receive data transfer status, task progress status, etc., from the DMA 200 and the neural cluster 100.

A memory controller 500 can be connected to an off-chip memory 30. If the off-chip memory 30 includes volatile memory, the memory controller 500 may include a volatile memory controller for controlling operations of the volatile memory such as data reading, writing, and refreshing. If the off-chip memory 30 includes non-volatile memory, the memory controller 500 may include a non-volatile memory controller for controlling operations of the non-volatile memory such as data reading, writing, and wear leveling. The memory controller 500 can perform control operations of the off-chip memory 30 through commands from, for example, the neural cluster 100, the DMA 200, and the command processor 400.

The RoT 600 is responsible for the security of the neural processing SoC 10 and can perform tasks such as secure booting, firmware integrity verification, and maintaining system integrity during execution. The RoT 600 can perform security procedures by communicating with an external security device 40.

The system NoC 700 can interconnect the neural cluster 100, the DMA 200, the host interface 300, the command processor 400, the memory controller 500, and the RoT 600. Through the system NoC 700, data, control signals, etc., can be exchanged between the neural cluster 100, the DMA 200, the host interface 300, the command processor 400, the memory controller 500, and the RoT 600. In addition, through the system NoC 700, synchronization signals for controlling synchronization between neural clusters 100 can be exchanged between the neural clusters 100.

For example, the system NoC 700 can be configured in various forms such as a multi-layer architecture, a bus-based network structure, or a ring structure, but the present disclosure is not limited thereto.

Neural network operations of the neural processing SoC 10 can be performed through the following process. First, the CPU 20 can transmit a command stream for neural network operations to the neural processing SoC 10. The command processor 400 can generate one or more tasks based on the received command stream and transmit them to the neural cluster 100 and the DMA 200. Simultaneously or sequentially, operation-related data such as weights and input data of the neural network for neural network operations can move from the off-chip memory 30 to the memory (e.g., shared memory inside the neural cluster 100) of the neural processing SoC 10. Data movement can be performed by the memory controller of the CPU 20 under the control of the CPU 20, or by the memory controller 500 of the neural processing SoC 10 under the control of the DMA 200 of the neural processing SoC 10. The neural cluster 100 of the neural processing SoC 10 can perform neural network operations based on input data, weights, and tasks. The operation results can be stored in the memory of the neural processing SoC 10 or the off-chip memory 30. The CPU 20 can read the operation results from the memory.

Each neural cluster 100 according to embodiments of the present disclosure may include shared memory that can be shared by components of the neural processing SoC 10. In FIG. 1, the neural processing SoC 10 is illustrated as not including a separate global memory (in addition to the shared memory included in the neural cluster 100) that can be shared by components. However, in another embodiment, the neural processing SoC 10 may further include a separate global memory (e.g., an SoC-level L2 cache memory) in addition to the shared memory inside the neural cluster 100.

FIG. 2 is a diagram for explaining the neural cluster of FIG. 1.

A neural cluster 100 according to embodiments of the present disclosure may include a neural core unit 1000, a shared memory unit 2000, and a mesh network 3000.

The neural cluster 100 may include a plurality of neural core units 1000. Each of the plurality of neural core units 1000 may include a neural core 1100 and a network interface unit. The network interface unit of the neural core unit 1000 may include a master network interface unit 1200 and a slave network interface unit 1300.

The neural core 1100 may be configured to process neural network operations. The neural core 1100 may receive a task and perform operations according to the task. The neural core 1100 may transmit a task completion signal to the command processor 400 through the mesh network 3000.

The master network interface unit 1200 and the slave network interface unit 1300 can relay signal transmission and reception between the neural core 1100 and other components.

Although four neural core units 1000 are illustrated in FIG. 2, the neural cluster 100 may include five or more neural core units 1000 or three or less neural core units 1000, and the present disclosure is not limited thereto.

The neural core unit 1000, the master network interface unit 1200, the slave network interface unit 1300, and the shared memory unit 2000 can each be implemented as a circuit or circuitry.

The neural cluster 100 may include a plurality of shared memory units 2000. Each of the plurality of shared memory units 2000 may include a shared memory 2100 and a network interface unit. The network interface unit of the shared memory unit 2000 may include a slave network interface unit 1300.

The shared memory 2100 can be shared by a plurality of neural core units 1000 including neural cores 1100 of the neural cluster 100 where the shared memory 2100 is located. In addition, the shared memory 2100 can be shared by other components of the neural processing SoC 10 outside the neural cluster 100 where the shared memory 2100 is located, for example, by a plurality of neural core units 1000 of another neural cluster 100. That is, the shared memory 2100 can correspond to an L1 cache memory.

The shared memory 2100 can store data received from the off-chip memory 30. The neural cluster 100 can perform neural network operations based on the data stored in the shared memory 2100. Data stored in the shared memory 2100 can be moved to the off-chip memory 30 under the control of the DMA 200 or the like. For example, the shared memory 2100 can store input data, weights, task information, intermediate operation results, operation results, etc.

For example, the shared memory 2100 may be a memory with relatively fast access speed, such as SRAM. However, this is merely an example, and the shared memory 2100 may include various types of memory such as DRAM, and the present disclosure is not limited thereto.

Although two shared memory units 2000 are illustrated in FIG. 2, the neural cluster 100 may include three or more shared memory units 2000 or one shared memory unit 2000, and the present disclosure is not limited thereto.

The mesh network 3000 can connect a plurality of neural cores 1100 and a plurality of shared memories 2100. That is, the mesh network 3000 can connect a plurality of neural core units 1000 and a plurality of shared memory units 2000.

The neural cluster 100 according to embodiments of the present disclosure may include shared memory 2100 in the central portion of the neural cluster 100. By arranging the on-chip shared memory 2100 inside the neural cluster 100, access to the shared memory 2100 from the neural cores 1100 can be facilitated. Therefore, computation tasks with high data interdependencies between neural cores 1100 can be efficiently performed.

In addition, the neural cluster 100 according to embodiments of the present disclosure can provide full connectivity by connecting the plurality of neural cores 1100 and the plurality of shared memories 2100 through the mesh network 3000. The mesh network 3000 will be described in detail with reference to FIGS. 4 to 7.

Furthermore, according to embodiments of the present disclosure, the shared memory 2100 can support data interleaving to operate efficiently without bandwidth loss while being shared by various components of the neural processing SoC 10. Data interleaving will be described in detail with reference to FIGS. 8 to 11.

FIG. 3 is a diagram for explaining the neural core of FIG. 2.

The neural core 1100 may include a compute unit 1110, an L0 memory 1120, a neural DMA 1130, and a task manager 1140. The compute unit 1110, neural DMA 1130, and task manager 1140 can each be implemented as a circuit or circuitry.

The compute unit 1110 can perform various computation tasks. The compute unit 1110 can combine SIMD (Single Instruction Multiple Data) operation elements and MIMD (Multiple Instruction Multiple Data) operation elements. SIMD is suitable for repeatedly applying the same operation to a plurality of data by processing a plurality of data elements simultaneously with a single instruction, while MIMD utilizes instruction-level parallelism by executing different instructions simultaneously to process different data. The compute unit 1110 can optimize parallel performance and instruction-level dependency control in various operation scenarios by combining SIMD and MIMD operation elements.

The compute unit 1110 may be connected to the L0 memory 1120. The compute unit 1110 uses the L0 memory 1120 as a cache memory and can write data such as intermediate calculation results to the L0 memory 1120 or read necessary data (e.g., input data, operation instructions, weights, etc.) from the L0 memory 1120 during the operation process. Input data may be operation target data read from an external memory (e.g., shared memory 2100) to the L0 memory 1120. Intermediate calculation results may be data generated by the compute unit 1110 during operation and stored in the L0 memory 1120. In addition, the compute unit 1110 can perform operations based on operation instructions stored in the L0 memory 1120, and can accelerate operation speed by caching data frequently used in the operations in the L0 memory 1120.

The L0 memory 1120 may be connected to the compute unit 1110 and the neural DMA 1130. The L0 memory 1120 can operate as a cache memory that stores data or instructions necessary for the operations of the compute unit 1110 and the neural DMA 1130. For example, the L0 memory 1120 may be SRAM, but it may be various other types of memory in addition to SRAM, and the present disclosure is not limited thereto.

The neural DMA 1130 may be connected to the L0 memory 1120. The neural DMA 1130 may manage data transfer between the L0 memory 1120 and the shared memory 2100.

The task manager 1140 may be designed to operate with the command processor 400 to maximize the utilization of the operational resources of each neural core 1100. The task manager 1140 can manage task queues of the neural cores 1100, synchronization of the neural cores 1100, task priorities, or the like. The task manager 1140 can control synchronization between the neural cores 1100. Through this, tasks distributed by the command processor 400 can be performed simultaneously among the neural cores 1100.

Figure 4:
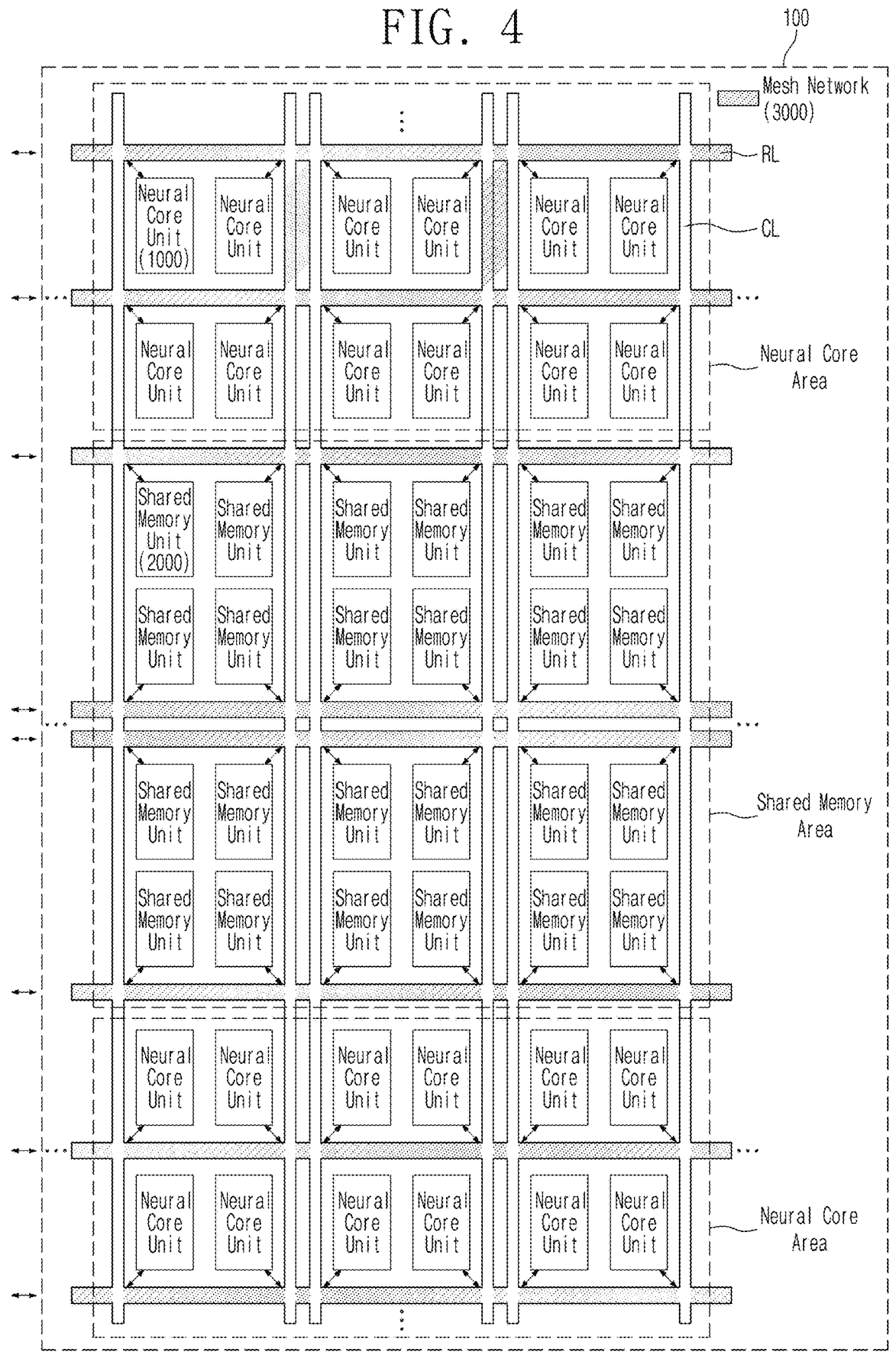
FIG. 4 is a diagram for explaining the arrangement of components of the neural cluster of FIG. 1.

FIG. 4 is a diagram for explaining the arrangement of components of the neural cluster of FIG. 1.

The neural cluster 100 may include the neural core unit 1000, the shared memory unit 2000, and the mesh network 3000. That is, the neural cluster 100 may include the mesh network 3000 and a plurality of blocks connected to the mesh network 3000, and each of the plurality of blocks may be the neural core unit 1000 or the shared memory unit 2000, but the present disclosure is not limited thereto.

The neural cluster 100 may include a plurality of neural core units 1000. The plurality of neural core units 1000 may be arranged symmetrically above and below a shared memory area where the plurality of shared memory units 2000 are arranged within the neural cluster 100. The area where the neural core unit 1000 is located can be referred to as a neural core area. In this specification, the neural core unit 1000 may be referred to as one block or component.

The neural cluster 100 may include a plurality of shared memory units 2000. The plurality of shared memory units 2000 may be arranged in the central portion of the neural cluster 100. The area where the shared memory unit 2000 is located can be referred to as a shared memory area. In this specification, the shared memory unit 2000 may be referred to as one block or component.

However, the arrangement and mutual positional relationship between the plurality of neural core units 1000 and the plurality of shared memory units 2000 within the neural cluster 100 are not limited to the examples described herein.

The mesh network 3000 can connect the plurality of neural core units 1000 and the plurality of shared memory units 2000. The mesh network 3000 can be arranged in a mesh-like form between units to connect the units to each other. One neural core unit 1000 or one shared memory unit 2000 can be connected at each intersection where row lines (RL) and column lines (CL) of the mesh network 3000 intersect to each other.

As will be described later with reference to FIG. 7, one router can be arranged at each intersection where the row lines (RL) and the column lines (CL) of the mesh network 3000 intersect to each other. The router may be connected to one neural core unit 1000 or one shared memory unit 2000.

As one or more embodiments, the neural core units 1000 or shared memory units 2000 may be arranged in a regular form and connected to the routers 3100 of the mesh network 3000.

For example, the plurality of neural core units 1000 or the plurality of shared memory units 2000 may be arranged below one row line (RL) and connected to a plurality of routers 3100 arranged on the one row line (RL). In another example, the plurality of neural core units 1000 or the plurality of shared memory units 2000 may be arranged above one row line (RL) and connected to a plurality of routers 3100 arranged on the one row line (RL).

For example, the plurality of neural core units 1000 or the plurality of shared memory units 2000 may be arranged on the left side of one column line (CL) and connected to a plurality of routers 3100 arranged on the one column line (CL). In another example, the plurality of neural core units 1000 or the plurality of shared memory units 2000 may be arranged on the right side of one column line (CL) and connected to a plurality of routers 3100 arranged on the one row line (CL).

However, this is merely an example, and the plurality of neural core units 1000 or the plurality of shared memory units 2000 may be arranged in various forms such as a zigzag pattern with respect to the row line (RL) or column line (CL) and connected to a plurality of routers 3100 of the row line (RL) or the column line (CL), and the present disclosure is not limited thereto.

In one or more embodiments of FIG. 4, the neural core units 1000 are arranged in 4 rows with 6 units per row, and the shared memory units 2000 are arranged in 4 rows with 6 units per row, so that a total of 24 neural core units 1000 and 24 shared memory units 2000 are arranged within the neural cluster 100. However, this is merely an example, and the neural core units 1000 and the shared memory units 2000 can be configured in any number, and the present disclosure is not limited thereto.

Although only the neural core unit 1000, the shared memory unit 2000, and the mesh network 3000 are illustrated in FIG. 4, various peripheral circuits such as a circuit for setting router IDs and a circuit for controlling signal movement paths of the mesh network 3000 may be additionally included in the neural cluster 100.

In the neural cluster 100 according to embodiments of the present disclosure, the shared memory units 2000 can be arranged in the central portion (i.e., the shared memory area), and the neural core units 1000 can be arranged above and below the shared memory area. Specifically, the neural core units 1000 can be arranged symmetrically above and below the shared memory area.

Through this arrangement, variations in signal path length for each neural core unit 1000 to reach the shared memory area can be reduced. For example, if there is a variation in the physical signal path length from the neural core unit 1000 to the shared memory area, the access timings to the shared memory area among the plurality of neural cores 1100 may not be consistent, which may degrade the overall operating speed and efficiency of the neural cluster 100. In contrast, as in the embodiments of the present disclosure, if the physical signal path length from each neural core unit 1000 to the shared memory area is similarly configured, the data latency of the shared memory 2100 for each neural core 1100 can be secured as uniformly as possible in terms of physical aspects.

In addition, through the above-described arrangement and the introduction of the mesh network 3000, signals can move in all directions (up, down, left, and right), and various signal paths can be configured.

As a result, the efficiency of parallel operations increases, and data processing delay decreases when performing neural network operations, thereby improving the overall performance of the neural cluster 100.

The detailed configuration of the neural core unit 1000 and the shared memory unit 2000 will be described below.

Figure 5:
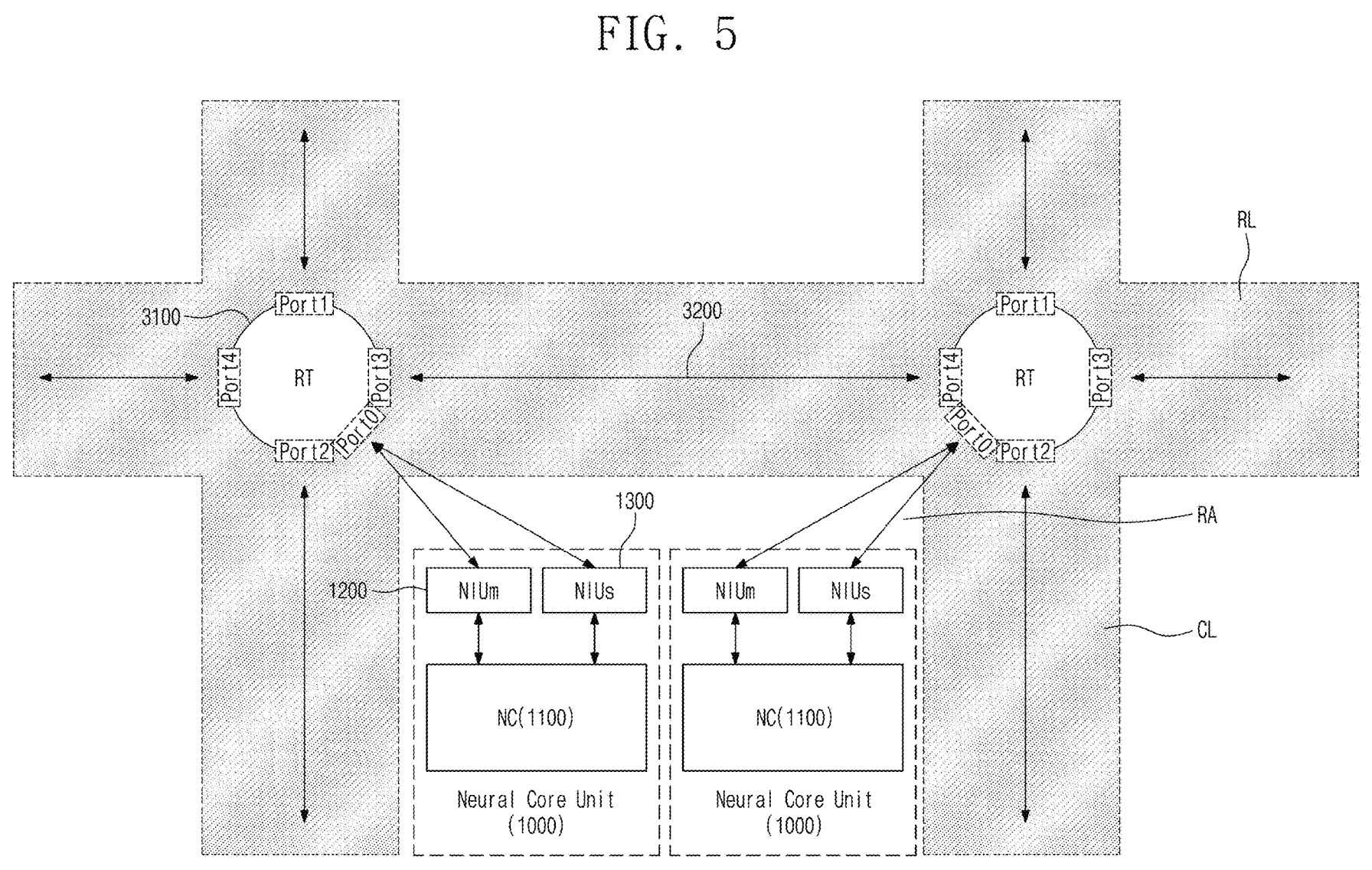

FIG. 5 is a diagram for explaining the neural core unit of FIG. 4.

The mesh network 3000 may include the plurality of routers 3100 respectively arranged at intersections formed by row lines (RL) and column lines (CL). In addition, the mesh network 3000 may include a mesh network bus 3200 that connects adjacent routers 3100 and connects the routers 3100 to the neural core units 1000 or the shared memory units 2000. The detailed configuration of the mesh network bus 3200 will be described with reference to FIGS. 12 to 15. The router 3100 can be implemented as a circuit or circuitry.

The mesh network 3000 may include the plurality of routers 3100. Each of the plurality of routers 3100 may further include four ports (Port1 to Port4) in up, down, left, and right directions, and one port (Port0) connected to an additional unit in a diagonal direction. Each of the plurality of routers 3100 can be connected to one or more adjacent routers 3100 through the mesh network bus 3200 connected to each of first to fourth ports (Port1 to Port4). In addition, each of the plurality of routers 3100 can be connected to components outside the neural cluster 100 through a mesh network bus 3200 connected to each of the first to fourth ports (Port1 to Port4) and a network interface unit connected to the mesh network bus 3200. Each of the plurality of routers 3100 may be connected to one of the plurality of neural core units 1000 or one of the plurality of shared memory units 2000 through the mesh network bus 3200 connected to a zeroth port (Port0). For example, in FIG. 5, the router 3100 can be connected to the neural core unit 1000 through the zeroth port (Port0) and the mesh network bus 3200. That is, the neural core unit 1000 can be connected to the router 3100 located at the intersection formed by the row line (RL) and the column line (CL) of the mesh network 3000.

The neural core unit 1000 may include the neural core 1100 and the network interface unit. The network interface unit of the neural core unit 1000 may include the master network interface unit 1200 and the slave network interface unit 1300. The neural core unit 1000 may be connected to the router 3100 through the zeroth port (Port0) in a diagonal direction of the router 3100.

The master network interface unit 1200 can receive requests, data, synchronization signals, etc. from the neural core 1100 and transmit them to the router 3100, or receive responses, data, etc. through the router 3100 and transmit them to the neural core 1100. For example, requests may include requests for data reading, writing, or the like in the shared memory 2100. The master network interface unit 1200 can remap the address (e.g., specific shared memory unit 2000) to which requests and data are to be transmitted as a router ID and transmit it to the router 3100. In addition, synchronization signals of the neural core 1100 can also be transmitted to the task manager 1140 of another neural core 1100 through the master network interface unit 1200.

The slave network interface unit 1300 can receive tasks, data, or the like transmitted through the router 3100 and transmit them to the neural core 1100. For example, a task may include a task related to neural network operations. Data may include input data, weight data, and so on.

The neural core 1100 can process tasks received through the slave network interface unit 1300. Tasks may include operations related to neural network operations, such as matrix multiplication and convolution operations. The neural core 1100 can provide a task completion signal to the router 3100 through the master network interface unit 1200 or the slave network interface unit 1300 after performing operations according to instructions.

Figure 6:
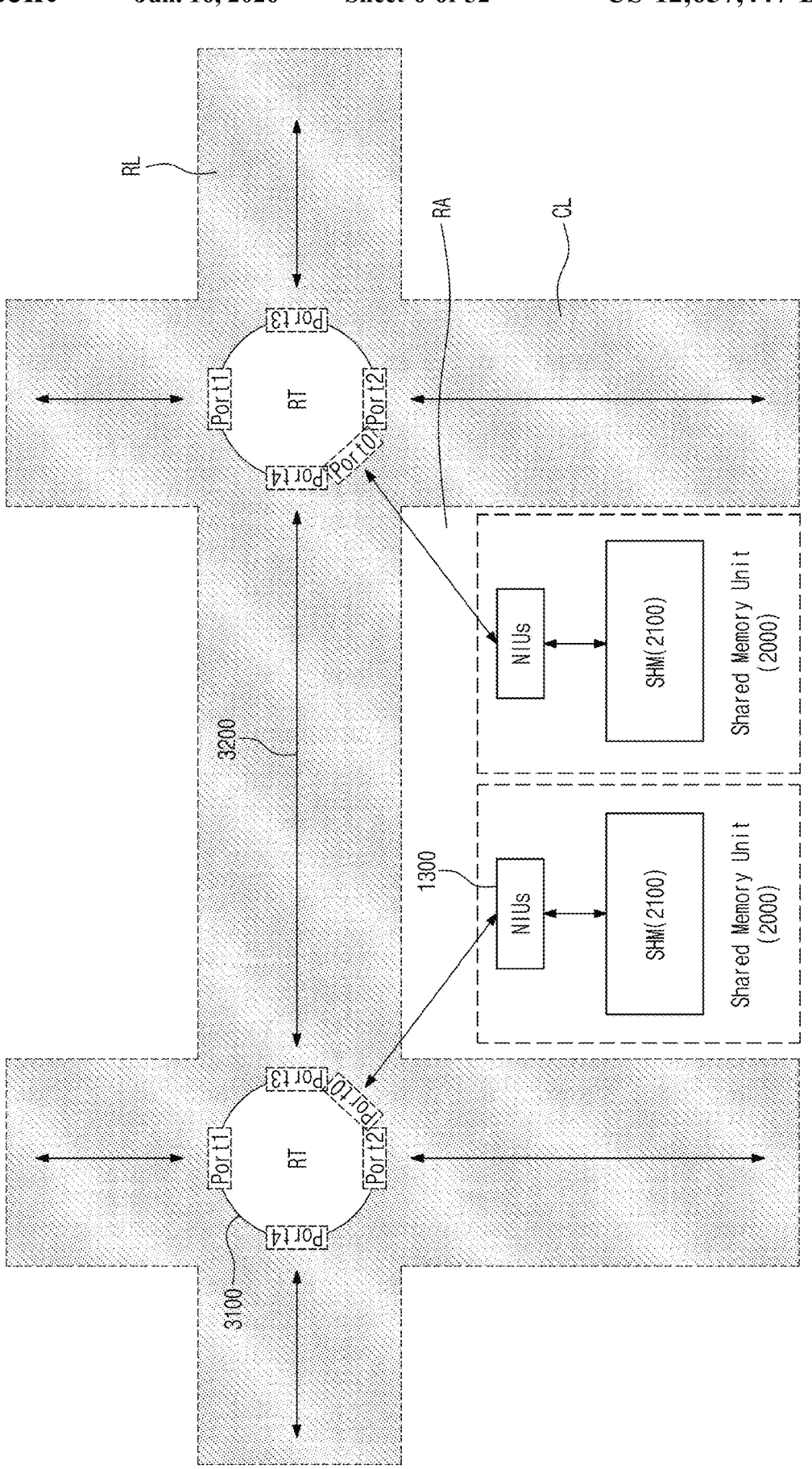
FIG. 6 is a diagram for explaining a shared memory unit of FIG. 4.

FIG. 6 is a diagram for explaining the shared memory unit of FIG. 4.

The shared memory unit 2000 may include the shared memory 2100 and the network interface unit. The network interface unit of the shared memory unit 2000 may include the slave network interface unit 1300. The shared memory unit 2000 may be connected to the router 3100 through the mesh network bus 3200 connected to the zeroth port (Port0) in a diagonal direction of the router 3100. That is, the shared memory unit 2000 can be connected to the router 3100 located at the intersection formed by the row line (RL) and the column line (CL) of the mesh network 3000.

The slave network interface unit 1300 can receive requests, data, etc., transmitted through the router 3100 and transmit them to the shared memory 2100. For example, requests may include requests for data reading, writing, or the like in the shared memory 2100. The slave network interface unit 1300 can transmit processed data (e.g., data read from the shared memory 2100) according to the received request to the router 3100. Since the shared memory unit 2000 performs passive operations, it may include only the slave network interface unit 1300.

The shared memory 2100 can perform data processing requests transmitted from the slave network interface unit 1300. For example, upon receiving a write request, the shared memory 2100 can receive an address and data through the slave network interface unit 1300 and write the data to the address. Alternatively, upon receiving a read request, the shared memory 2100 can receive an address and data through the slave network interface unit 1300 and provide the data read from the address to the slave network interface unit 1300. The shared memory 2100 can provide a task completion signal to the slave network interface unit 1300 after performing a data processing request.

The operating clock speed of the shared memory 2100 may be the same as or slower than that of the L0 memory 1120. However, this is merely an example, and the present disclosure is not limited thereto.

Figure 7:
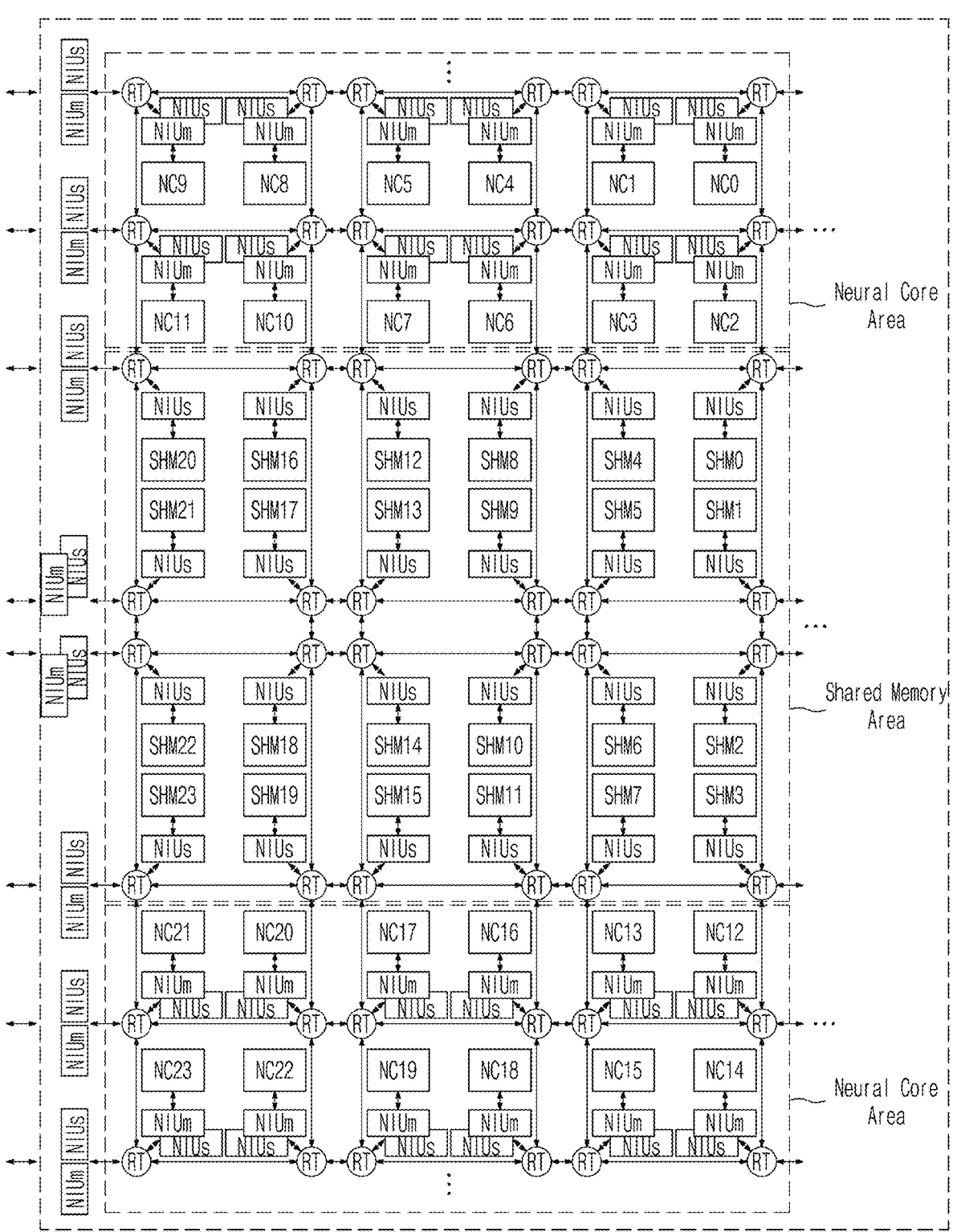
FIG. 7 is a diagram for explaining the connection relationship between the mesh network and components of FIG. 4.

FIG. 7 is a diagram for explaining the connection relationship between the mesh network and components of FIG. 4.

The mesh network 3000 can be arranged in a mesh structure and connect respective components (blocks) to each other. Through the mesh network 3000, data, control signals, etc. can freely move between the components of the neural cluster 100. For example, the neural core unit 1000 can communicate with any desired neural core unit 1000 or shared memory unit 2000 through the mesh network 3000.

The mesh network 3000 may include the plurality of routers (RT) 3100. The plurality of routers 3100 may be respectively arranged at the intersections formed by the row lines (RL) and the column lines (CL) of the mesh network 3000. Each of the plurality of routers 3100 is connected to an adjacent router 3100 through the mesh network bus 3200 and may be connected to the shared memory (SHM) 2100 or the neural core (NC) 1100 in a diagonal direction. The router 3100 can vary the signal path within the router 3100 to output a signal input from one port to another port according to a router control signal. Various algorithms can be used to control the router 3100 in the mesh network 3000 to configure signal paths, and the present disclosure is not limited thereto.

The neural cores 1100 or the shared memories 2100 can be arranged in a regular form and connected to the routers 3100 of the mesh network 3000. For example, the plurality of neural cores 1100 may be arranged below or above one row line (RL) and connected to a plurality of routers 3100 arranged on the one row line (RL) through the master network interface unit 1200 and the slave network interface unit 1300. The plurality of shared memories 2100 may be arranged below or above one row line (RL) and connected to the plurality of routers 3100 arranged on the one row line (RL) through the slave network interface unit 1300. In addition, the plurality of neural cores 1100 may be arranged on the left or right side of one column line (CL) and connected to the plurality of routers 3100 arranged on the one column line (CL) through the master network interface unit 1200 and the slave network interface unit 1300. The plurality of shared memories 2100 may be arranged on the left or right side of one column line (CL) and connected to the plurality of routers 3100 arranged on the one column line (CL) through the slave network interface unit 1300. However, this is merely an example, and the plurality of neural cores 1100 or the plurality of shared memories 2100 can be arranged in various forms and connected to the plurality of routers 3100, and the present disclosure is not limited thereto.

Signal movement operations within the mesh network 3000 can be performed as follows. First, the master network interface unit 1200 can receive a request, data, and an address from the neural core 1100 or an external component. The address may include a system address. The master network interface unit 1200 can identify the final destination (e.g., a specific neural core 1100 or shared memory 2100, etc.) based on the received address. The master network interface unit 1200 can remap the address to the ID of the router connected to the final destination. The master network interface unit 1200 can transmit the remapped address, request, and data to the connected router 3100. The router 3100 can transmit the address, request, and data to an adjacent router 3100 through the mesh network bus 3200, and through this process, the address, request, and data are transmitted to the router 3100 corresponding to the router ID. The router 3100 that has received the address, request, and data transmits the address, request, and data to the slave network interface unit 1300 of the connected destination. The slave network interface unit 1300 transmits the address, request, and data to the unit of the final destination. In addition to data, various signals can also be moved through the mesh network 3000 via the same process.

The mesh network 3000 according to embodiments of the present disclosure provides high scalability. Since the mesh network 3000 has a structure where the same components are repeatedly arranged in the same pattern, the network can be expanded by adding standardized components without separate control logic or changes in the system structure. Accordingly, the design complexity of the internal network of the neural cluster 100 can be reduced.

In addition, the mesh network 3000 can provide full connectivity between components. For example, all neural cores 1100 and all shared memories 2100 are interconnected through the mesh network 3000, so each neural core 1100 can easily access any desired shared memory 2100. Furthermore, even if components outside the neural cluster 100 access the neural cluster 100 from any direction, they can easily access any desired shared memory 2100. Therefore, the shared memory 2100 can be easily utilized as global memory. In addition, through full connection between the neural cores 1100, each neural core 1100 within a single neural cluster 100 can also access a local memory (L0 memory 1120) of other neural core 1100, and can also access the L0 memory 1120 of neural cores 1100 in other neural clusters 100.

Meanwhile, as described above, in the neural cluster 100 according to embodiments of the present disclosure, the shared memory 2100 can be arranged in the central portion. Therefore, variations in the signal path length for each neural core 1100 to reach the shared memory 2100 can be reduced. As a result, the latency when each neural core 1100 accesses the shared memory 2100 can be made as uniform as possible.

In neural network operations, data access units are larger compared to those of the CPU 20, so cases where the plurality of neural cores 1100 access the shared memory 2100 in parallel simultaneously occur. If traffic generated by the plurality of neural cores 1100 is concentrated on a small number of shared memories 2100, the overall bandwidth of the mesh network 3000 may be limited by the small number of shared memories 2100. In addition, if a large number of neural cores 1100 attempt to access the same shared memory 2100 without considering their location, the effective bandwidth available to the neural cores 1100 located relatively farther away may decrease.

Therefore, it is necessary to evenly distribute traffic generated by the plurality of neural cores 1100 to the plurality of shared memories 2100. Hereinafter, an interleaving process for distributing traffic will be described.

Figure 8A:
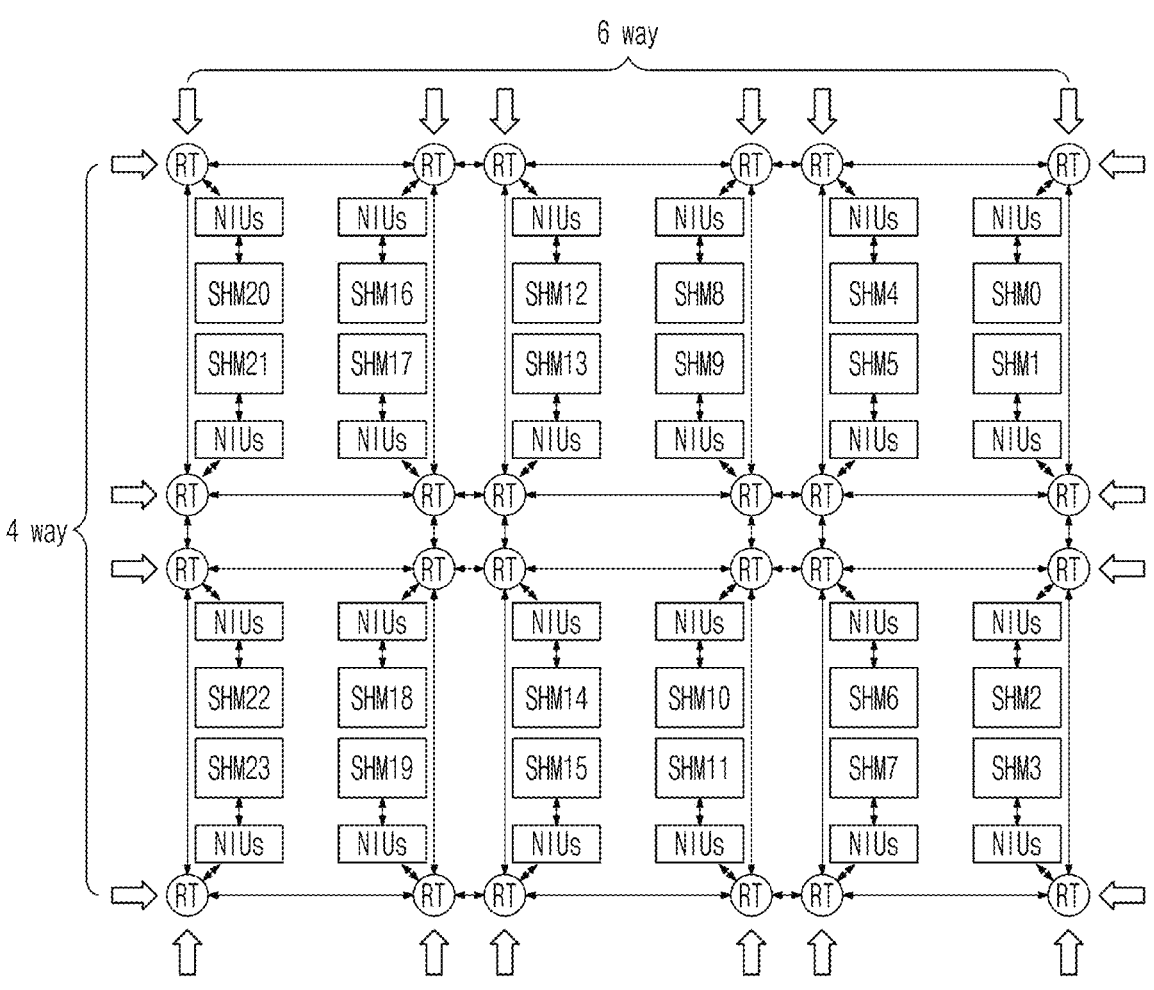
FIGS. 8A to 8C are diagrams for explaining an interleaving process according to embodiments of the present disclosure.
Figures 8B, 8C:
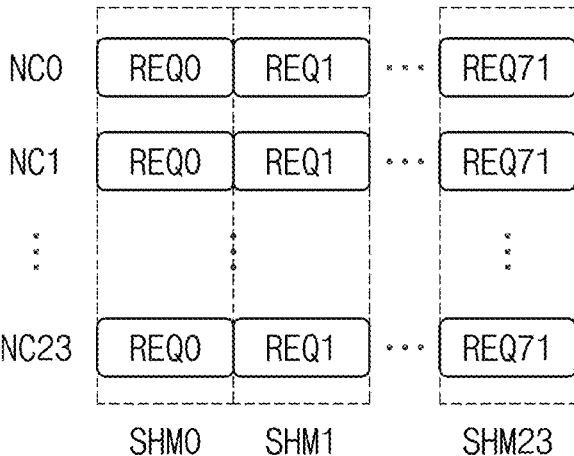

FIGS. 8A to 8C are diagrams for explaining an interleaving process according to embodiments of the present disclosure.

In FIG. 8A, the shared memory area of FIG. 7 is shown enlarged. The interleaving process according to embodiments of the present disclosure will be described based on the internal configuration of the neural cluster 100 of FIG. 7. Hereinafter, for convenience of explanation, when distinguishing respective shared memories 2100, they will be referred to by distinguishing reference numerals "SHM0" to "SHM23," and each shared memory 2100 will be expressed as a zeroth shared memory (SHM0), a first shared memory (SHM1), and so on. Similarly, when distinguishing respective neural cores 1100, they may be referred to by distinguishing reference numerals "NC0" to "NC23," and each neural core 1100 may be expressed as a zeroth neural core (NC0), a first neural core (NC1), and so on. When expressing the entire shared memory 2100, the common reference numeral "2100" is used, and when expressing the entire neural core 1100, the common reference numeral "1100" is used.

24 shared memories 2100 of zeroth to twenty-third shared memories (SHM0 to SHM23) can be distributed and arranged in the shared memory area. The shared memory area may include 4 rows and 6 columns. Routers 3100 can be placed at the intersections of rows and columns to form the mesh network 3000. The zeroth to twenty-third shared memories (SHM0 to SHM23) can each be distributed within the shared memory area and connected to the routers 3100 of the mesh network 3000, respectively.

Traffic originating from outside the neural cluster 100 to the shared memory area can originate from any direction among the 16 routers 3100 arranged on the periphery of the shared memory area. That is, traffic can originate from 6 paths each from the top and bottom of the shared memory area, and from 4 paths each from the left and right.

For example, a plurality of requests for accessing the shared memory 2100 from each of the 24 neural cores (NC0 to NC23) can be generated simultaneously. However, if all requests are concentrated on one shared memory (e.g., the zeroth shared memory (SHM0)), the zeroth shared memory (SHM0) must process all requests alone while the remaining first to twenty-third shared memories (SHM1 to SHM23) are idle. In this case, the utilization efficiency and bandwidth of the entire shared memory 2100 may be degraded. In this specification, a request is used to mean an instruction that includes a memory access-related instruction (data write, read, etc.).

With reference to FIGS. 8B and 8C, an interleaving process according to embodiments of the present disclosure will be described.

For example, the zeroth to twenty-third neural cores (NC0 to NC23) can each sequentially generate zeroth to seventy-first requests (REQ0 to REQ71). Each of the zeroth to seventy-first requests (REQ0 to REQ71) may include a data access request in the shared memory 2100, such as a data read and write request. The size of the data accessed according to the zeroth to seventy-first requests (REQ0 to REQ71) may be the same, and the zeroth to seventy-first requests (REQ0 to REQ71) may be requests for accessing consecutive addresses. In the embodiments of FIGS. 8B and 8C, the size of the interleaving unit, which represents the data size evenly distributed to each shared memory by interleaving, may be the same as the data access request size of each of the zeroth to seventy-first requests (REQ0 to REQ71).

According to the interleaving process of embodiments of the present disclosure, the zeroth to seventy-first requests (REQ0 to REQ71) can be interleaved and transmitted as distributed to the zeroth to twenty-third shared memories (SHM0 to SHM23). For example, the zeroth requests (REQ0) of the zeroth to twenty-third neural cores (NC0 to NC23) are transmitted to the zeroth shared memory (SHM0), and the first requests (REQ1) thereof are transmitted to the first shared memory (SHM1). Requests are sequentially distributed to the shared memory 2100, and the twenty-fourth requests (REQ24) can be transmitted back to the zeroth shared memory (SHM0). In this manner, the zeroth to seventy-first requests (REQ0 to REQ71) can be evenly distributed and transmitted to the zeroth to twenty-third shared memories (SHM0 to SHM23).

Referring to FIG. 8C, the zeroth request (REQ0), the twenty-fourth request (REQ24), and the forty-eighth request (REQ48) can be transmitted to the zeroth shared memory (SHM0). Similarly, the first request (REQ1), the twenty-fifth request (REQ25), and the forty-ninth request (REQ49) can be transmitted to the first shared memory (SHM1), the second request (REQ2), the twenty-sixth request (REQ26), and the fiftieth request (REQ50) can be transmitted to the second shared memory (SHM2), and the third request (REQ3), the twenty-seventh request (REQ27), and the fifty-first request (REQ51) can be transmitted to the third shared memory (SHM3). Requests can also be distributed and transmitted to the fourth to twenty-third shared memories (SHM4 to SHM23) in the same manner.

By the interleaving process according to embodiments of the present disclosure, traffic generated by the plurality of neural cores 1100 can be evenly distributed among the zeroth to twenty-third shared memories (SHM0 to SHM23). From the perspective of the mesh network 3000, traffic can be distributed to the plurality of routers 3100 instead of being concentrated on a single router 3100. Therefore, the utilization efficiency and bandwidth of the entire shared memory 2100 are improved, and the bandwidth of the mesh network 3000 can also be improved.

Figure 9:
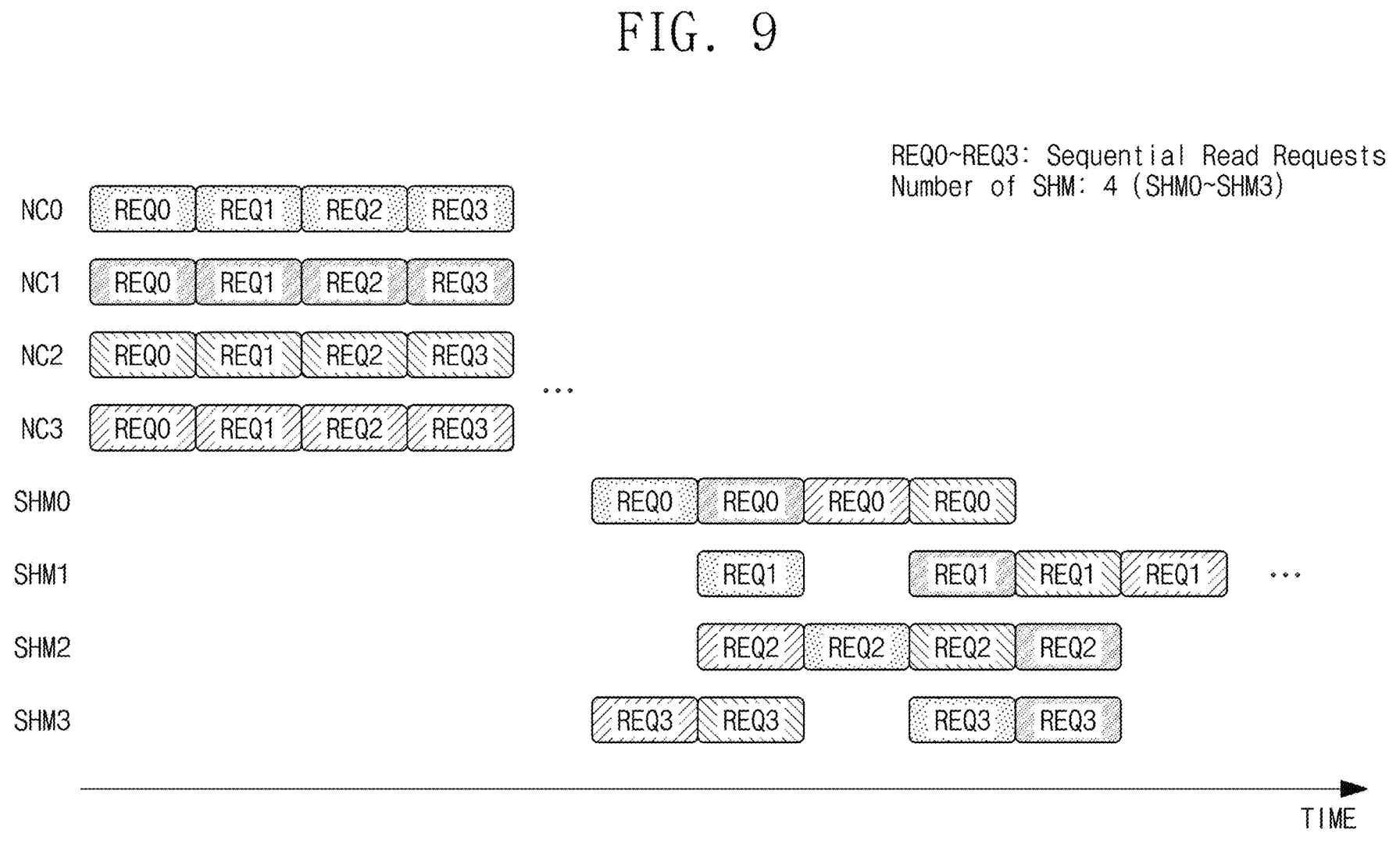

FIG. 9 is a diagram for explaining a process in which requests are processed according to an interleaving process according to embodiments of the present disclosure.

For convenience of explanation, it is assumed that the neural cluster 100 includes zeroth to third neural cores (NC0 to NC3) and zeroth to third shared memories (SHM0 to SHM3).

First, each of the zeroth to third neural cores (NC0 to NC3) may be configured to sequentially generate zeroth to third requests (REQ0 to REQ3) over first to fourth cycles. Each of the zeroth to third requests (REQ0 to REQ3) may be a data read request to the shared memory 2100. The size of the data accessed according to the zeroth to third requests (REQ0 to REQ3) may be the same (e.g., 64 bytes), and consecutive requests (REQ0 to REQ3) may be requests for accessing consecutive addresses. The interleaving unit may be 64 bytes. That is, it is a case where the interleaving unit is the same as the size of the data accessed according to each of the zeroth to third requests (REQ0 to REQ3).

The four zeroth requests (REQ0) generated in the first cycle are transmitted to the zeroth shared memory (SHM0) to perform a read request in the zeroth shared memory (SHM0), and the four first requests (REQ1) generated in the second cycle are transmitted to the first shared memory (SHM1) to perform a read request in the first shared memory (SHM1). Similarly, the four second requests (REQ2) and the four third requests (REQ3) generated in the third and fourth cycles, respectively, are performed in the second and third shared memories (SHM2, SHM3), respectively.

FIG. 9 illustrates a case where the interleaving unit is the same as the size of data accessed according to each of the zeroth to third requests (REQ0 to REQ3). If the interleaving unit is twice the size of the data accessed according to each of the zeroth to third requests (REQ0 to REQ3), the zeroth to third requests (REQ0 to REQ3) will be distributed differently from the example in FIG. 9. For example, the four zeroth requests (REQ0) and the four first requests (REQ1) generated in the first cycle and the second cycle, respectively, are transmitted to the zeroth shared memory (SHM0) to perform read requests in the zeroth shared memory (SHM0), and the four second requests (REQ2) and the four third requests (REQ3) generated in the third cycle and the fourth cycle, respectively, are transmitted to the first shared memory (SHM1) to perform read requests in the first shared memory (SHM1). Similarly, each of the zeroth to third neural cores (NC0 to NC3) can additionally generate fourth to seventh requests (REQ4 to REQ7) sequentially over fifth to eighth cycles (following the fourth cycle). The four fourth requests (REQ4) and the four fifth requests (REQ5) generated in the fifth cycle and the sixth cycle, respectively, are transmitted to the second shared memory (SHM2) and performed, and the four sixth requests (REQ6) and the four seventh requests (REQ7) generated in the seventh cycle and the eighth cycle, respectively, are transmitted to the third shared memory (SHM3) and performed.

Referring to the timing diagram of FIG. 9, the zeroth request (REQ0) of the zeroth neural core (NC0), the zeroth request (REQ0) of the first neural core (NC1), the zeroth request (REQ0) of the third neural core (NC3), and the zeroth request (REQ0) of the second neural core (NC2) may arrive at the zeroth shared memory (SHM0) in this order. The first requests (REQ1) of the zeroth neural core (NC), the first neural core (NC1), the second neural core (NC2), and the third neural core (NC3) may arrive at the first shared memory (SHM1) in this order, the second requests (REQ2) of the third neural core (NC3), the zeroth neural core (NC0), the second neural core (NC2), and the first neural core (NC1) arrive at the second shared memory (SHM2) in this order, and the third requests (REQ3) of the third neural core (NC3), the second neural core (NC2), the zeroth neural core (NC0), and the first neural core (NC1) arrive at the third shared memory (SHM3) in this order. That is, the order in which requests generated at the same timing arrive at each of the zeroth to third shared memories (SHM0 to SHM3) may all be different. This is because the path and distance for the zeroth to third neural cores (NC0 to NC3) to reach one shared memory 2100 may differ, and the order of transmitting traffic in each path may differ according to the communication protocols of the mesh network 3000.

By the interleaving process according to embodiments of the present disclosure, 16 requests generated from each of the zeroth to third neural cores (NC0 to NC3) can all arrive and be processed in the sixth cycle, not the sixteenth cycle, after the first request arrives.

Figure 10:
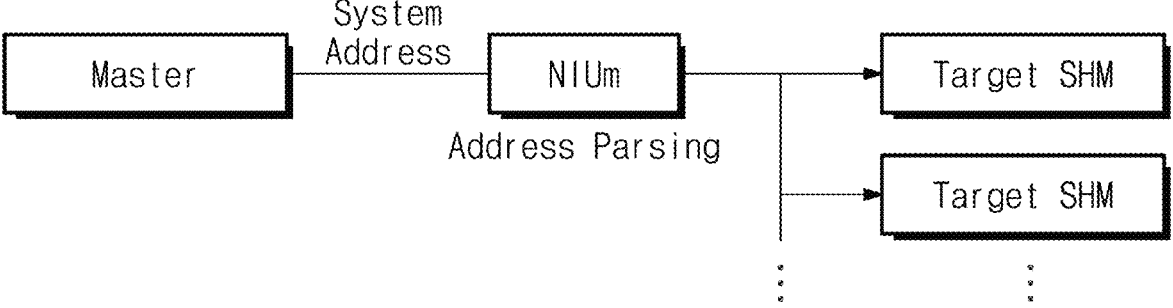
FIG. 10 is a diagram for explaining the operation of a network interface unit performing an interleaving process according to embodiments of the present disclosure.

FIG. 10 is a diagram for explaining the operation of a network interface unit performing an interleaving process according to embodiments of the present disclosure.

Referring to FIG. 10, a master can further generate a system address with a request. The master is a block that generates requests, and may be, for example, each neural core 1100 inside the neural cluster 100, or the neural core 1100 of another external neural cluster 100 or the DMA 200. The master, for example, each neural core 1100, may be configured to further generate a system address with a request (e.g., a data access request).

The master can transmit requests to the network interface unit along with consecutive system addresses regardless of the interleaving process. The master, for example, the neural core 1100, may be connected to the network interface unit, and the network interface unit may include a master network interface unit (NIUm). System addresses can be generated according to a predetermined rule in the neural processing SoC 10 or the CPU 20. A slave is a block that responds to a request from the master, and if the master is the neural core 1100, another neural core 1100 or the shared memory 2100 can be the slave.

The master network interface unit 1200 may be configured to parse the received system address according to a predetermined parsing rule. The parsing rule can be set based on the number of shared memories 2100 and the interleaving unit. The interleaving unit is changeable and can be changed by modifying the CSR (Config/Status Register) settings of the master network interface unit 1200. All master network interface units 1200 can parse system addresses according to the same parsing rule. That is, the master network interface unit 1200 connected to the zeroth neural core (NC0) is configured to parse the system address generated from the zeroth neural core (NC0) according to a predetermined parsing rule, and the master network interface unit 1200 connected to the first neural core (NC1) is also configured to parse the system address generated from the first neural core (NC1) according to the same parsing rule. The master network interface units 1200 connected to each of the second to twenty-third neural cores (NC0 to NC23) can also operate similarly, and duplicate descriptions will be omitted.

A target shared memory (Target SHM) 2100 is determined according to the address parsed by the master network interface unit 1200. Requests can be transmitted to the target shared memory 2100 through the mesh network 3000. Parsing of the system address can be performed in the same manner for all requests. Each system address is parsed according to the same rule, and the target shared memory 2100 can be determined to be distributed by the parsed address.

For example, in the example of FIG. 9, the zeroth neural core (NC0) is configured to generate a zeroth system address with the zeroth request (REQ0) and generate a first system address with the first request (REQ1), and the first neural core (NC1) is configured to generate a second system address with the zeroth request (REQ0) and generate a third system address with the first request (REQ0). The network interface unit connected to the zeroth neural core (NC0) is configured to parse the zeroth system address and the first system address according to a predetermined parsing rule, and the network interface unit connected to the first neural core (NC1) is configured to parse the second system address and the third system address according to the parsing rule. According to the parsed zeroth to third system addresses, the two zeroth requests (REQ0) and the two first requests (REQ1) can be interleaved and transmitted as distributed to the zeroth shared memory (SHM0) and the first shared memory (SHM1), respectively. The second request (REQ2) and the third request (REQ3) are also applied in the same way, and requests generated in the second neural core (NC2) and the third neural core (NC3) can also be interleaved in the same way.

In this manner, according to the parsed system addresses, requests can be interleaved and transmitted as distributed to the shared memories 2100, respectively.

FIGS. 11A to 11C are diagrams for specifically explaining a method of parsing system addresses in the interleaving process according to embodiments of the present disclosure.

Referring to FIGS. 11A, 11B, and 11C, the process of determining a target shared memory by parsing a system address in some exemplary cases is described.

In the examples of FIGS. 11A, 11B, and 11C, it is assumed that the zeroth to seventh requests (REQ0 to REQ7) and eight system addresses (00_0000_0000, 00_0100_0000, 00_1000_0000, 00_1100_0000, 01_0000_0000, 01_0100_0000, 01_1000_0000, 01_1100_0000) for the zeroth to seventh requests (REQ0 to REQ7) are generated. Each request is a request for data of 64 bytes. The zeroth to seventh requests (REQ0 to REQ7) may be requests generated from a single neural core 1100.

FIG. 11A illustrates a case where the interleaving unit is 64 bytes and there are 4 shared memories 2100 (zeroth to third shared memories 2100). That is, the interleaving unit is the same as the size of data accessed according to each of the zeroth to seventh requests (REQ0 to REQ7).

The master network interface unit 1200 of the neural core unit 1000 is configured to parse the system address according to a predetermined parsing rule. The master network interface unit 1200 can determine the target shared memory 2100 based on specific bits of the received system address. In this example, the master network interface unit 1200 can distinguish the target shared memory 2100 based on the seventh and eighth bits of the received system address. For example, if the seventh and eighth bits of the system address are "00," "01," "10," "11," the master network interface unit 1200 can classify each system address as an address for the zeroth shared memory (SHM0), the first shared memory (SHM1), the second shared memory (SHM2), and the third shared memory (SHM3), respectively. Subsequently, the remaining bits excluding the seventh and eighth bits can be rearranged into an internal address of the target shared memory 2100. Address rearrangement to an internal memory address can be performed by the master network interface unit 1200 or the slave network interface unit 1300, and the present disclosure is not limited thereto.

The addresses parsed and rearranged in the above manner are shown in the table of FIG. 11A. The master network interface unit 1200 can determine that the zeroth request (REQ0) is a request for the zeroth shared memory (SHM0) based on the seventh and eighth bits ("00") of the system address "00_0000_0000" for the zeroth request (REQ0). Subsequently, the remaining bits excluding the seventh and eighth bits can be rearranged into the internal memory address "0000_0000."

As a result, the operation (read, write, etc.) by the zeroth request (REQ0) can be performed at the internal address "0000_0000" of the zeroth shared memory (SHM0). The master network interface unit 1200 can determine that the fourth request (REQ4) is a request for the zeroth shared memory (SHM0) based on the seventh and eighth bits ("00") of the system address "01_0000_0000" for the fourth request (REQ4), and the operation by the fourth request (REQ4) can be performed at the internal address "0100_0000" of the zeroth shared memory (SHM0).

Similarly, the first and fifth requests (REQ1, REQ5) can be performed at their respective internal addresses ("0000_0000," "0100_0000") of the first shared memory (SHM1), the second and sixth requests (REQ2, REQ6) can be performed at their respective internal addresses ("0000_0000," "0100_0000") of the second shared memory (SHM2), and the third and seventh requests (REQ3, REQ7) can be performed at their respective internal addresses ("0000_0000," "0100_0000") of the third shared memory (SHM3).

In this example, according to the parsed system addresses, the zeroth to third requests (REQ0 to REQ3) for 64-byte data are interleaved by a 64-byte interleaving unit and sequentially transmitted to the first internal address of the zeroth to third shared memories (SHM0 to SHM3) and then processed, and similarly, the fourth to seventh requests (REQ4 to REQ7) are sequentially transmitted to the second internal address of the zeroth to third shared memories (SHM0 to SHM3) and then processed.

FIG. 11B illustrates a case where the interleaving unit is 64 bytes and there are 8 shared memories 2100. That is, the interleaving unit is the same as the size of data accessed according to each of the zeroth to seventh requests (REQ0 to REQ7).

In this example, the master network interface unit 1200 can distinguish the target shared memory 2100 based on the seventh to ninth bits of the received system address. For example, if the seventh to ninth bits of the system address are "000," "001," "010," "011," "100," "101," "110," "111," the master network interface unit 1200 can classify each system address as an address for the zeroth shared memory (SHM0), the first shared memory (SHM1), the second shared memory (SHM2), the third shared memory (SHM3), the fourth shared memory (SHM4), the fifth shared memory (SHM5), the sixth shared memory (SHM6), and the seventh shared memory (SHM7), respectively. Subsequently, the remaining bits excluding the seventh to ninth bits can be rearranged into an internal address of the target shared memory 2100.

The addresses parsed and rearranged in the above manner are shown in the table of FIG. 11B. The master network interface unit 1200 can determine that the zeroth request (REQ0) is a request for the zeroth shared memory (SHM0) based on the seventh to ninth bits ("000") of the system address "00_0000_0000" for the zeroth request (REQ0). Subsequently, the remaining bits excluding the seventh to ninth bits can be rearranged into the internal memory address "000_0000." As a result, the operation by the zeroth request (REQ0) can be performed at the internal address "000_0000" of the zeroth shared memory (SHM0). The master network interface unit 1200 can determine that the first request (REQ1) is a request for the first shared memory (SHM1) based on the seventh to ninth bits ("001") of the system address "00_0100_0000" for the first request (REQ1), and the operation by the first request (REQ1) can be performed at the internal address "000_0000" of the first shared memory (SHM1).

Similarly, the second request (REQ2) can be performed at the corresponding internal address ("000_0000") of the second shared memory (SHM2), the third request (REQ3) can be performed at the corresponding internal address ("000_0000") of the third shared memory (SHM3), the fourth request (REQ4) can be performed at the corresponding internal address ("000_0000") of the fourth shared memory (SHM4), the fifth request (REQ5) can be performed at the corresponding internal address ("000_0000") of the fifth shared memory (SHM5), the sixth request (REQ6) can be performed at the corresponding internal address ("000_0000") of the sixth shared memory (SHM6), and the seventh request (REQ7) can be performed at the corresponding internal address ("000_0000") of the seventh shared memory (SHM7).

In this example, according to the parsed system addresses, the zeroth to seventh requests (REQ0 to REQ7) for 64-byte data are interleaved by a 64-byte interleaving unit and sequentially transmitted to the first internal address of the zeroth to seventh shared memories (SHM0 to SHM7) and then processed.

FIG. 11C illustrates a case where the interleaving unit is 128 bytes and there are 4 shared memories 2100. That is, the interleaving unit is twice the size of data accessed according to each of the zeroth to seventh requests (REQ0 to REQ7).

In this example, the master network interface unit 1200 can distinguish the target shared memory 2100 based on the eighth and ninth bits of the received system address. For example, if the eighth and ninth bits of the system address are "00," "01," "10," "11," the master network interface unit 1200 can classify each system address as an address for the zeroth shared memory (SHM0), the first shared memory (SHM1), the second shared memory (SHM2), and the third shared memory (SHM3), respectively. Subsequently, the remaining bits excluding the eighth and ninth bits can be rearranged into an internal address of the target shared memory 2100.

The addresses parsed and rearranged in this manner are shown in the table of FIG. 11C. The master network interface unit 1200 can determine that the zeroth request (REQ0) is a request for the zeroth shared memory (SHM0) based on the eighth and ninth bits ("00") of the system address "00_0000_0000" for the zeroth request (REQ0). Subsequently, the remaining bits excluding the eighth and ninth bits can be rearranged into the internal memory address "0000_0000." As a result, the operation by the zeroth request (REQ0) can be performed at the internal address "0000_0000" of the zeroth shared memory (SHM0). The master network interface unit 1200 can determine that the first request (REQ1) is a request for the zeroth shared memory (SHM0) based on the eighth and ninth bits ("00") of the system address "00_0100_0000" for the first request (REQ1), and the operation by the first request (REQ1) can be performed at the internal address "0100_0000" of the zeroth shared memory (SHM0).

Similarly, the second and third requests (REQ2, REQ3) can be performed at their respective internal addresses ("0000_0000," "0100_0000") of the first shared memory (SHM1), the fourth and fifth requests (REQ4, REQ5) can be performed at their respective internal addresses ("0000_0000," "0100_0000") of the second shared memory (SHM2), and the sixth and seventh requests (REQ6, REQ7) can be performed at their respective internal addresses ("0000_0000," "0100_0000") of the third shared memory (SHM3).

In this example, since the interleaving unit is 128 bytes, the zeroth and first requests (REQ0, REQ1) for a total of 128 bytes of data are sequentially transmitted to and processed at two internal addresses of the same zeroth shared memory (SHM0). Similarly, the second and third requests (REQ2, REQ3) can be sequentially transmitted and processed at two internal addresses of the first shared memory (SHM1), the fourth and fifth requests (REQ4, REQ5) can be sequentially transmitted and processed at two internal addresses of the second shared memory (SHM2), and the sixth and seventh requests (REQ6, REQ7) can be sequentially transmitted and processed at two internal addresses of the third shared memory (SHM3).

According to embodiments of the present disclosure, the interleaving is performed through parsing of system addresses according to a rule determined based on the interleaving unit, even without converting the generated system addresses. This interleaving process is applied identically to traffic received from any direction. Therefore, since the interleaving is performed by parsing the system addresses in each master network interface unit 1200, a separate entity managing the interleaving is not required, thereby reducing system overhead required for management.

Figure 12:
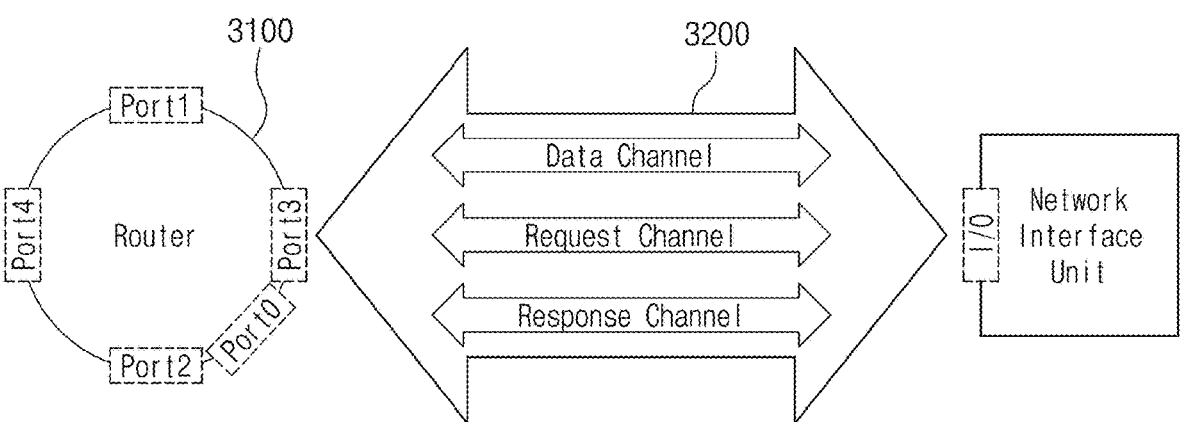
FIG. 12 is a diagram for explaining a data bus structure of the mesh network according to embodiments of the present disclosure.

FIG. 12 is a diagram for explaining a data bus structure of a mesh network according to embodiments of the present disclosure.

The neural cluster 100 according to embodiments of the present disclosure is configured based on the mesh network 3000. The mesh network 3000 is a network structure designed so that each component (block) is connected to each other through individual networks, enabling communication among all components. However, since a signal channel must be arranged between respective components, the area occupied by the channels of the mesh network 3000 within the chip of the neural cluster 100 may increase. Therefore, a channel structure for solving this area problem can be applied to the neural cluster 100 according to embodiments of the present disclosure. This will be described below.

The mesh network 3000 may include the mesh network bus 3200 for connecting the components. The mesh network bus 3200 may include a data bus. The mesh network bus 3200 according to the embodiments of FIGS. 12 to 15 may be a data bus. In addition, the mesh network bus 3200 may further include a control bus, which will be described with reference to FIG. 16.

The mesh network bus 3200 according to the embodiment of FIG. 12, specifically, the data bus, may include a data channel (Data Channel), a request channel (Request Channel), and a response channel (Response Channel). The data channel, the request channel, and the response channel can each be a physical channel made of conductive material.

The network interface unit can be configured to map five AXI channels compliant with the AMBA (Advanced Microcontroller Bus Architecture) AXI (Advanced extensible Interface) protocol to three channels of the mesh network bus 3200.

According to embodiments of the present disclosure, the network interface unit can map the three channels to the five AXI channels without data collision. Through this, the number of channels of the mesh network bus 3200 located in the neural cluster 100 can be reduced, thereby saving physical space occupied by the mesh network 3000.

The network interface unit may include at least one of the master network interface unit 1200 or the slave network interface unit 1300. Hereinafter, the mapping relationship between channels in the master network interface unit 1200 and the slave network interface unit 1300 will be described.

Figure 13:
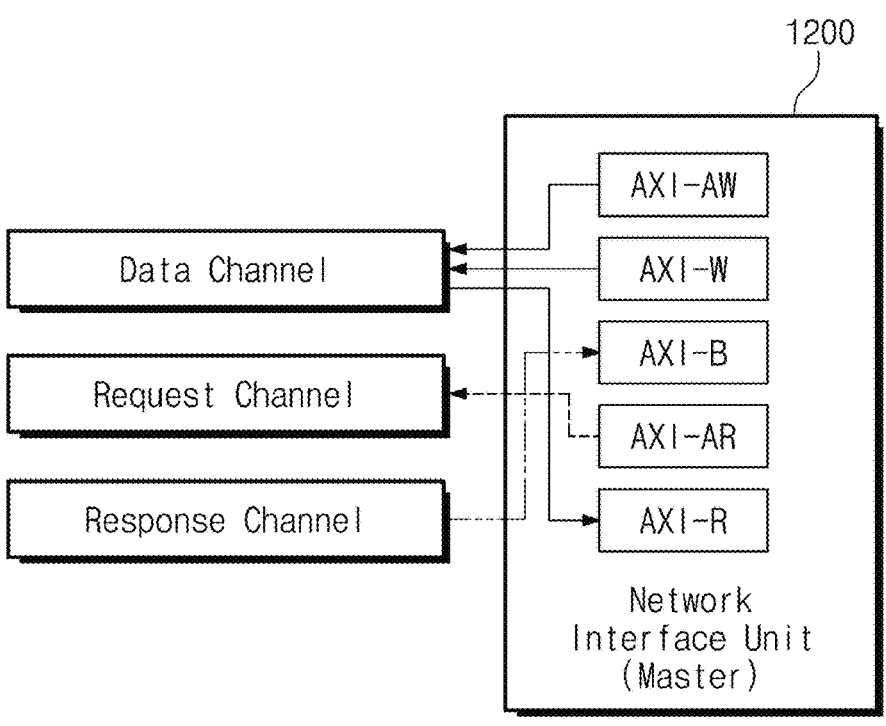
FIG. 13 is a diagram for explaining a mapping relationship between a channel of a mesh network and an AXI channel in a master network interface unit according to embodiments of the present disclosure.

FIG. 13 is a diagram for explaining a mapping relationship between a channel of a mesh network and an AXI channel in a master network interface unit according to embodiments of the present disclosure.

The master network interface unit 1200 can map channels according to the AMBA AXI protocol to channels of the mesh network bus 3200, respectively. Channels according to the AXI protocol may include an AXI-AW channel, an AXI-W channel, an AXI-B channel, an AXI-AR channel, and an AXI-R channel.

The AXI-AW channel may be a channel for transmitting write addresses. The AXI-W channel may be a channel for transmitting write data. The AXI-B channel may be a channel for transmitting a response to a write request. The AXI-AR channel may be a channel for transmitting a read address. The AXI-R channel may be a channel for transmitting read data.

The master network interface unit 1200 can map the AXI-AW channel, the AXI-W channel, and the AXI-R channel to the data channel of the mesh network bus 3200. The master network interface unit 1200 can map the AXI-B channel to the response channel of the mesh network bus

3200. The master network interface unit 1200 can map the AXI-AR channel to the request channel of the mesh network bus 3200. This mapping relationship can be similarly applied to the slave network interface unit 1300.

Figure 14:
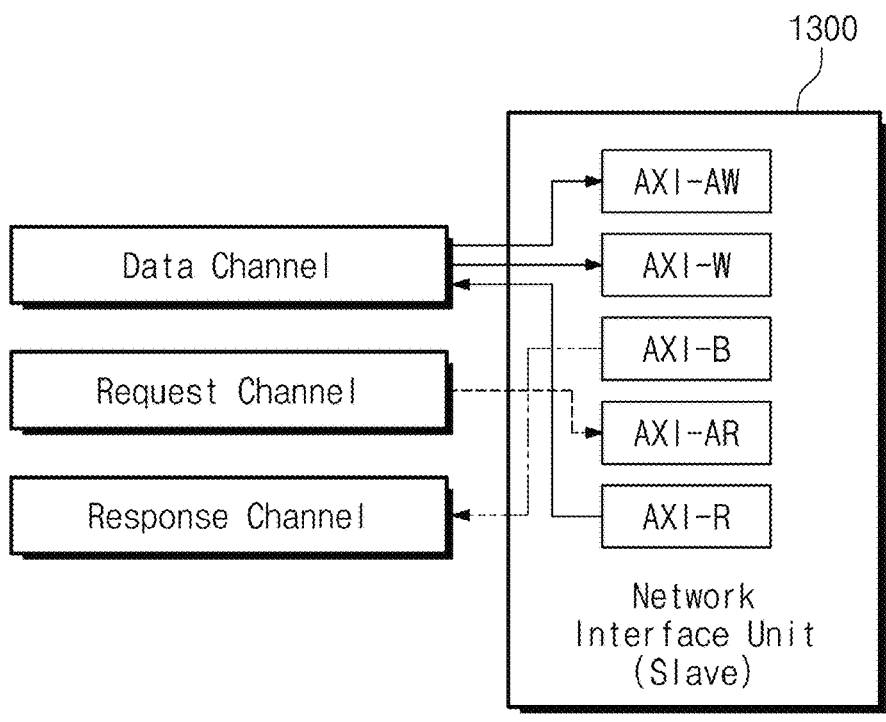
FIG. 14 is a diagram for explaining a mapping relationship between a channel of a mesh network and an AXI channel in a slave network interface unit according to embodiments of the present disclosure.

FIG. 14 is a diagram for explaining a mapping relationship between a channel of a mesh network and an AXI channel in a slave network interface unit according to embodiments of the present disclosure.

The slave network interface unit 1300 can map channels according to the AMBA AXI protocol to channels of the mesh network bus 3200. The slave network interface unit 1300 can map the AXI-AW channel, the AXI-W channel, and the AXI-R channel to the data channel of the mesh network bus 3200. The slave network interface unit 1300 can map the AXI-B channel to the response channel of the mesh network bus 3200. The slave network interface unit 1300 can map the AXI-AR channel to the request channel of the mesh network bus 3200.

In summary, as the network interface unit maps channels to each other as described above, write data signals, read data signals, and write address signals can be signaled in the data channel, read address signals can be signaled in the request channel, and write response signals can be signaled in the response channel.

In the AXI protocol, the AXI-W channel and the AXI-R channel are channels responsible for data transmission. Since neural network operations involve a larger amount of data to be processed compared to general CPU operations, the AXI-W channel and the AXI-R channel must transmit large amounts of data through a data channel composed of a plurality of signal lines. A data channel is composed of a relatively larger number of signal lines compared to the number of signal lines in a bus configuring an address channel or a control channel, so the physical area requirement increases.

According to embodiments of the present disclosure, instead of allocating separate data channels to the AXI-W channel and the AXI-R channel, the network interface unit maps the AXI-W channel and the AXI-R channel to a single data channel, thereby reducing the number of data channels within the mesh network 3000 in half compared to cases where they are not mapped. The AXI-AW channel can also be integrated into the same data channel to transmit write and read data and write addresses through a single channel, further reducing signal lines. In addition, as can be seen with reference to FIGS. 13 and 14, the master network interface unit 1200 and the slave network interface unit 1300 can use the same data channel, request channel, and response channel, rather than using dedicated channels allocated separately for each unit. As a result, the mesh network 3000 according to embodiments of the present disclosure can save the physical space occupied by signal lines, thereby reducing chip area.

The structure of the mesh network bus 3200 according to embodiments of the present disclosure can be applied identically to the channels between the router 3100 and adjacent routers 3100.

Figure 15:
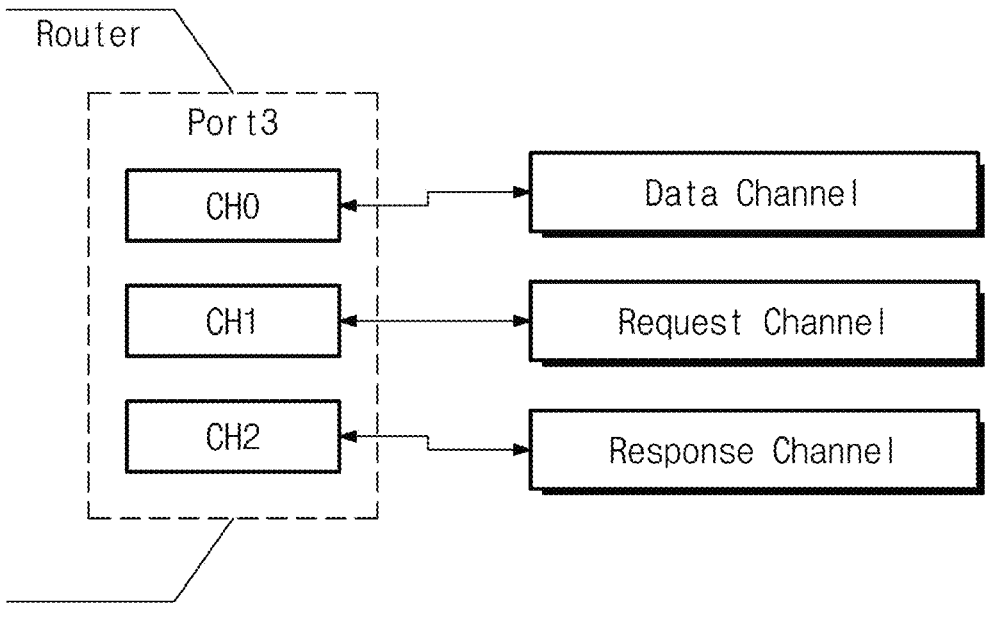
FIG. 15 is a diagram for explaining a connection relationship between a channel of the mesh network and a channel of a router according to embodiments of the present disclosure.

FIG. 15 is a diagram for explaining a connection relationship between a channel of a mesh network and a channel of a router according to embodiments of the present disclosure.

The router 3100 may include zeroth to fourth ports (Port0 to Port4), and zeroth to second channels (CH0 to CH2) may pass through each port. Each of the zeroth to second channels (CH0 to CH2) can be connected to the data channel, the request channel, and the response channel of the mesh network 3000. In FIG. 15, only the third port (Port3)

of the router 3100 is exemplarily illustrated. The connection relationship between the third port (Port3) shown in FIG. 15 and the mesh network bus 3200 can be applied identically to other ports.

In the embodiments of FIGS. 12 to 15, the structure of the mesh network bus 3200, specifically the data bus, for solving the area problem of the mesh network 3000 has been described. Similarly, the structure of the control bus of the mesh network 3000 for solving the area problem will be described below.

Figure 16:
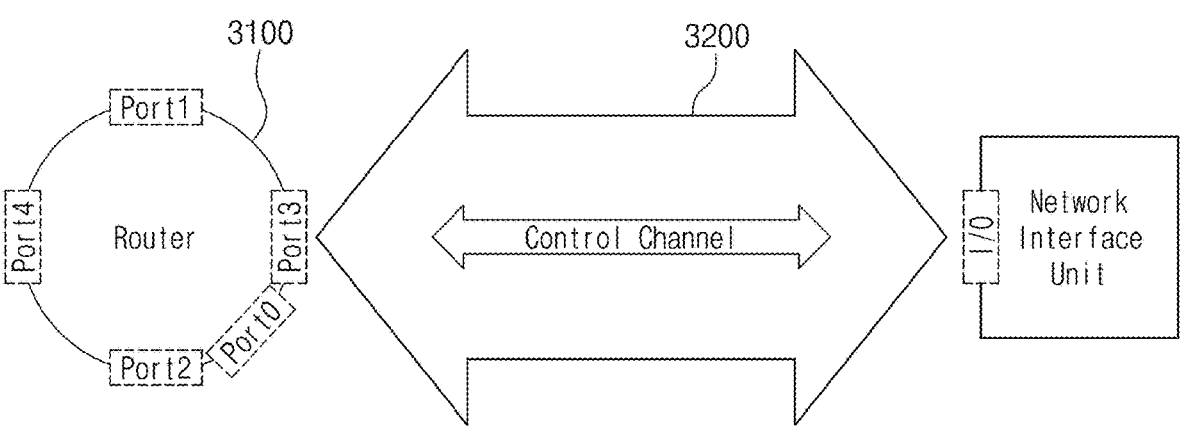
FIG. 16 is a diagram for explaining a control bus structure of the mesh network according to embodiments of the present disclosure.

FIG. 16 is a diagram for explaining a control bus structure of a mesh network according to embodiments of the present disclosure.

The mesh network 3000 may include the mesh network bus 3200. The mesh network bus 3200 may include a control bus. The mesh network bus 3200 according to the embodiment of FIG. 16 may be a control bus. The embodiment of FIG. 16 is substantially the same as the embodiment of FIG. 12, except that the mesh network bus 3200 is a control bus, so descriptions of the same parts as in the embodiment of FIG. 12 are omitted.

The mesh network bus 3200 may include a single control channel. That is, there may be only one control channel in the mesh network bus 3200. The control channel can be a physical channel made of conductive material. A synchronization signal can be signaled in the control channel. A control signal may be further signaled in the control channel. The control signal and the synchronization signal can be signaled between a master and a slave. A control signal may be a signal instructing to perform operations such as data loading, operation execution, and result storage. A synchronization signal may be a signal that controls synchronization among a plurality of blocks. Each of the plurality of blocks may be the neural core unit 1000 or the shared memory unit 2000. A synchronization signal may be a signal for controlling the timing of the master and the slave to match operation execution time therebetween. Specifically, the synchronization signal may be a signal for ensuring that a subsequent operation is performed after a preceding operation is completed when it is required for a temporal precedence relationship between operations of the master and the slave. However, this is merely an example, and the present disclosure is not limited thereto.

The control channel may be a channel shared with the response channel of FIG. 12. In this case, a write response signal may be further signaled in the control channel.

According to embodiments of the present disclosure, by integrating and signaling the control signals, the synchronization signals, etc., in a single control channel, the area occupied by the mesh network can be reduced compared to cases where they are not integrated.

In the neural cluster 100 according to embodiments of the present disclosure, when signaling the control signals, the synchronization signals, etc., through a single control channel, a posted write method and a non-posted write method can be mixed depending on the signal. Hereinafter, a signaling method in the control channel according to embodiments of the present disclosure will be described with reference to FIGS. 17 to 22.

Figure 17:
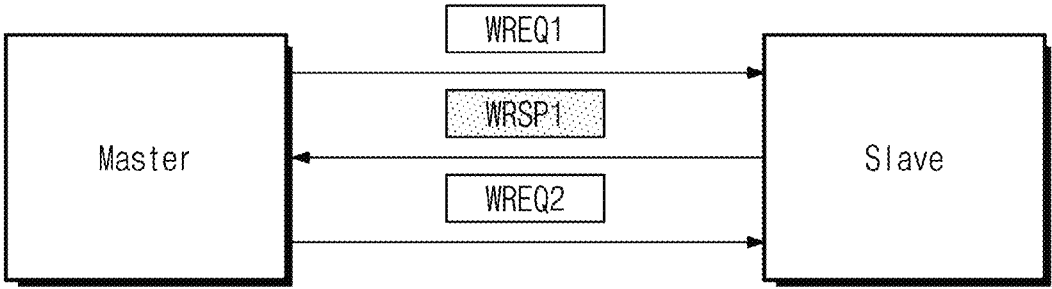
FIG. 17 is a diagram for explaining signaling in a non-posted write method.

FIG. 17 is a diagram for explaining signaling in a non-posted write method.

The signaling of the non-posted write method is a signaling method that requires a write response indicating the success or failure of a write operation. Specifically, in the non-posted write method, when a master (Master) generates and transmits a request (WREQ1) to a slave (Slave), the slave may be configured to generate and transmit a response (WRSP1) to the request (WREQ1) to the master. The master may be configured to transmit the next signal of the request (WREQ1) after receiving the response (WRSP1). The next signal may be a new request (WREQ2).

When using the non-posted write method, the master can immediately confirm the completion of the write operation, so it can confirm whether the write operation of data has been completed correctly, respond immediately in case of an error, and is advantageous for ensuring system stability and data integrity. However, the system may remain in a waiting state while waiting for the write operation to complete, which may lead to performance degradation, and in systems with frequent write operations, performance bottlenecks may become more severe. In addition, since the non-posted write method relies on direct communication between the controller and the memory, performance degradation may become more severe as the system scale becomes larger and more complex. Therefore, the non-posted write method may be suitable for systems that prioritize data consistency.

In the signaling of the non-posted write method, an MO (Multiple Outstanding) can be utilized. The MO is a function that allows the master to transmit a plurality of requests continuously without waiting for responses from the slave. Therefore, by utilizing the MO, multiple uncompleted tasks can be processed simultaneously. In the non-posted write method, when the master generates and transmits a request (WREQ1) to the slave, the slave may be configured to generate and transmit a response (WRSP1) to the request (WREQ1) to the master. The master may be configured to transmit the next signal of the request (WREQ1) by utilizing the MO. That is, in the non-posted write method, the master may be configured to transmit the next signal of the request (WREQ1) by utilizing MO without waiting for the response (WRSP1) from the slave.

A block (e.g., master) according to embodiments of the present disclosure may further include a response waiting buffer. The response waiting buffer can temporarily store information about a request until a response to the request is received. The response waiting buffer may be a memory or a storage space. When MO is utilized, information about the request may be stored in the response waiting buffer until a response to the request is received.

Utilizing the MO can improve system performance and efficiency by processing multiple tasks simultaneously and reduce the overall latency since it can process other tasks without waiting for one task to complete. Further, it is possible to increase the data throughput of the system by processing multiple tasks simultaneously.

Figure 18:
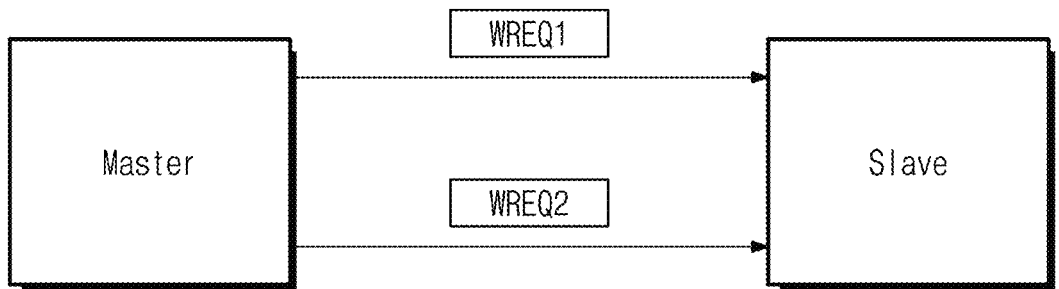
FIG. 18 is a diagram for explaining signaling in a posted write method.

FIG. 18 is a diagram for explaining signaling in a posted write method.

The posted write method is a signaling method that does not wait for a write response indicating the success or failure of a write operation. Specifically, in the posted write method, when a master (Master) generates and transmits a request (WREQ1) to a slave (Slave), the slave may be configured not to transmit a response to the request (WREQ1) to the master. The master may be configured to transmit the next signal of the request (WREQ1) without waiting for a response. The next signal may be a new request (WREQ2). Specifically, the slave may not generate any response to the master's request (WREQ1). Alternatively, the slave may be configured to generate a response to the master's request (WREQ1), and the generated response may be discarded or stored without being transmitted to the master.

If the posted write method is used, the master can immediately proceed to the next task after a write request, thereby improving the system's task processing performance. Therefore, the posted write method may be suitable for systems that require high-speed transmission of large amounts of data, i.e., systems that prioritize performance and efficiency.

Figure 19:
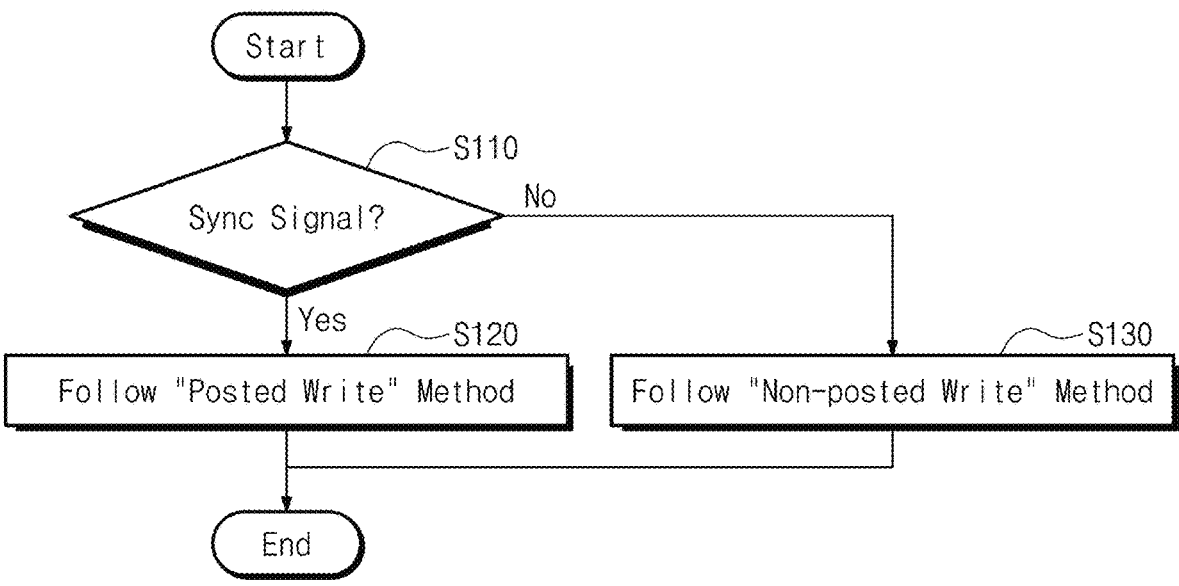
FIG. 19 is a diagram illustrating a signaling method according to embodiments of the present disclosure.

FIG. 19 is a diagram illustrating a signaling method according to embodiments of the present disclosure.

A signaling method according to embodiments of the present disclosure may be performed by the neural cluster 100 according to embodiments of the present disclosure. The signaling method may include, on the control channel, determining whether a signal to be signaled is a synchronization signal (S110), signaling according to a posted write method if the signal to be signaled is a synchronization signal (S120), and signaling according to a non-posted write method if the signal to be signaled is not a synchronization signal (S130).

The step of determining whether the signal to be signaled is a synchronization signal (S110) may include determining whether the signal to be signaled is a synchronization signal through an address or a flag of the signal. For example, a signal including a specific address can be determined as a synchronization signal following the posted write method, or a signal having a specific flag of a predetermined logic (e.g., logic "0" or logic "1") can be determined as a synchronization signal following the posted write method. That is, whether a signal to be signaled follows the posted write method or the non-posted write method can be identified by an address or a flag of the signal to be signaled.

The step of signaling according to the posted write method if the signal to be signaled is a synchronization signal (S120) and the step of signaling according to the non-posted write method if the signal to be signaled is not a synchronization signal (S130) will be described in detail below with reference to FIGS. 20 and 21.

Figure 20:
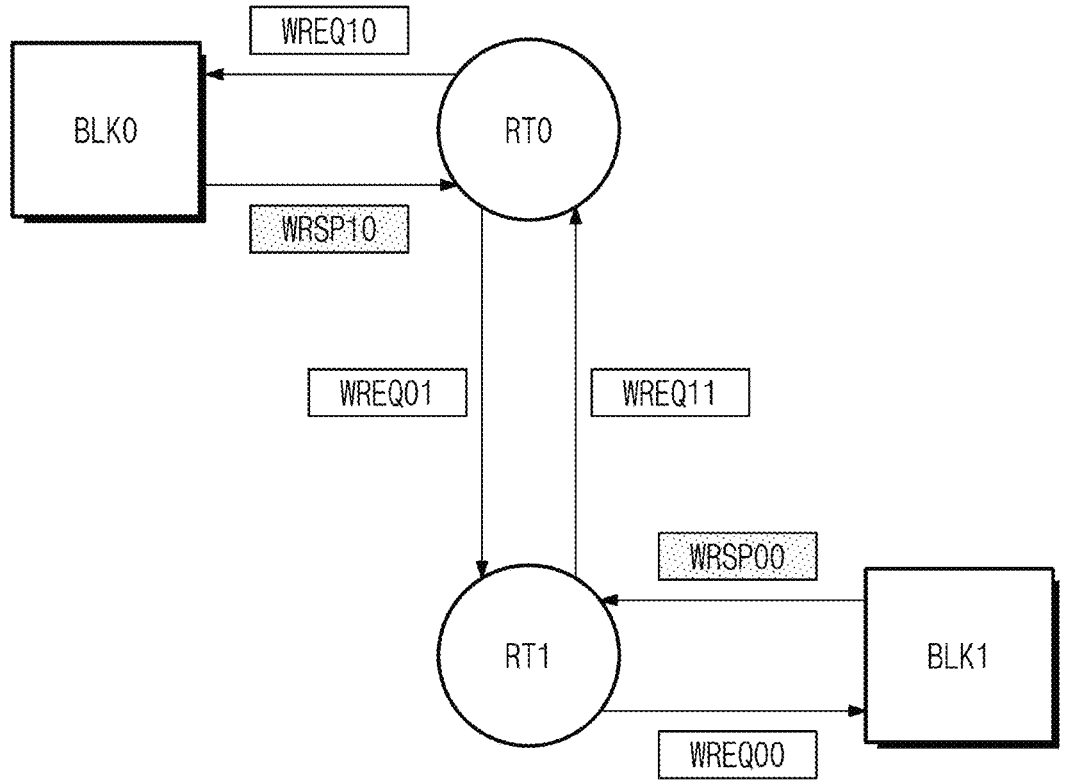
FIG. 20 is a diagram for explaining signaling according to a non-posted write method in a signaling method according to embodiments of the present disclosure.

FIG. 20 is a diagram for explaining signaling according to a non-posted write method in a signaling method according to embodiments of the present disclosure.

In the neural cluster 100 according to embodiments of the present disclosure, other signals on the control channel excluding synchronization signals (e.g., control signals and write response signals) can be signaled on the control channel according to the non-posted write method. In addition, signals signaled on channels (e.g., the data channel, the request channel, and the response channel) included in the data bus can be signaled according to the non-posted write method.

Each of a zeroth block (BLK0) and a first block (BLK1) may be one of a plurality of blocks included in the neural cluster 100 according to embodiments of the present disclosure. For example, each of the zeroth block (BLK0) and the first block (BLK1) may be the neural core unit 1000 or the shared memory unit 2000. Each of the zeroth block (BLK0) and the first block (BLK1) can operate as the master or the slave. A zeroth router (RT0) and a first router (RT1) may be routers included in the mesh network 3000 according to embodiments of the present disclosure. The zeroth block (BLK0), the first block (BLK1), the zeroth router (RT0), and the first router (RT1) can be interconnected through the mesh network bus 3200 to exchange signals to one another. Specifically, the zeroth router (RT0) may be a router connected to the zeroth block (BLK0), and the first router (RT1) may be a router connected to the first block (BLK1).

The step of signaling according to the non-posted write method if the signal to be signaled is not a synchronization signal (S130) in FIG. 19 may include the step of transmitting a request by the master, the step of transmitting, by the slave, a response to the request to the master, and the step of transmitting, by the master, a next signal of the request after receiving the response or transmitting, by the master, a next signal of the request by utilizing the MO. Hereinafter, the process in which signals are signaled according to the non-posted write method between the zeroth block (BLK0) and the first block (BLK1) will be described in detail.

First, a case where the zeroth block (BLK0) operates as the master and the first block (BLK1) operates as the slave will be described. The zeroth block (BLK0) can generate and transmit a request (WREQ00) to the first block (BLK1). The first block (BLK1) can generate a response (WRSP00) to the request (WREQ00) and transmit it to the zeroth block (BLK0). The zeroth block (BLK0) can transmit the next signal of the request (WREQ00) after receiving the response (WRSP00). The next signal may be a new request (WREQ01). That is, the zeroth block (BLK0) can generate and transmit a new request (WREQ01) to the first block (BLK1) after receiving the response (WRSP00). Alternatively, the zeroth block (BLK0) can transmit the next signal by utilizing the MO regardless of the reception of the response (WRSP00). That is, the zeroth block (BLK0) can generate and transmit a new request (WREQ01) to the first block (BLK1) by utilizing the MO regardless of the reception of the response (WRSP00). In this case, the zeroth block (BLK0) may require a response waiting buffer. Specifically, when utilizing the MO, information regarding the request (WREQ00) can be stored in a response waiting buffer included in the zeroth block (BLK0).

Next, a case where the first block (BLK1) operates as the master and the zeroth block (BLK0) operates as the slave will be described. The first block (BLK1) can generate and transmit a request (WREQ10) to the zeroth block (BLK0). The zeroth block (BLK0) can generate a response (WRSP10) to the request (WREQ10) and transmit it to the first block (BLK1). The first block (BLK1) can transmit the next signal of the request (WREQ10) after receiving the response (WRSP10). The next signal may be a new request (WREQ11). That is, the first block (BLK1) can generate and transmit a new request (WREQ11) to the zeroth block (BLK0) after receiving the response (WRSP10). Alternatively, the first block (BLK1) can transmit the next signal by utilizing the MO regardless of the reception of the response (WRSP10). That is, the first block (BLK1) can generate and transmit a new request (WREQ11) to the zeroth block (BLK0) by utilizing the MO regardless of the reception of the response (WRSP10). In this case, the first block (BLK1) may require a response waiting buffer. Specifically, when utilizing the MO, information regarding the request (WREQ10) can be stored in a response waiting buffer included in the first block (BLK1).

According to embodiments of the present disclosure, in signaling according to the non-posted write method, when the MO is utilized, a response waiting buffer is required, and signals can be stored in the response waiting buffer. However, if a response waiting buffer does not exist or its size is insufficient, a deadlock can occur. The deadlock is a state in which two or more tasks are waiting for each other to finish, with the result that nothing is completed. For example, in the embodiment of FIG. 20, if no response waiting buffer exists, a deadlock may occur if the MO is utilized in the zeroth block (BLK0) and the first block (BLK1).

To prevent the deadlock, the response waiting buffer can be added, or the number of MOs in signaling can be limited. The MO count may be the number of requests that can be continuously transmitted when utilizing the MO. The unit of MO count can be 0 or a natural number. Signals signaled according to the non-posted write method can be constrained by the limit on the MO count. That is, signals signaled according to the non-posted write method may be subject to restrictions on the number of requests that can be continuously transmitted, even when utilizing the MO. That is, when a signal signaled according to the non-posted write method utilizes the MO, the MO count is decremented. For example, if the MO count is 1, a signal signaled according to the non-posted write method can continuously transmit one request without receiving a response to the request. In another example, if the MO count is 2, a signal signaled according to the non-posted write method can continuously transmit two requests without receiving a response to the request.

If a signal signaled according to the non-posted write method utilizes the MO, the MO count is decremented by the signaling, and the signal can be stored in the response waiting buffer. In this case, the response waiting buffer corresponding to the MO count may be required. That is, if the MO count increases, a response waiting buffer with a corresponding increased capacity or number of buffers may be required. For example, in the embodiment of FIG. 20, if the MO count is 1, a deadlock may not occur even without a response waiting buffer, but if the MO count is 2, a response waiting buffer is required, and a deadlock may occur if there is no response waiting buffer.

Figure 21:
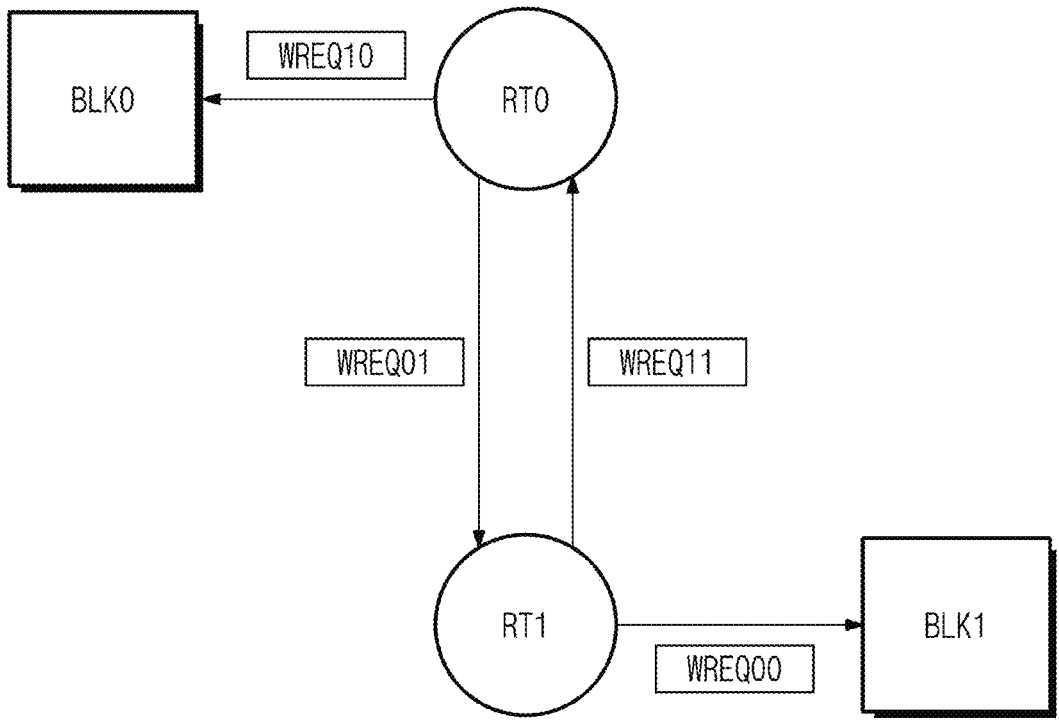
FIG. 21 is a diagram for explaining signaling according to a posted write method in a signaling method according to embodiments of the present disclosure.

FIG. 21 is a diagram for explaining signaling according to a posted write method in a signaling method according to embodiments of the present disclosure.

In the neural cluster 100 according to embodiments of the present disclosure, the synchronization signals can be signaled on the control channel according to the posted write method. Hereinafter, descriptions of parts identical to those described in FIG. 20 will be omitted.

The step of signaling according to the posted write method if the signal to be signaled is a synchronization signal (S120) in FIG. 19 may include the step of transmitting a synchronization request by the master, and the step of transmitting, by the master, a next signal of the synchronization request without waiting for a synchronization response to the synchronization request. Hereinafter, the process in which signals are signaled according to the posted write method between the zeroth block (BLK0) and the first block (BLK1) will be described in detail.

First, a case where the zeroth block (BLK0) operates as the master and the first block (BLK1) operates as the slave will be described. The zeroth block (BLK0) can generate and transmit a request (WREQ00) to the first block (BLK1). The first block (BLK1) may not transmit a response to the request (WREQ00) to the zeroth block (BLK0). For example, the first block (BLK1) may not generate any response to the request (WREQ00). Alternatively, a response generated to the request (WREQ00) in the first block (BLK1) may be discarded or stored. The zeroth block (BLK0) can transmit the next signal of the request (WREQ00) without waiting for a response from the first block (BLK1). The next signal may be a new request (WREQ01). That is, the zeroth block (BLK0) can generate and transmit a new request (WREQ01) to the first block (BLK1) without waiting for a response from the first block (BLK1). In this case, the new request (WREQ01) does not decrement the MO count, and the response waiting buffer is not required, and even if a response waiting buffer exists, the signal may not be stored in the response waiting buffer.

Next, a case where the first block (BLK1) operates as the master and the zeroth block (BLK0) operates as the slave will be described. The first block (BLK1) can generate and transmit a request (WREQ10) to the zeroth block (BLK0). The zeroth block (BLK0) may not transmit a response to the request (WREQ10) to the first block (BLK1). For example, the zeroth block (BLK0) may not generate any response to the request (WREQ10). Alternatively, a response generated to the request (WREQ10) in the zeroth block (BLK0) may be discarded or stored. The first block (BLK1) can transmit the next signal without waiting for a response from the zeroth block (BLK0). The next signal may be a new request (WREQ11). That is, the first block (BLK1) can generate and transmit a new request (WREQ11) to the zeroth block (BLK0) without waiting for a response from the zeroth block (BLK0). In this case, the new request (WREQ11) does not decrement the MO count, and the response waiting buffer is not required, and even if a response waiting buffer exists, the signal may not be stored in the response waiting buffer.

According to embodiments of the present disclosure, signals signaled according to the posted write method do not require the response waiting buffer and are not constrained by the limitation of the MO count. Accordingly, a network that is very advantageous in terms of scalability and efficiency can be configured.

According to embodiments of the present disclosure, by integrating and signaling the control signals and the synchronization signals through a single control channel, the area occupied by the mesh network can be reduced, and high scalability can be provided. In addition, in signaling on the control channel, stability can be ensured by maintaining the non-posted write method for the control signals, and fast signaling without deadlock can be achieved, without being constrained by the limitation of MO count, by using the posted write method for the synchronization signals.

Figure 22A:
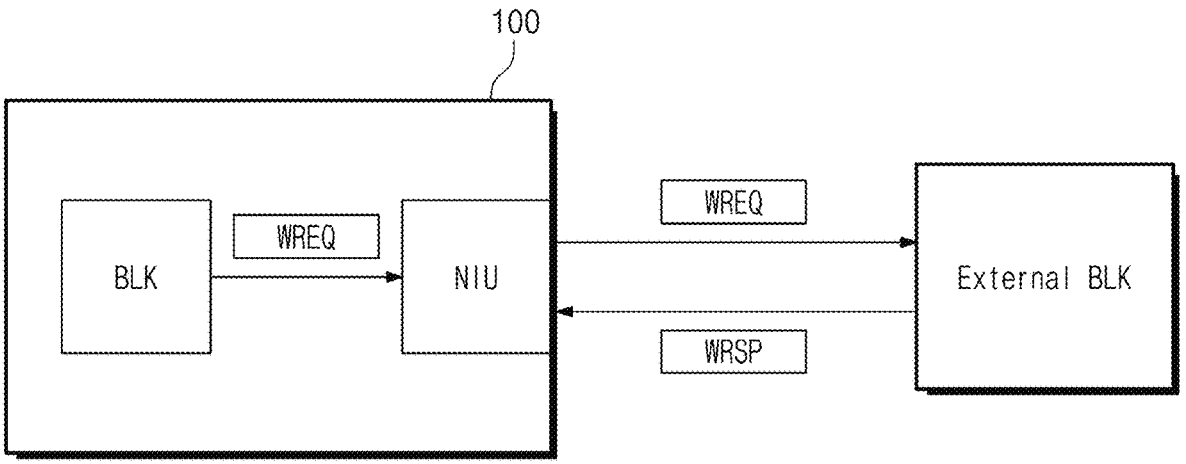
FIGS. 22A and 22B are diagrams for explaining synchronization signal signaling with an external block of the neural cluster in a signaling method according to embodiments of the present disclosure.
Figure 22B:
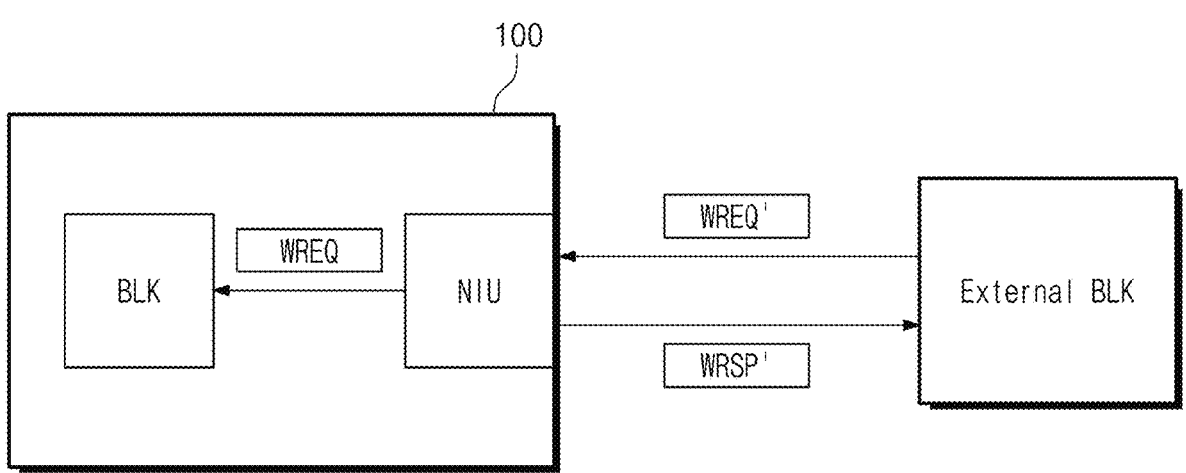

FIGS. 22A and 22B are diagrams for explaining synchronization signal signaling with an external block of a neural cluster in a signaling method according to embodiments of the present disclosure.

A block (BLK) may be one of a plurality of blocks included in the neural cluster 100 according to embodiments of the present disclosure. For example, the block (BLK) may be the neural core unit 1000 or the shared memory unit 2000. The block (BLK) may follow the signaling method according to embodiments of the present disclosure described with reference to FIGS. 16 to 21. That is, the block (BLK) can be configured to signal the synchronization signals on the control channel according to the posted write method.

An external block (External BLK) may be a block outside the neural cluster 100 that is not included in the neural cluster 100 according to embodiments of the present disclosure. The external block may or may not follow the signaling method according to embodiments of the present disclosure described with reference to FIGS. 16 to 21. FIGS. 22A and 22B describe an example where the external block does not follow the signaling method according to embodiments of the present disclosure. That is, the external block can be configured to signal the synchronization signals according to the non-posted write method.

The neural cluster 100 may include a network interface unit (NIU) for communication with the external block. The network interface unit may include a master network interface unit and a slave network interface unit. The network interface unit can transmit signals between a plurality of internal blocks of the neural cluster 100 and the external block.

Referring to FIG. 22A, when the block (BLK) transmits a synchronization request (WREQ) to the external block, the network interface unit can transmit the synchronization request (WREQ) to the external block. For example, if the external block is configured to signal the synchronization signals according to the non-posted write method, the network interface unit can transmit the synchronization request (WREQ) to the external block. The external block can generate a synchronization response (WRSP) and transmit it to the block (BLK). The network interface unit can receive and discard the synchronization response (WRSP). That is, since the block (BLK) is configured to signal the synchronization signals according to the posted write method, it does not wait for or require a response to the transmitted synchronization request (WREQ). Therefore, the network interface unit can discard the synchronization response (WRSP) received from the external block.

Referring to FIG. 22B, when the external block transmits a synchronization request (WREQ') to the block (BLK), the network interface unit can convert the synchronization request (WREQ') into a synchronization request (WREQ) following the block's signaling method and transmit it to the block (BLK). That is, the network interface unit can convert the synchronization request (WREQ') into the synchronization request (WREQ) following the posted write method and transmit it to the block (BLK). Since the block (BLK) is configured to signal the synchronization signals according to the posted write method, it may not transmit a synchronization response to the external block for the synchronization request (WREQ). For example, the block (BLK) may not generate a synchronization response to the synchronization request (WREQ), or a synchronization response generated for the synchronization request (WREQ) may be discarded or stored. The network interface unit can generate a synchronization response (WRSP') and transmit it to the external block. That is, since the block (BLK) is configured to signal the synchronization signals according to the posted write method, it may not transmit a synchronization response to the external block for the synchronization request (WREQ). Therefore, the network interface unit can directly generate the synchronization response (WRSP') and transmit it to the external block which signals the synchronization signals according to the non-posted write method.

According to embodiments of the present disclosure, in signaling between an internal block of the neural cluster 100 that follows the posted write method for the signaling of the synchronization signal and an external block that follows the non-posted write method, the network interface unit directly discards or generates the synchronization responses according to the signaling method of each block, thereby enabling smooth exchange of synchronization signals even between blocks with different signaling methods.

In the neural cluster 100 according to embodiments of the present disclosure, a path change algorithm can be performed in each of a plurality of routers 3100 constituting the mesh network 3000. If the path change algorithm is complex, the latency required for data transfer during data movement may be long, so it is necessary to implement a simple path change algorithm that does not require separate control logic or counters. In addition, data movement patterns can be formed within the mesh network 3000 according to AI workloads in the neural cluster 100. It is necessary to control the data movement to smoothly support such data movement patterns. Hereinafter, the configuration of the neural cluster 100 that controls the data movement based on a priority queue according to embodiments of the present disclosure to solve this problem will be described.

Figure 23:
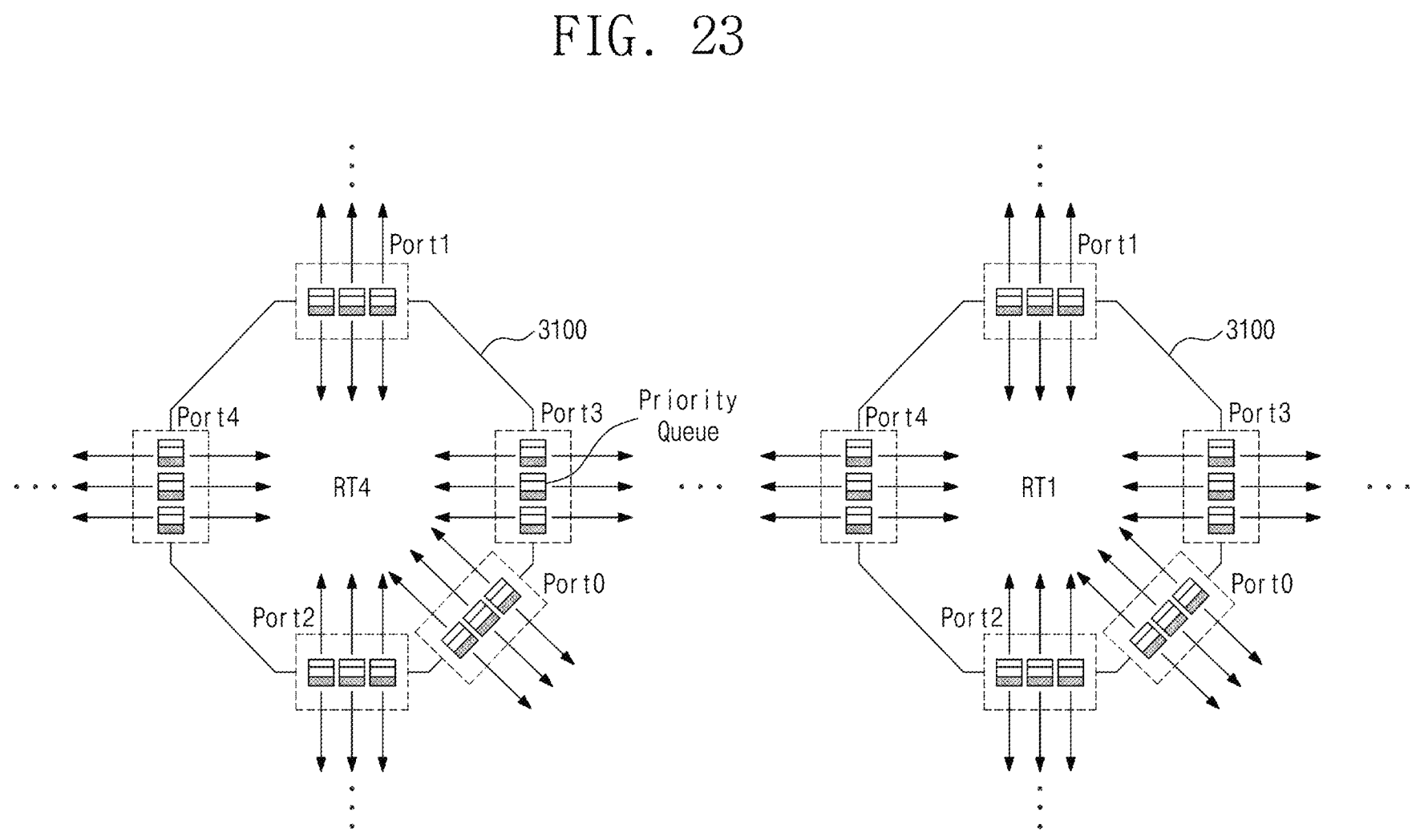

FIG. 23 is a diagram for explaining the configuration of a router of a mesh network having a priority queue according to embodiments of the present disclosure.

The embodiments of FIG. 23 are described based on the neural cluster 100 including the mesh network 3000 for connecting a plurality of blocks (i.e., the blocks including the plurality of neural core units 1000 and the plurality of shared memory units 2000) according to embodiments of the present disclosure. Therefore, descriptions of parts identical to the above-described configurations are omitted.

Referring to FIG. 23, each of the plurality of routers 3100 may include the zeroth to fourth ports (Port0 to Port4). For example, the first router (RT1) may include five ports, i.e., zeroth to fourth ports (Port0 to Port4), and the fourth router (RT4) may also include five ports, i.e., zeroth to fourth ports (Port0 to Port4). The mesh network bus 3200 may include a plurality of channels (shown as bidirectional arrows).

The plurality of channels included in the mesh network bus 3200 may include, for example, the data channel, the request channel, and the response channel according to the embodiments of FIGS. 12 to 15. Referring to FIG. 23, the three bidirectional arrows indicated for each of the zeroth to fourth ports (Port0 to Port4) of each of the first router (RT1) and the fourth router (RT4) may correspond to a plurality of channels, for example, the data channel, the request channel, and the response channel. That is, the plurality of channels may be physical channels passing from an inside to an outside of each of the plurality of ports (Port0 to Port4) of each of the plurality of routers 3100 or from the outside to the inside thereof.

In embodiments of the present disclosure, a priority queue (preferably, a plurality of priority queues) can be provided for each of the plurality of channels at each of the plurality of ports, the zeroth to fourth ports (Port0 to Port4), of each of the plurality of routers 3100. In embodiments of the present disclosure, a priority queue is a data structure that stores data according to priority, and when multiple data simultaneously desire to be served, allows data with higher priority to be retrieved first. Specifically, a priority queue is a queue that manages the priorities of each candidate (e.g., source port), and a method can be applied that gives priority to the candidate (port) with higher priority among the candidates (ports) for which the input enable signal, described later, is activated. The neural cluster 100 according to embodiments of the present disclosure can control data movement based on a priority queue.

In this specification, "data movement" refers not only to the movement of data but also to the movement of various signals transmitted through the mesh network 3000, including addresses and requests, and the present disclosure is not limited thereto.

Referring back to FIG. 23, a priority queue can exist for each port of each channel of each router 3100. Specifically, a priority queue may exist for each of the three channels indicated for each of the five ports (Port0 to Port4) of the first router (RT1). The fourth router (RT4) can also have the same structure as the first router (RT1). In FIG. 23, the first router (RT1) and the fourth router (RT4) are described for convenience of explanation, but other routers 3100 included in the mesh network 3000 can be configured similarly. As will be described later, since the priority queue is independently programmable for each port of each channel of each router 3100, the priority queue can be individually controlled for each router 3100, each channel, and each port.

Figure 24:
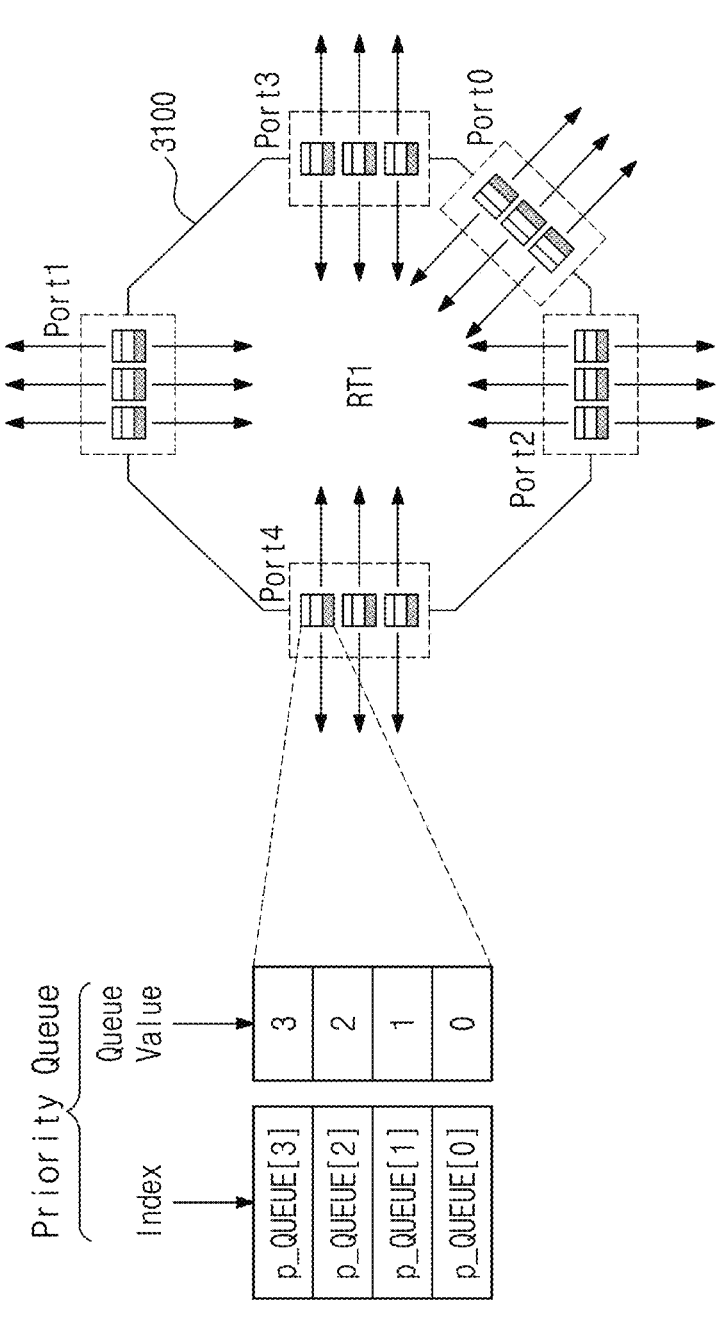
FIG. 24 is a diagram for explaining the configuration of the priority queue according to embodiments of the present disclosure.

FIG. 24 is a diagram for explaining the configuration of a priority queue according to embodiments of the present disclosure.

Referring to FIG. 24, a priority queue according to embodiments of the present disclosure may include an index and a queue value corresponding to the index. Specifically, the index is an integer value indicating the position of each queue value within the priority queue, generally starting from 0 and increasing by the number of queue values. Each index can correspond one-to-one with one queue value stored in the priority queue. The queue value is data actually stored in the priority queue. As will be described later, the queue value may have a port number (e.g., a source port number), and the index may represent a priority. The data type of the queue value may vary depending on the type of data stored, and may include, for example, integers, real numbers, strings, and so on. In the priority queue, queue values can be accessed through indexes, and the priority of the queue values can be checked. The priority queue can rearrange indexes according to the priority of queue values so that the queue values with higher priority are located at the front of the queue (at the bottom in the case of FIG. 24).

In a priority queue according to embodiments of the present disclosure, the port number of each of the plurality of ports can be added as a queue value. Specifically, referring to FIG. 24, the first router (RT1) includes the zeroth to fourth ports (Port0 to Port4), and port numbers (0 to 4) of the zeroth to fourth ports (Port0 to Port4) can be added as queue values. Through this, in each router, the priority queue of the port corresponding to the destination can add, as queue values, the port numbers of the ports corresponding to the source transmitting signals such as data (other than the destination port). The first router (RT1) can transmit signals including data, commands, and addresses according to the order in which port numbers are stored in the priority queue.

In this specification, among the plurality of ports, a port corresponding to a destination may be referred to as a destination port, and among the plurality of ports, a port corresponding to a source that transmits a signal other than the destination port may be referred to as a source port.

According to embodiments of the present disclosure, in each of the plurality of routers 3100, the plurality of ports, the zeroth to fourth ports (Port0 to Port4), include the destination port to which the priority queue is applied and one or more source ports different from the destination port, and in the priority queue of the destination port, the port number of the source port may be added as a queue value. For example, referring to FIG. 24, the first router RT1 includes the zeroth to fourth ports (Port0 to Port4), and the fourth port (Port4) to which the priority queue is applied can be a destination port, and the remaining ports of the first router RT1, that is, the zeroth to third ports (Port0 to Port3), can be source ports. At this time, in the priority queue of the fourth port (Port4), port numbers (0 to 3) of the zeroth to third ports (Port0 to Port3) corresponding to the source that transmits signals such as data can be added as queue values. The first router RT1 can transmit signals (including data, commands, and addresses) of corresponding ports to the fourth port (Port4) according to the order in which port numbers are stored in the priority queue, that is, in the order of 0, 1, 2, 3.

Similarly, in the first router (RT1), the priority queue of the zeroth port (Port0) corresponding to the destination port can add the port numbers (1 to 4) of the first to fourth ports (Port1 to Port4) corresponding to the source port as queue values, and the priority queue of the first port (Port 1) corresponding to the destination port can add the port numbers (0, 2, 3, 4) of the zeroth, second, third, fourth ports (Port0, 2, 3, 4) corresponding to the source port as queue values, and the priority queue of the second port (Port2) corresponding to the destination port can add the port numbers (0, 1, 3, 4) of the zeroth, first, third, fourth ports (Port0, 1, 3, 4) corresponding to the source port as queue values, and the priority queue of the third port (Port3) corresponding to the destination port can add the port numbers (0, 1, 2, 4) of the zeroth, first, second, fourth ports (Port0, 1, 2, 4) corresponding to the source port as queue values.

Figure 25:
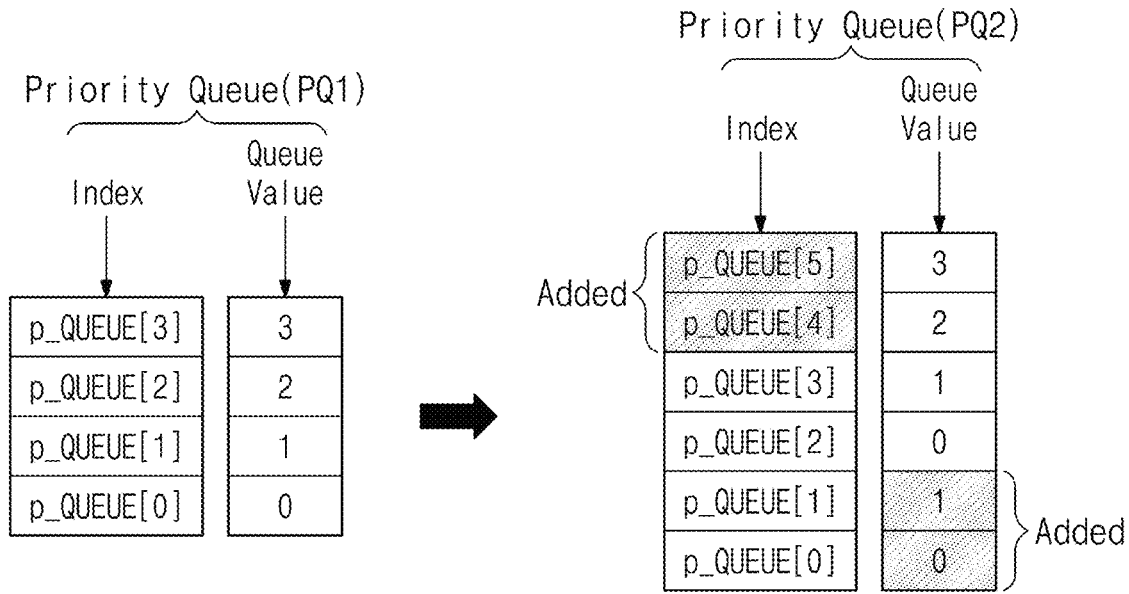
FIG. 25 is a diagram for explaining a weighted round robin method based on the priority queue according to embodiments of the present disclosure.

FIG. 25 is a diagram for explaining a weighted round robin method based on a priority queue according to embodiments of the present disclosure.

In embodiments of the present disclosure, the priority queue can operate in a round robin method. The round robin method refers to a method of sequentially providing service (for a certain period) to each queue value stored in a priority queue without prioritizing any specific candidate. That is, it can operate by starting from the queue value at the very front (at the very bottom in the case of FIG. 25) of the priority queue, processing them one by one, and then moving the processed queue value to the very back (at the very top in the case of FIG. 25) of the priority queue. In the case of a first priority queue (PQ1) shown in FIG. 25, it can provide services in the order of 0, 1, 2, 3, from the queue value at the very front of the first priority queue (PQ1) to the queue value at the very back thereof. The round robin method can be applied when all candidates need to be served fairly or equally.

In embodiments of the present disclosure, the round robin method may include a weighted round robin method. The weighted round robin method basically follows the round robin method but assigns more weight to specific candidates. That is, the weighted round robin method extends the basic round robin method by assigning weights to each queue value and providing more service opportunities to queue values with higher weights. The weighted round robin method does not simply provide a service sequentially, but provides the service proportionally to the weight, thereby increasing the data transfer amount from a specific port. At the same time, it can relatively suppress (reduce) the data transfer amount from ports other than a specific port within the router 3100.

For example, in the second priority queue (PQ2) of FIG. 25, weights can be assigned to queue values 0 and 1, so that 0 and 1 exist as queue values twice each. If the second priority queue (PQ2) of FIG. 25 is applied to the priority queue of FIG. 24, it can increase the transfer amount from specific source ports (Port0, Port1) in the fourth port (Port4) which is the destination port, while relatively suppressing (reducing) the transfer amount from other source ports (Port2, Port3).

The weighted round robin method can be implemented by setting the queue depth of the priority queue to be greater than the number of ports (specifically, the number of source ports other than the destination port to which the priority queue is applied), i.e., by adding indexes and repeatedly adding queue values to be weighted. Alternatively, the weighted round robin method can be implemented by simply adjusting the queue values if the weight ratio is converted while maintaining the queue depth of the priority queue.

Through the weighted round robin method, the amount of transmission, the direction of transmission, etc., of the signal including data, commands, and addresses within the neural cluster 100 can be adjusted. For example, if a specific neural core unit 1000 or a specific shared memory unit 2000 requires more data, a higher weight can be assigned to the router, the channel, and the port on the path to that unit to increase the data transfer amount.

In embodiments of the present disclosure, the priority queue is independently programmable for each of the plurality of channels passing through each of the plurality of ports of each of the plurality of routers 3100. Accordingly, each channel has a channel-specific priority queue, and the priority queue of one channel can operate independently of the priority queues of other channels. In addition, the priority queue can operate independently for each port and each router.

By adjusting the index and queue value of the priority queue according to a data movement pattern within the neural cluster 100, weights can be assigned to the corresponding priority queue per router, channel, and port related to the data movement pattern. That is, the priority queue of each channel can be dynamically adjusted according to the data movement pattern within the neural cluster 100. Through this, specific routers, channels, and ports where signals including data, commands, and addresses are concentrated within the neural cluster 100 can be identified, and the priority queue can be dynamically changed accordingly to improve signal transmission efficiency. For example, if a specific neural core unit 1000 intensively requests data for a specific period, weights can be assigned to the router, the channel, and the port on the path to that unit. That is, according to the data movement pattern, weights can be assigned to the router, the channel, and the port on the path to a specific neural core unit 1000 so that data can be intensively transmitted to that unit. Conversely, if data movement to a specific router, channel, and port is low, the weight can be reduced by reducing the index of the relevant queue value or removing it from the priority queue. As described above, by providing a priority queue to which the weighted round robin method is applied for each of the plurality of channels passing through each of the plurality of ports of each of the plurality of routers, weights can be assigned per router, channel, and port related to the data movement pattern, and data transfer paths and data transfer amounts can be efficiently controlled.

Figure 26:
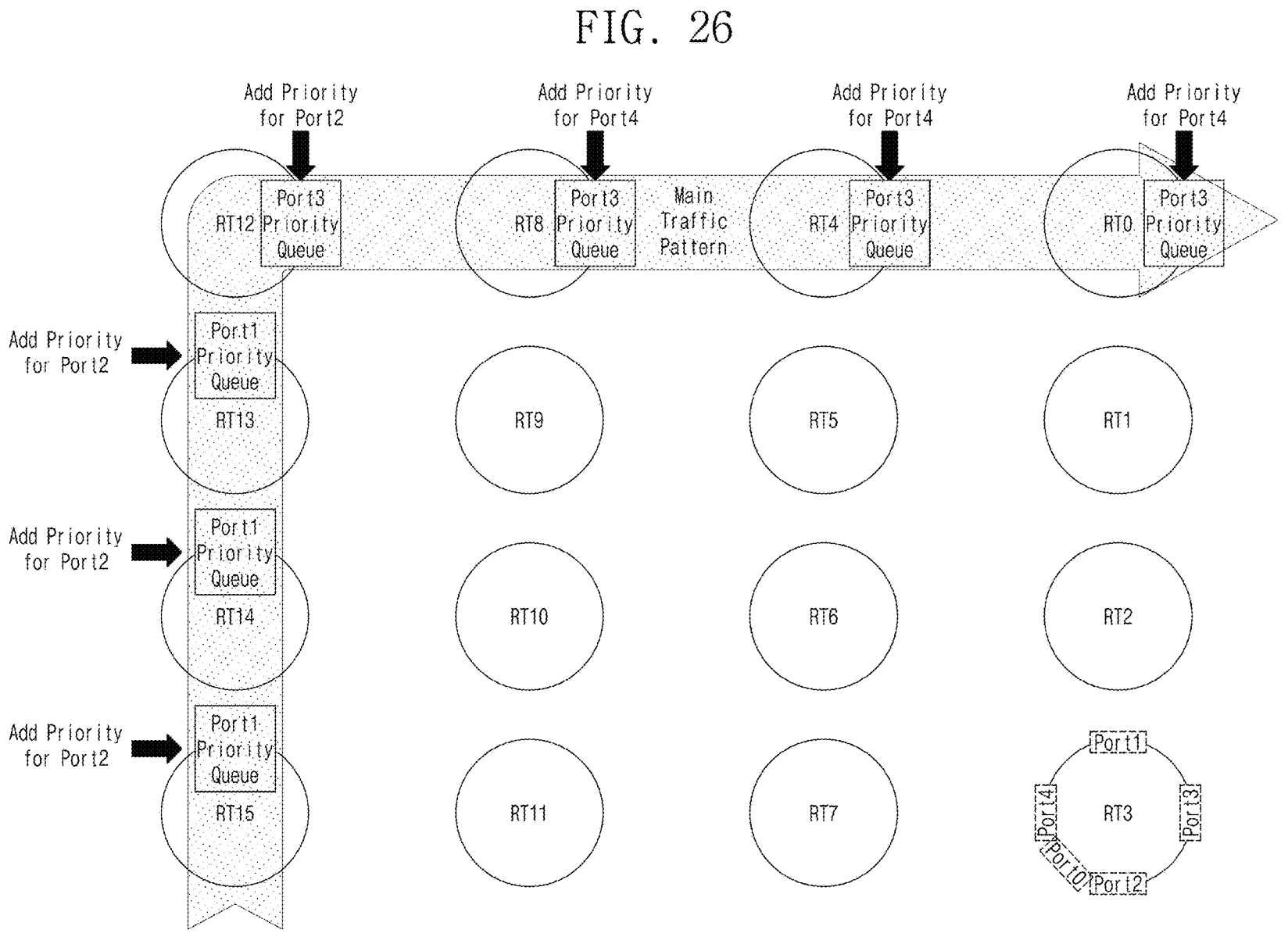

FIG. 26 is a diagram for explaining a configuration for controlling a priority queue according to a data movement pattern within a neural cluster according to embodiments of the present disclosure.

According to the present disclosure, in a structure where the plurality of shared memory units 2000 are arranged in the central portion of the neural cluster 100 and the plurality of neural core units 1000 are arranged symmetrically above and below the shared memory area where the plurality of shared memory units 2000 are arranged, a data movement pattern can be formed according to an AI workload.

Referring to FIG. 26, for example, a data movement pattern can be formed in the direction of the wide arrow. In this case, weights can be assigned per router, channel, and port related to the data movement pattern. A plurality of routers (RT0 to RT15) in FIG. 26 may include five ports, i.e., zeroth to fourth ports (Port0 to Port4), in the same manner as the first router (RT1) or the fourth router (RT4) in FIGS. 23 and 24. Specifically, if a weight to the second port (Port2) is assigned at the first port (Port1) of a fifteenth router (RT15), the second port (Port2) receives more service compared to other ports (Port0, Port3, Port4), and the data transfer amount can be increased in a direction from bottom to top of the fifteenth router (RT15). Similarly, a weight to the second port (Port2) can be assigned at the first port (Port1) of a fourteenth router (RT14), a weight to the second port (Port2) can be assigned at the first port (Port1) of a thirteenth router (RT13), a weight to the second port (Port2) can be assigned at the third port (Port3) of a twelfth router (RT12), a weight to the fourth port (Port4) can be assigned at the third port (Port3) of an eighth router (RT8), a weight to the fourth port (Port4) can be assigned at the third port (Port3) of a fourth router (RT4), and a weight to the fourth port (Port4) can be assigned at the third port (Port3) of a zeroth router (RT0). Through this, data movement can be controlled so that data transfer efficiency is increased according to the data movement pattern in the direction of the wide arrow shown in FIG. 26.

In embodiments of the present disclosure, the priority queue can operate to determine priorities among channels of the same type. For example, if the second priority queue (PQ2) of FIG. 25, as a queue for a data channel, is applied to the priority queue of FIG. 24, it can increase the transfer amount of the data channel from specific ports (Port0, Port1) corresponding to source ports at the fourth port (Port4) which is the destination port, while relatively suppressing (reducing) the transfer amount of the data channel from other ports (Port2, Port3). Priority queues for the request channel and the response channel can also operate in the same way.

For example, in the weighted round robin method, if the number of indexes in the priority queue is a multiple of the number of one or more source ports (different from the destination port to which the priority queue is applied), and the port numbers of the source ports are equally added as the queue values corresponding to the indexes, weights can be equally assigned to the source ports. For example, if the number of source ports is 4, the number of indexes in the priority queue is 8, and the port numbers of the source ports are equally added as queue values (specifically, 2 for each of the 4 source ports), weights can be equally assigned 2 times for each source port. Through this, the router 3100 can cause signals including data, commands, and addresses to be transmitted from all source ports at the same rate.

For example, in the weighted round robin method, if the number of indexes in the priority queue is a multiple of the number of one or more source ports (different from the destination port to which the priority queue is applied), and the port numbers of the source ports are unequally added as the queue values corresponding to the indexes, weights can be assigned to the source ports as many times as the port numbers of the source ports are added as the queue values. For example, if the number of source ports is 4, the number of indexes in the priority queue is 8, and the port numbers of the source ports are unequally added as queue values (specifically, 4 source ports are added 1, 3, 2, 2 times, respectively), weights can be assigned to the corresponding source ports at ratios of 1, 3, 2, 2 times, respectively. Through this, the router 3100 can control the weight ratio for each source port to transmit signals including data, commands, and addresses.

In embodiments of the present disclosure, in the weighted round robin method, if the number of indexes in the priority queue is not a multiple of the number of one or more source ports (different from the destination port to which the priority queue is applied), and the port numbers of the source ports are unequally added as the queue values corresponding to the indexes, weights can be assigned to the source ports as many times as the port numbers of the source ports are added as the queue values. For example, as in the case of the second priority queue (PQ2) shown in FIG. 25, if the number of source ports is 4, the number of indexes in the priority queue is 6, and the port numbers of the source ports are unequally added as queue values (specifically, 4 source ports (Port0, Port1, Port2, Port3) are added 2, 2, 1, 1 times, respectively), weights can be assigned to the corresponding source ports (Port0, Port1, Port2, Port3) at ratios of 2, 2, 1, 1 times, respectively. Through this, the router can control the weight ratio for each source port to transmit signals including data, commands, and addresses.

According to embodiments of the present disclosure, by utilizing a priority queue operating based on the weighted round robin method, weights can be flexibly assigned per router, channel, and port related to the data movement pattern. That is, the number of indexes can be adjusted without being restricted by the number of indexes of the priority queue and the number of source ports (other than the destination port to which the priority queue is applied). Accordingly, even if port numbers of source ports are added or the number of indexes is fixed, the movement of signals including data, commands, and addresses within the neural cluster 100 can be optimized by adjusting the ratio at which the port numbers of the source ports are added.

Figure 27:
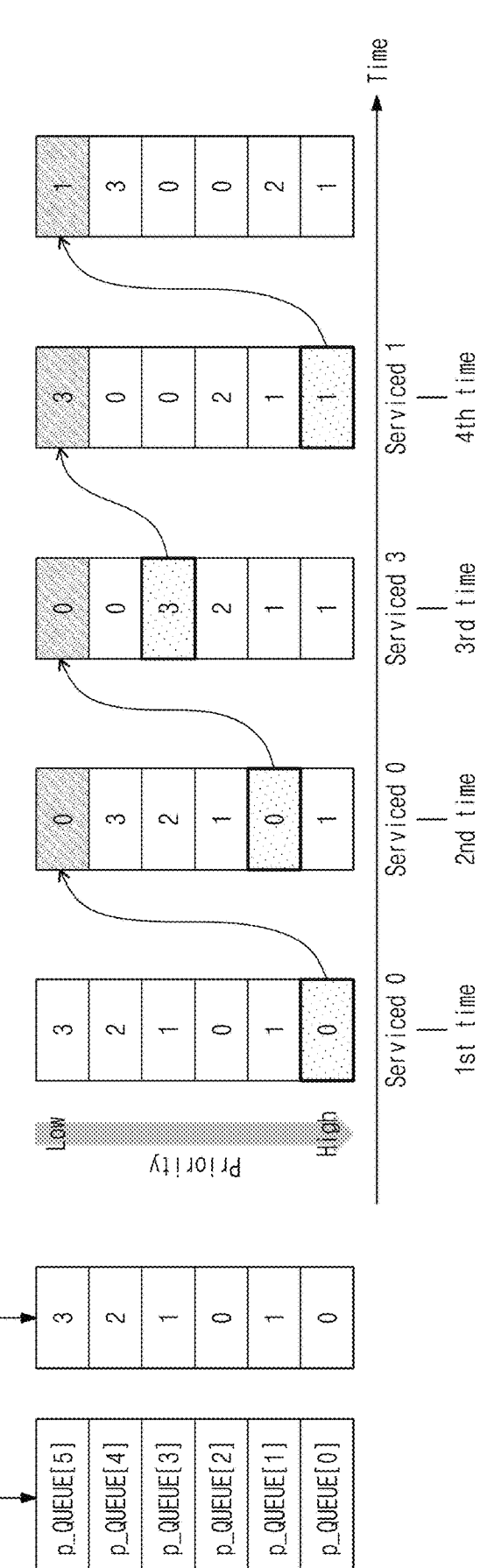
FIG. 27 is a diagram for explaining the operation of the priority queue according to embodiments of the present disclosure.

FIG. 27 is a diagram for explaining the operation of a priority queue according to embodiments of the present disclosure.

FIG. 27 illustrates a process in which a specific queue value is served in a priority queue according to a first time (1st time), a second time (2nd time), a third time (3rd time), and a fourth time (4th time), and other queue values are set in the priority queue accordingly.

In embodiments of the present disclosure, in the priority queue, if a first queue value is served at the first time (1st time), at the second time (2nd time), one or more queue values that were lower in priority than the first queue value at the first time (1st time) are set to increase by one priority, and the first queue value can be set as the lowest priority of the priority queue. If a second queue value is served at the second time (2nd time), at the third time (3rd time), one or more queue values that were lower in priority than the second queue value at the second time (2nd time) are set to increase by one priority, and the second queue value can be set as the lowest priority of the priority queue that is lower in priority than the first queue value.

Referring to FIG. 27, when the first queue value (0) is served (upon reception of a request) at the first time (1st time), at the second time (2nd time) corresponding to the next cycle, one or more queue values (1, 0, 1, 2, 3) that were lower in priority than the first queue value (0) at the first time (1st time) increase by one priority, and the first queue value (0) can be set as the lowest priority of the priority queue.

In addition, when the second queue value (0) is served (upon reception of a request) at the second time (2nd time), at the third time (3rd time), one or more queue values (1, 2, 3, 0) that were lower in priority than the second queue value (0) at the second time (2nd time) are set to increase by one priority, and the second queue value (0) can be set as the lowest priority of the priority queue that is lower in priority than the first queue value (0). At this time, one or more queue values (1) that were higher in priority than the second queue value (0) at the second time (2nd time), can maintain their priority at the third time (3rd time), for example, as values with no requests or values not waiting to be served.

Similarly, when the third queue value (3) is served (upon reception of a request) at the third time (3rd time), at the fourth time (4th time), one or more queue values (0, 0) that were lower in priority than the third queue value (3) at the third time (3rd time) are set to increase by one priority, and the third queue value (3) can be set as the lowest priority of the priority queue that is lower in priority than the second queue value (0). At this time, one or more queue values (1, 1, 2) that were higher in priority than the third queue value (3) at the third time (3rd time) can maintain their priority at the fourth time (4th time), for example, as values with no requests or values not waiting to be served.

The priority queue of FIG. 27 operates identically to the above-mentioned method after the fourth time (4th time). In this process, the priorities of all queue values in the priority queue can change cyclically over time. Through this, it is possible to prevent a situation where a specific queue value continues to not receive service and to ensure that all queue values receive service fairly or equally.

Figure 28:
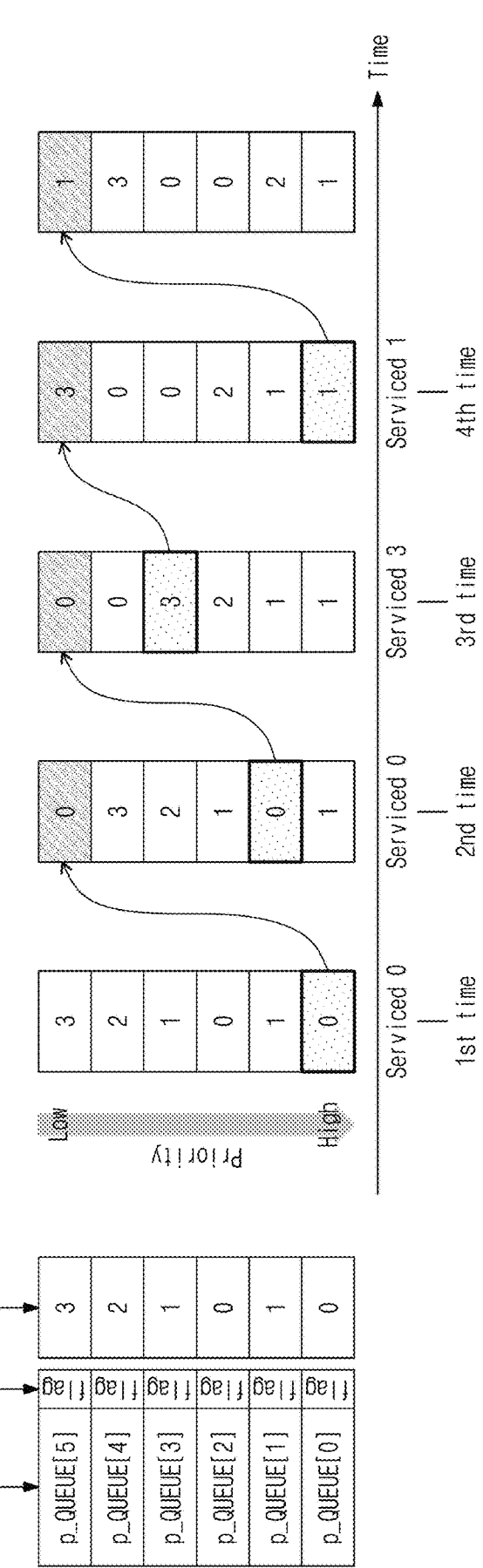
FIGS. 28 and 29 are diagrams for explaining an enable flag added to the priority queue according to embodiments of the present disclosure.
Figure 29:
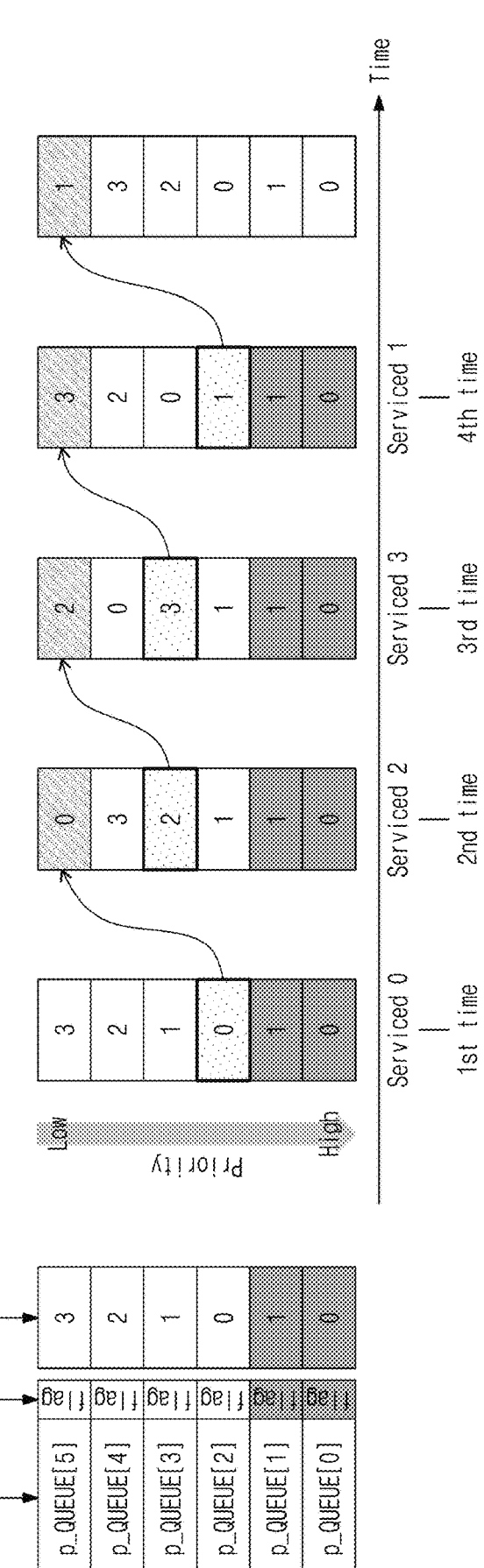

FIGS. 28 and 29 are diagrams for explaining an enable flag added to a priority queue according to embodiments of the present disclosure.

In embodiments of the present disclosure, the priority queue may further include an enable flag set for each index. Referring to FIGS. 28 and 29, the enable flag can serve as an on/off switch that determines whether to use the queue value corresponding to the index. By including an enable flag, the priority queue can assign desired weights to desired routers, channels, and ports. In addition, the number and types of candidates in the priority queue, for example, the number and types of source ports (other than the destination port to which the priority queue is applied), and the queue depth of the priority queue, can be independently operated.

For example, assume a situation where there are 4 candidates and all candidates are given the same priority. If there is no enable flag, the queue depth of the priority queue must be a multiple of 4 to handle the above situation, and the weight ratios to be supported may also be limited. On the other hand, if there is an enable flag, the above situation can be handled by setting the queue depth of the priority queue to be 4 or more. This is because by adjusting the enable flag, the number of candidates, candidate types, and weight ratios can be freely adjusted in a priority queue with a queue depth of 4 or more.

In embodiments of the present disclosure, if the queue value of the index corresponding to the enable flag is to be used, an enable flag signal indicating the enable flag can be activated. If the queue value of the index corresponding to the enable flag is not to be used, the enable flag signal can be deactivated. For example, activating an enable flag signal may mean setting the enable flag to logic "1," and deactivating an enable flag signal may mean setting the enable flag to logic "0." However, this is merely an example, and the logic of the enable flag corresponding to activating or deactivating the enable flag signal can be configured in various ways, and the present disclosure is not limited thereto.

According to embodiments of the present disclosure, for example, if temporary blocking of data transmission from a specific port is required, it can be implemented by deactivating the enable flag signal of the queue value corresponding to that port number. The corresponding queue value can be ignored during the round robin (including weighted round robin) process, so that data may not be transmitted from that port. Conversely, if data transmission from that port is to be allowed again, it can be implemented by activating the enable flag signal. In addition, if the same priority is desired for all candidates, it can be implemented by activating only 4 (i.e., 4 indexes corresponding to different port numbers) enable flag signals and deactivating the remaining (i.e., indexes corresponding to duplicate port numbers) enable flag signals. In addition, if an additional weight of 1 is to be given to only a specific candidate, it can be implemented by adding only that candidate value to the priority queue and then activating the enable flag signal of that index.

For example, FIG. 28 may illustrate an embodiment in which weights of 1 are added to queue values 0 and 1 corresponding to indexes 0 and 1, and the enable flag signals corresponding to all indexes are activated over all times. In this case, the serving of queue values and the setting of priorities in the priority queue can be performed in the manner described with reference to FIG. 27.

In addition, FIG. 29 may illustrate an embodiment in which, after adding a weight of 1 to queue values 0 and 1 corresponding to indexes 0 and 1, the enable flag signals corresponding to indexes 0 (p_QUEUE [0]) and 1 (p_QUEUE [1]) are deactivated over the first time (1st time) to the fourth time (4th time). In this case, from the first time (1st time) to the fourth time (4th time), all candidates corresponding to the indexes (p_QUEUE [2] to p_QUEUE [5]) can be given the same priority.

Specifically, referring to FIG. 29, when the first queue value (0) is served (upon reception of a request) at the first time (1st time), at the second time (2nd time) corresponding to the next cycle, one or more queue values (1, 2, 3) that were lower in priority than the first queue value (0) at the first time (1st time) increase by one priority, and the first queue value (0) can be set as the lowest priority of the priority queue. In this case, the enable flag signals corresponding to indexes 0 (p_QUEUE [0]) and 1 (p_QUEUE [1]) are deactivated, so that the corresponding queue values 0 and 1 are not used.

In addition, when the second queue value (2) is served (upon reception of a request) at the second time (2nd time), at the third time (3rd time), one or more queue values (3, 0) that were lower in priority than the second queue value (2) at the second time (2nd time) are set to increase by one priority, and the second queue value (2) can be set as the lowest priority of the priority queue that is lower in priority than the first queue value (0). At this time, one or more queue values (1) that were higher in priority than the second queue value (2) at the second time (2nd time) can maintain their priority at the third time (3rd time), for example, as values with no requests or values not waiting to be served. In this case as well, the enable flag signals corresponding to indexes 0 (p_QUEUE [0]) and 1 (p_QUEUE [1]) are deactivated, so that the corresponding queue values 0 and 1 are not used.

Similarly, when the third queue value (3) is served (upon reception of a request) at the third time (3rd time), at the fourth time (4th time), one or more queue values (0, 2) that were lower in priority than the third queue value (3) at the third time (3rd time) are set to increase by one priority, and the third queue value (3) can be set as the lowest priority of the priority queue that is lower in priority than the second queue value (2). At this time, one or more queue values (1) that were higher in priority than the third queue value (3) at the third time (3rd time) can maintain their priority at the fourth time, for example, as values with no requests or values not waiting to be served. In this case as well, the enable flag signals corresponding to indexes 0 (p_QUEUE [0]) and 1 (p_QUEUE [1]) are deactivated, so that the corresponding queue values 0 and 1 are not used.

In the priority queue of FIG. 29, for example, if the enable flag signals corresponding to indexes 0 (p_QUEUE [0]) and 1 (p_QUEUE [1]) are activated after the fourth time (4th time), the corresponding queue values 0 and 1 can be used.

According to embodiments of the present disclosure, by using enable flag signals, the transmission of signals including data, commands, and addresses from specific ports can be flexibly controlled. By selectively activating or deactivating specific ports according to specific situations, data flow within the neural cluster 100 can be efficiently managed, and data concentration on specific routers, channels, and ports can be controlled as needed.

Figure 30:
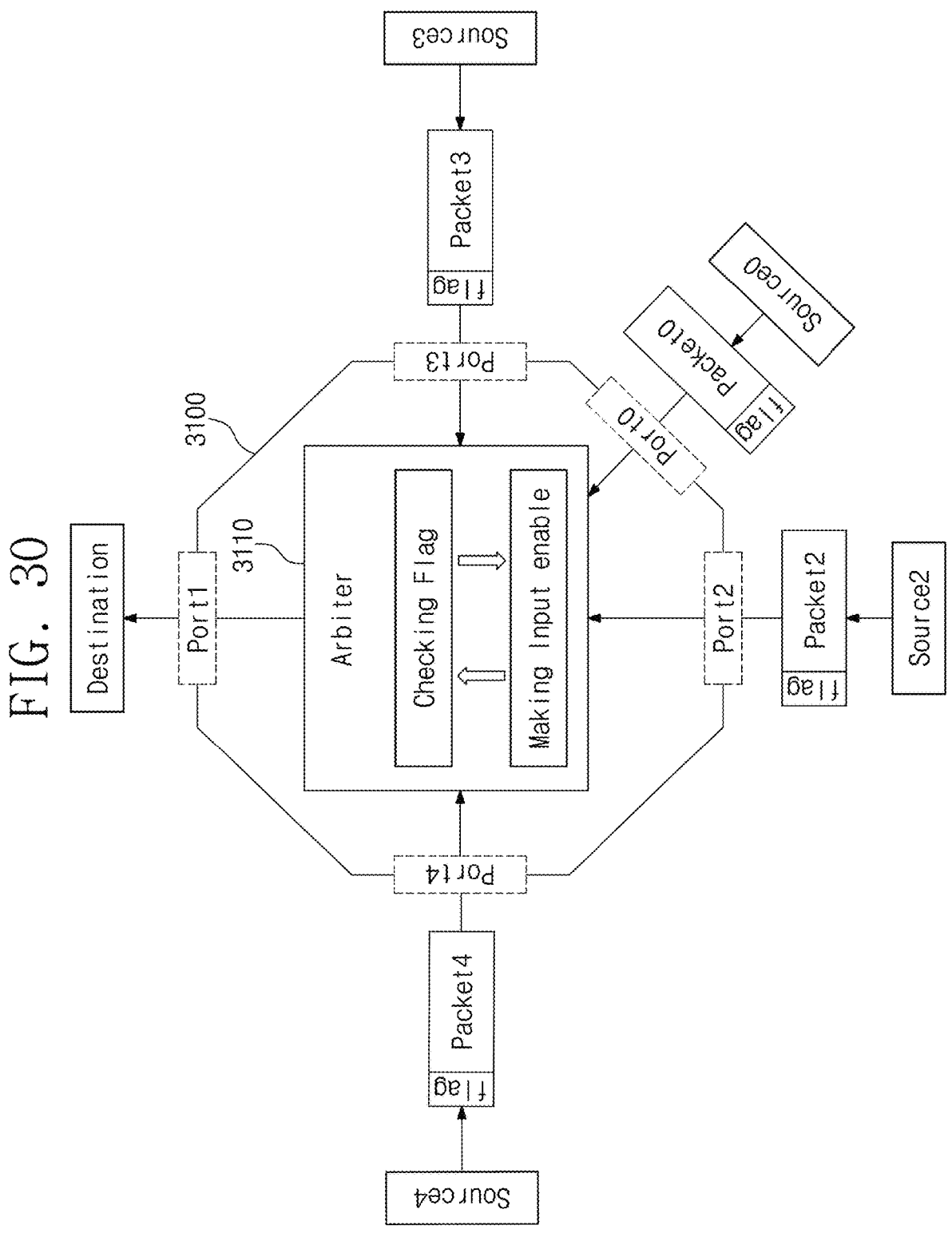
FIG. 30 is a diagram for explaining the operation of the router performing an atomic transfer method according to embodiments of the present disclosure.

FIG. 30 is a diagram for explaining the operation of a router performing an atomic transfer method according to embodiments of the present disclosure.

An atomic transfer is a transfer method in which a data transfer operation is performed completely at once without being separated or interrupted. On the other hand, a non-atomic transfer is a transfer method in which a data transfer operation is performed as divided in multiple stages and can be interrupted in between. Atomic transfer is advantageous for tasks that process large amounts of data, such as artificial neural network operations. This is because the operation on the data can begin only after all the data to be operated on has been received.

In an embodiment of the present disclosure, a data packet may further include a flag for indicating whether an atomic transfer is to be performed. The router 3100 can determine whether the data packet is to be atomically transferred by checking the flag. For example, if the flag is logic "1," it can be determined that the data packet is transmitted in an atomic transfer method, and if the flag is logic "0," it can be determined that the data packet is transmitted in a non-atomic transfer method. However, this is merely an example, and the logic of the flag indicating the atomic transfer may be "0," and the logic of the flag indicating the non-atomic transfer may be "1," and the present disclosure is not limited thereto. Hereinafter, an example where the logic of the flag indicating the atomic transfer is "1" will be described.

Figure 31:
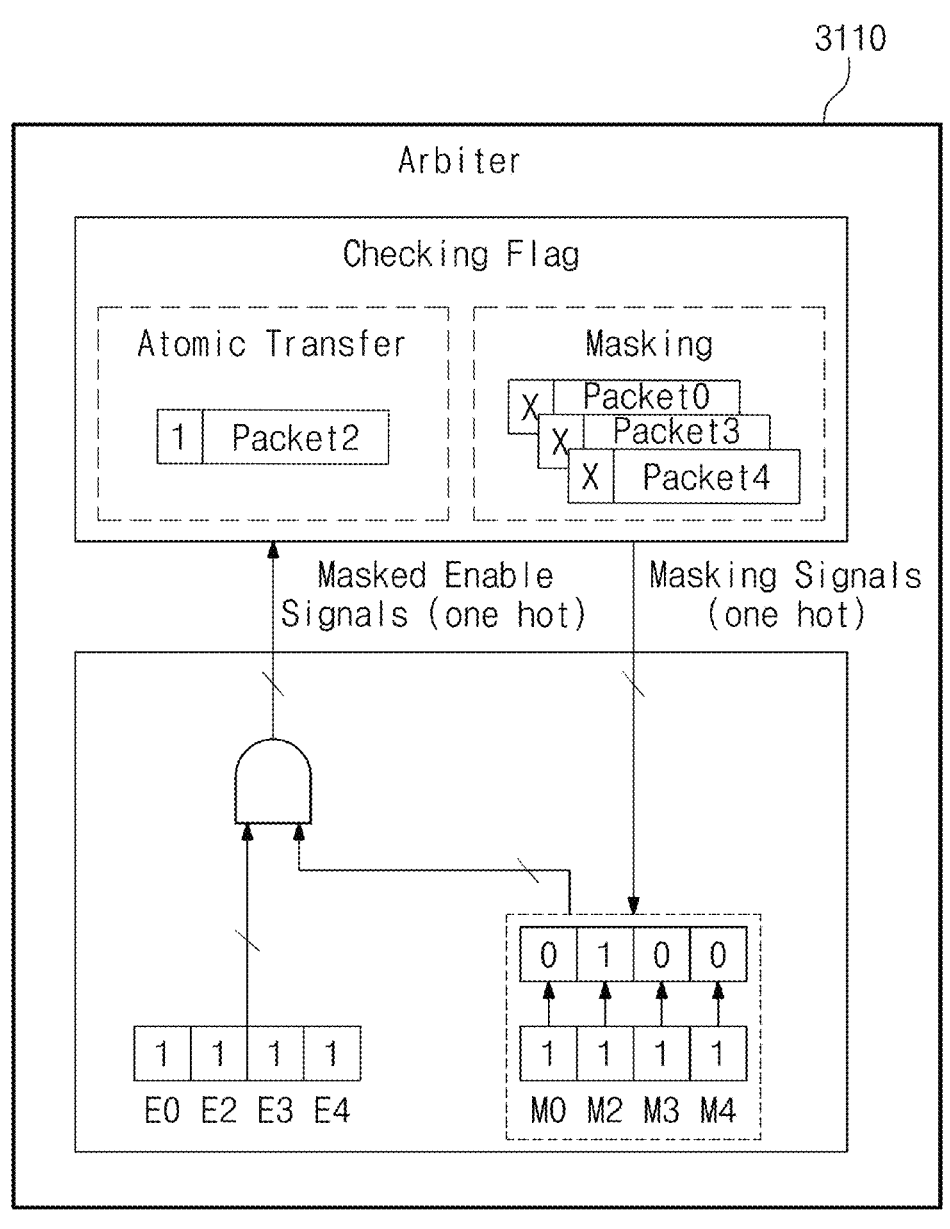
FIG. 31 is a diagram for explaining the operation of an arbiter of FIG. 30.

Referring to FIG. 31, the router 3100 may include an arbiter 3110. The arbiter 3110 can determine the transmission priority of signals (data or requests) received by the router 3100 and arbitrate the signal transmission so that the selected signal is transmitted through a designated channel. The arbiter 3110 can be implemented as a circuit or circuitry.

The arbiter 3110 can exist individually for each channel at each port within the router 3100 and can arbitrate the signal transmission of channel-specific signals received by the router 3100. The arbiter 3110 according to embodiments of the present disclosure may be configured to determine whether the atomic transfer is applied to each of data packets based on a flag of each of the data packets.

For example, if the mesh network bus 3200 includes the data channel, the request channel, and the response channel, one router 3100 may be configured to include three arbiters 3110 for three channels at each port. The arbiter 3110 for the data channel arbitrates the transmission of signals (e.g., write data, read data, write address, etc.) transmitted through the data channel, the arbiter 3110 for the request channel arbitrates the transmission of signals (e.g., read address) transmitted through the request channel, and the arbiter 3110 for the response channel arbitrates the transmission of signals (e.g., responses to write requests) transmitted through the response channel. However, this is merely an example, and the number of arbiters 3110 may vary depending on the number of channels included in the mesh network bus 3200.

In another example, the router 3100 may be configured to include a single arbiter 3110 integrated for the plurality of channels.

"Masking Input Enable" and "Checking Flag" shown in FIGS. 30 and 31 do not refer to separate hardware included in the arbiter 3110, but conceptually illustrate the operation of the arbiter 3110 according to embodiments of the present disclosure.

FIG. 30 illustrates a situation where zeroth, second, third, and fourth data packets (Packet0, Packet2, Packet3, Packet4) are received through the zeroth, second, third, and fourth ports (Port0, Port2, Port3, Port4) of the router 3100, respectively, and the data packets must be transmitted to the first port (Port1) connected to the same destination. Each of the zeroth, second, third, and fourth data packets (Packet0, Packet2, Packet3, Packet4) has a flag for indicating whether an atomic transfer is to be performed.

For example, the zeroth data packet (Packet0) may be provided from a zeroth source (Source0) and received by the zeroth port (Port0), the second data packet (Packet2) may be provided from a second source (Source2) and received by the second port (Port2), the third data packet (Packet3) may be provided from a third source (Source3) and received by the third port (Port3), and the fourth data packet (Packet4) may be provided from a fourth source (Source4) and received by the fourth port (Port4). The zeroth, second, third, and fourth sources (Source0, Source2, Source3, Source4) are units that generate or transmit data packets, and the destination is a unit that receives the data packets. For example, the zeroth, second, third, and fourth sources (Source0, Source2, Source3, Source4) and the destination can each be the neural core 1100 within the neural cluster 100 or an adjacent router 3100, or a neural core 1100 of another external neural cluster 100 or a DMA 200.

The router 3100 receives data packets from each port and generates a corresponding input enable signal upon reception of the data packets. The arbiter 3110 receives each input enable signal. The arbiter 3110 can first service one of the ports for which the input enable signal is activated (e.g., activated to logic "1") based on a predetermined criterion. For example, the predetermined criterion may include a round robin method (including a weighted round robin method) described in FIGS. 23 to 29, and the arbiter 3110 can first service the port with the highest priority according to the round robin method (including the weighted round robin method) for the ports with activated input enable signals. The arbiter 3110 first checks the flag of the data packet received by the port with the highest priority. If the flag of the data packet indicates atomic transfer (e.g., logic "1"), the arbiter 3110 masks the input enable signals of the remaining ports other than the port that received the data packet having the flag indicating atomic transfer. The arbiter 3110 services the only unmasked port, and accordingly, the arbiter 3110 transmits the data packet received by that port to the port connected to the destination. In this manner, the router 3100 can support the atomic transfer method. The operation of the arbiter 3110 according to embodiments of the present disclosure will be described in detail with reference to FIG. 31.

FIG. 31 is a diagram for explaining the operation of the arbiter of FIG. 30.

First, the router 3100 receives zeroth, second, third, and fourth data packets (Packet0, Packet2, Packet3, Packet4) through the zeroth, second, third, and fourth ports (Port0, Port2, Port3, Port4), respectively. In each of the input port modules (not shown) of the zeroth, second, third, and fourth ports (Port0, Port2, Port3, Port4), respective input enable signals are generated in response to the reception of the zeroth, second, third, and fourth data packets (Packet0, Packet2, Packet3, Packet4). The zeroth, second, third, and fourth input enable signals (E0, E2, E3, E4) can be generated in a one-hot manner. That is, whether an input enable signal is activated can be determined individually for each of the zeroth, second, third, and fourth input enable signals (E0, E2, E3, E4), and if it is logic "1," it can be determined as an activated signal. In the example of FIG. 31, since all the zeroth, second, third, and fourth data packets (Packet0, Packet2, Packet3, Packet4) have been received, the generated zeroth, second, third, and fourth input enable signals (E0, E2, E3, E4) are "1," "1," "1," "1," respectively. In another example, an activated input enable signal may correspond to logic "0," and a deactivated input enable signal may correspond to logic "1."

An AND operation is performed on the zeroth, second, third, and fourth input enable signals (E0, E2, E3, E4) and the zeroth, second, third, and fourth masking signals (M0, M2, M3, M4), respectively, and masked enable signals (Masked Enable Signals) are outputted. Masking signals (Masking Signals) are signals for deactivating the input enable signals to mask input signals (data packets) corresponding to the input enable signals. The zeroth, second, third, and fourth masking signals (M0, M2, M3, M4) can be provided in a one-hot manner. The initialized zeroth, second, third, and fourth masking signals (M0, M2, M3, M4) can be "1," "1," "1," "1," respectively.

The arbiter 3110 receives the masking enable signals. Since the initialized zeroth, second, third, and fourth masking signals (M0, M2, M3, M4) are all logic "1," the initial masking enable signals are the same as the zeroth, second, third, and fourth input enable signals (E0, E2, E3, E4). Therefore, the arbiter 3110 can check the zeroth, second, third, and fourth input enable signals (E0, E2, E3, E4) through the initial masking enable signals.

The arbiter 3110 can first service the port with the highest priority among the zeroth, second, third, and fourth ports (Port0, Port2, Port3, Port4) with activated input enable signals, according to a predetermined criterion, such as the round robin method (including the weighted round robin method). In the example of FIG. 31, the second port (Port2) has the highest priority, and the arbiter 3110 can service the second port (Port2) first. The arbiter 3110 checks the flag of the second packet (Packet2) received at the second port (Port2) being serviced. If the flag of the second packet (Packet2) indicates the atomic transfer, the arbiter 3110 transmits the second data packet (Packet2) to the first port (Port1) connected to the destination, and is configured to mask the input enable signals of the remaining ports other than the port that received the data packet having the flag indicating the atomic transfer. In the example of FIG. 31, the arbiter 3110 determines that the second data packet (Packet2) with the flag of logic "1" is transmitted in the atomic transfer method, and determines to mask all the input enable signals of the zeroth, third, and fourth ports (Port0, Port3, Port4) that receive the remaining zeroth, third, and fourth data packets (Packet0, Packet3, Packet4), regardless of the flag of each data packet. In FIG. 31, the flags of the zeroth, third, and fourth data packets (Packet0, Packet3, Packet4) are denoted by "X," meaning that both logic "0" and "1" are possible.

The arbiter 3110 generates the zeroth, second, third, and fourth masking signals (M0, M2, M3, M4) of "0," "1," "0," "0" respectively to mask the zeroth, third, and fourth ports (Port0, Port3, Port4), respectively.

The AND operation is performed on the zeroth, second, third, and fourth input enable signals (E0, E2, E3, E4) and the changed zeroth, second, third, and fourth masking signals (M0, M2, M3, M4), respectively, and the masking enable signals become "0," "1," "0," "0," respectively. That is, the arbiter 3110 masks the zeroth, third, and fourth input enable signals (E0, E3, E4) through the zeroth, third, and fourth masking signals (M0, M3, M4). The arbiter 3110 can exclude the zeroth, third, and fourth ports (Port0, Port3, Port4) from service objects according to the masking enable signals. For example, the arbiter 3110 can exclude the zeroth, third, and fourth ports (Port0, Port3, Port4) from the objects requesting service from the priority queue.

On the other hand, the arbiter 3110 can service the second port (Port2) that received the second data packet (Packet2)

having the flag indicating the atomic transfer. Specifically, the arbiter 3110 may be configured to transmit the second data packet (Packet2) having the flag indicating the atomic transfer received at the second port (Port2) to the first port (Port1). The arbiter 3110 may be configured to maintain the transmission of the second data packet (Packet2) and one or more data packets, which have one or more flags indicating the atomic transfer received after the second data packet (Packet2) at the second port (Port2) (which may be referred to as the "first port" in the claims), to the first port (Port1) (which may be referred to as the "third port" in the claims) until a data packet having a flag indicating the non-atomic transfer (e.g., a logic "O" flag) is received at the second port (Port2) that received the second data packet (Packet2). When the data packet having the flag indicating the non-atomic transfer is received at the second port (Port2), the arbiter 3110 can release the masking of the input enable signals of the zeroth, third, and fourth ports (Port0, Port3, Port4) and perform service again based on the predetermined criterion, such as the round robin method (including the weighted round robin method), for the ports with activated input enable signals.

The arbiter 3110 according to embodiments of the present disclosure determines whether the atomic transfer is to be performed through a separately added flag in the data packet, so there is no need to unpack the data packet. Therefore, a buffer for storing unpacked data packets or a data decoding logic for decoding data packets is unnecessary, and latency occurring during the unpacking process of the data packets can be eliminated. In addition, when the neural cluster 100 supports the atomic transfer, a reorder buffer for reordering fragmented data is not required. As a result, the structure of the router 3100 according to the present disclosure can be simplified, so hardware resources of the entire mesh network 3000 can be saved.

In the flowcharts according to the present disclosure, each step of the method or algorithm has been described in a sequential order, but each step can be performed not only sequentially but also in an arbitrarily combined order. The description regarding the flowcharts of the present disclosure does not exclude the addition, modification, or deletion of at least some steps in the method or algorithm. In embodiments of the present disclosure, at least some steps can be performed in parallel or repeatedly.

In embodiments of the present disclosure, components expressed as '~part', '~unit', '~block', '~module', '~component', etc., can be implemented as hardware that performs specific functions. Such hardware may include, for example, a circuit that performs operations or circuitry which is a set of interconnected circuits to perform complex functions. Here, '~part', '~unit', '~block', '~module', '~component', etc. perform specific functions and are not limited to software or hardware, and can be used to encompass data, components of software or hardware, or combinations thereof. In addition, the structures, methods, operations, processes, algorithms, etc., according to various embodiments of the present disclosure can be implemented through various means such as hardware, firmware, software, or combinations thereof.

Various embodiments of the present disclosure can be implemented as software recorded on a machine-readable recording medium. The software may be software for implementing various embodiments of the present disclosure described above. The software can be inferred from various embodiments of the present disclosure by programmers in the technical field to which the present disclosure belongs. For example, the software can be machine-readable instructions (e.g., code or code segments) or programs. A machine is a device capable of operating according to instructions called from a recording medium, and may be, for example, a computer. In one embodiment, the machine may be an electronic device according to embodiments of the present disclosure. In one embodiment, a processor of the machine can execute the called instructions, causing components of the machine to perform functions corresponding to the instructions. In one embodiment, the processor may be a processor of an electronic device according to embodiments of the present disclosure. A recording medium may refer to any kind of recording medium that stores data and can be read by a machine. A recording medium may include, for example, ROM, RAM, CD-ROM, magnetic tape, floppy disk, optical data storage device, etc. In one embodiment, the recording medium may be a memory. In one embodiment, the recording medium may be implemented in a distributed form, such as on computer systems connected by a network. Software can be stored and executed in a distributed manner on the computer systems or the like. The recording medium can be a non-transitory computer-readable recording medium. The non-transitory computer-readable recording medium refers to a tangible medium regardless of whether data is stored permanently or temporarily, and does not include temporarily propagating signals.

As described above, those skilled in the art to which the present disclosure pertains will recognize that the present disclosure can be implemented in various forms without changing its technical principles or essential features. Therefore, it should be understood that the above embodiments are illustrative and do not limit the scope of the present disclosure. The scope of the present disclosure is defined by the claims below rather than by the detailed description, and all modifications or variations based on the meaning and scope of the claims and equivalent concepts thereof should be construed as being included within the scope of the present disclosure.

The features and advantages described herein are merely illustrative, and many additional features and advantages will become apparent to those skilled in the art by referring to the drawings, specification, and claims. In addition, it should be noted that the language used in this specification has been chosen for readability and explanation, and is not necessarily chosen for the purpose of limiting the subject matter of the present disclosure.

The descriptions of the above embodiments are provided for illustrative purposes and are not intended to limit the scope of the present disclosure in precise form. Those skilled in the art will understand that various modifications and variations are possible through the disclosure of the present disclosure.

Therefore, the scope of the present disclosure is not limited by the detailed description, but is defined by the claims herein. Accordingly, the embodiments of the present disclosure are illustrative and do not limit the scope of the present disclosure as set forth in the claims below.

What is claimed is:

1. A neural cluster, comprising:

a plurality of neural core units each including a neural core configured to process a neural network operation;

a plurality of shared memory units each including a shared memory shared by the plurality of neural core units; and a mesh network for connecting the plurality of neural core units and the plurality of shared memory units, wherein the plurality of shared memory units are arranged in a central portion of the neural cluster, and the plurality of neural core units are arranged symmetrically above and below a shared memory area where the plurality of shared memory units are arranged, wherein the mesh network includes a plurality of routers each arranged at an intersection formed by a row line and a column line, and a mesh network bus, and wherein each of the plurality of routers is connected to one of the plurality of neural core units or one of the plurality of shared memory units through the mesh network bus, and wherein each of the plurality of routers includes:

a first port configured to receive a first data packet having a first flag;

a second port configured to receive a second data packet having a second flag and having the same destination as the first data packet;

a third port connected to the destination of the first data packet and the second data packet; and an arbiter configured to determine whether an atomic transfer is applied to each of the first data packet and the second data packet, based on the first flag and the second flag.

2. The neural cluster of claim 1, wherein each of the plurality of routers is further connected to one or more adjacent routers through the mesh network bus.

3. The neural cluster of claim 1, wherein each of the plurality of neural core units and each of the plurality of shared memory units include a network interface unit, wherein the mesh network bus includes a data channel, a response channel, and a request channel, and wherein the network interface unit is configured to map an AXI-AW channel, an AXI-W channel, an AXI-B channel, an AXI-AR channel, and an AXI-R channel according to an AMBA (Advanced Microcontroller Bus Architecture) AXI (Advanced extensible Interface) protocol to the data channel, the response channel, and the request channel.

4. The neural cluster of claim 3, wherein the AXI-AW channel, the AXI-W channel, and the AXI-R channel are mapped to the data channel, the AXI-B channel is mapped to the response channel, and the AXI-AR channel is mapped to the request channel.

5. The neural cluster of claim 1, wherein the arbiter is configured to:

check a first input enable signal generated from the first port upon reception of the first data packet;

check a second input enable signal generated from the second port upon reception of the second data packet; and first check the first flag based on a predetermined criterion if the first input enable signal and the second input enable signal are activated.

6. The neural cluster of claim 5, wherein the arbiter is configured to mask the second input enable signal and transmit the first data packet to the third port if the first flag indicates the atomic transfer.

7. The neural cluster of claim 6, wherein the arbiter is configured to maintain the transmission of one or more data packets, which have one or more flags indicating the atomic transfer received after the first data packet at the first port, to the third port until a data packet having a flag indicating a non-atomic transfer is received at the first port.

8. A neural cluster, comprising:

a first neural core unit including a first neural core configured to process a neural network operation;

a second neural core unit including a second neural core configured to process a neural network operation;

a first shared memory unit including a first shared memory shared by the first neural core unit and the second neural core unit;

a second shared memory unit including a second shared memory shared by the first neural core unit and the second neural core unit; and a mesh network for connecting the first neural core unit, the second neural core unit, the first shared memory unit, and the second shared memory unit, wherein the first neural core is configured to generate a first data access request in a first cycle and generate a second data access request in a second cycle, wherein the second neural core is configured to generate a third data access request in the first cycle and generate a fourth data access request in the second cycle, wherein the first to fourth data access requests are respectively interleaved and transmitted as distributed to the first shared memory and the second shared memory, and wherein the first shared memory unit and the second shared memory unit are arranged in a central portion of the neural cluster, and the first neural core unit and the second neural core unit are respectively arranged symmetrically above and below a shared memory area where the first shared memory unit and the second shared memory unit are arranged.

9. The neural cluster of claim 8, wherein a size of data accessed according to the first to fourth data access requests is the same as each other.

10. The neural cluster of claim 9, wherein the first to fourth data access requests are respectively interleaved according to an interleaving unit and transmitted as distributed to the first shared memory and the second shared memory, and the interleaving unit is changeable.

11. The neural cluster of claim 10, wherein if the interleaving unit is the same as the size of the data accessed according to each of the first to fourth data access requests, the first data access request and the third data access request are transmitted to the first shared memory, and the second data access request and the fourth data access request are transmitted to the second shared memory.

12. The neural cluster of claim 10, wherein the first neural core is configured to further generate a fifth data access request in a third cycle and further generate a sixth data access request in a fourth cycle, wherein the second neural core is configured to further generate a seventh data access request in the third cycle and further generate an eighth data access request in the fourth cycle, and wherein if the interleaving unit is twice the size of the data accessed according to each of the first to fourth data access requests, the first to fourth data access requests are transmitted to the first shared memory, and the fifth to eighth data access requests are transmitted to the second shared memory.

13. The neural cluster of claim 8, wherein each of the first neural core unit and the second neural core unit further includes a network interface unit.

14. The neural cluster of claim 13, wherein the first neural core is configured to further generate a first system address with the first data access request and further generate a second system address with the second data access request, wherein the second neural core is configured to further generate a third system address with the third data access request and further generate a fourth system address with the fourth data access request, wherein the network interface unit of the first neural core unit is configured to parse the first system address and the second system address according to a predetermined parsing rule, wherein the network interface unit of the second neural core unit is configured to parse the third system address and the fourth system address according to the predetermined parsing rule, and wherein, according to the parsed first to fourth system addresses, the first to fourth data access requests are respectively interleaved and transmitted as distributed to the first shared memory and the second shared memory.

15. The neural cluster of claim 14, wherein the second system address is an address consecutive to the first system address, and the fourth system address is an address consecutive to the third system address.

16. A neural processing SoC (System on a Chip), comprising:

a first neural cluster; and a second neural cluster, wherein each of the first neural cluster and the second neural cluster includes:

a plurality of neural core units each including a neural core configured to process a neural network operation;

a plurality of shared memory units each including a shared memory shared by the plurality of neural core units; and a mesh network for connecting the plurality of neural core units and the plurality of shared memory units, wherein the plurality of shared memory units are arranged in a central portion of each of the first neural cluster and the second neural cluster, and the plurality of neural core units are arranged symmetrically above and below a shared memory area where the plurality of shared memory units are arranged, and wherein a plurality of shared memories of the first neural cluster are shared by the plurality of neural core units of the second neural cluster, wherein the mesh network includes a plurality of routers each arranged at an intersection formed by a row line and a column line, and a mesh network bus, and wherein each of the plurality of routers is connected to one of the plurality of neural core units or one of the plurality of shared memory units through the mesh network bus, and wherein each of the plurality of routers includes:

a first port configured to receive a first data packet having a first flag;

a second port configured to receive a second data packet having a second flag and having the same destination as the first data packet;

a third port connected to the destination of the first data packet and the second data packet; and an arbiter configured to determine whether an atomic transfer is applied to each of the first data packet and the second data packet, based on the first flag and the second flag.

17. A neural processing SoC, comprising:

a first neural cluster; and a second neural cluster, wherein each of the first neural cluster and the second neural cluster includes:

a first neural core unit including a first neural core configured to process a neural network operation;

a second neural core unit including a second neural core configured to process a neural network operation;

a first shared memory unit including a first shared memory shared by the first neural core unit and the second neural core unit;

a second shared memory unit including a second shared memory shared by the first neural core unit and the second neural core unit; and a mesh network for connecting the first neural core unit, the second neural core unit, the first shared memory unit, and the second shared memory unit, wherein the first neural core is configured to generate a first data access request in a first cycle and generate a second data access request in a second cycle, wherein the second neural core is configured to generate a third data access request in the first cycle and generate a fourth data access request in the second cycle, wherein the first to fourth data access requests are respectively interleaved and transmitted as distributed to the first shared memory and the second shared memory, wherein the first shared memory unit and the second shared memory unit are arranged in a central portion of each of the first neural cluster and the second neural cluster, and the first neural core unit and the second neural core unit are respectively arranged symmetrically above and below a shared memory area where the first shared memory unit and the second shared memory unit are arranged, and wherein the first shared memory and the second shared memory of the first neural cluster are shared by the first neural core unit and the second neural core unit of the second neural cluster.

* * * * *